United States Patent
Zwirn et al.

(10) Patent No.: US 7,248,725 B2
(45) Date of Patent: Jul. 24, 2007

(54) METHODS AND APPARATUS FOR ANALYZING ULTRASOUND IMAGES

(75) Inventors: Gil Zwirn, Petach-Tikva (IL); Solange Akselrod, Givat Shmuel (IL)

(73) Assignee: Ramot At Tel Avia University Ltd., Tel-Aviv (IL)

( * ) Notice: Subject to any disclaimer, the term of this patent is extended or adjusted under 35 U.S.C. 154(b) by 55 days.

(21) Appl. No.: 11/262,760

(22) Filed: Nov. 1, 2005

(65) Prior Publication Data

US 2006/0078182 A1 Apr. 13, 2006

Related U.S. Application Data

(63) Continuation-in-part of application No. PCT/IL05/00012, filed on Jan. 4, 2005.

(60) Provisional application No. 60/699,933, filed on Jul. 18, 2005, provisional application No. 60/623,218, filed on Nov. 1, 2004, provisional application No. 60/534,390, filed on Jan. 7, 2004.

(51) Int. Cl.
  *G06K 9/00* (2006.01)
  *G06K 9/44* (2006.01)
(52) U.S. Cl. .................................... 382/128
(58) Field of Classification Search ........ 382/128–135, 382/172, 173, 260–264, 254, 276; 600/437, 600/443, 445, 448, 458
See application file for complete search history.

(56) References Cited

U.S. PATENT DOCUMENTS

| | | | |
|---|---|---|---|
| 5,457,754 A | | 10/1995 | Han et al. |
| 6,059,729 A | * | 5/2000 | Stonger ........................ 600/443 |
| 6,108,439 A | * | 8/2000 | Ishiguro ........................ 382/131 |
| 6,346,124 B1 | | 2/2002 | Geiser et al. |
| 6,468,218 B1 | * | 10/2002 | Chen et al. ................. 600/443 |
| 6,798,918 B2 | | 9/2004 | Chu et al. |
| 6,835,177 B2 | * | 12/2004 | Fritz et al. ................... 600/443 |
| 2004/0081340 A1 | * | 4/2004 | Hashimoto ................. 382/128 |
| 2004/0120559 A1 | * | 6/2004 | Hall ............................. 382/128 |
| 2006/0045318 A1 | * | 3/2006 | Schoisswohl et al. ....... 382/128 |

OTHER PUBLICATIONS

Herment et al. "Improved Estimation of Low Velocities in Color Doppler Imaging by Adapting the Mean Frequency Estimator to the Clutter Rejection Filter", IEEE Transactions on Biomedical Engineering, 43(9): 919-927, 1996.

Jacob et al. "Evaluating A Robust Contour Tracker on Echocardiographic Sequences", Medical Image Analysis, 3(1): 63-75, 1999.

(Continued)

*Primary Examiner*—Amir Alavi

(57) ABSTRACT

A method of analyzing an ultrasound image of a target volume having therein at least two types of substances is disclosed. The method comprises: dividing a region-of-interest of the image to a set of mini-segments. The method further comprises, for each mini-segment, calculating at least two representative intensity values, respectively representing the at least two types of substances. The method further comprises applying attenuation corrections to each representative intensity value of at least a subset of the set of mini-segments, so as to map the region-of-interest according to the at least two types of substances.

34 Claims, 34 Drawing Sheets

OTHER PUBLICATIONS

Ohyama et al. "Automatic Left Ventricular Endocardium Detection in Echocardiograms Based on Ternary Thresholding Method", IEEE Proceedings of the 15th International Conference on Pattern Recognition, 4: 320-323, 2000.

Spencer et al. "Use of Harmonic Imaging Without Echocardiographic Contrast to Improve Two-Dimensional Image Quality", American Journal of Cardiology, 82: 794-799, 1998.

Bjaerum et al. "Clutter Filters Adapted to Tissue Motion in Ultrasound Color Flow Imaging", IEEE Transactions on Ultrasonics, Ferroelectrics, and Frequency Control, 49(6): 693-704, 2002.

Desco et al. "Myocardial Perfusion Assessment With Contrast Echocardiography", Medical Imaging: Ultrasonic Imaging and signal Processing, Proceedings of SPIE, 4325: 514-522, 2001.

Jacob et al. "Evaluating A Robust Contour Tracker on Echocardiographic Sequences", Medical Image Analysis, 3(1): 63-75, 1999.

Lafitte et al. "Contrast Echocardiography Can Assess Risk Area and Infarct Size During Coronary Occlusion and Reperfussion: Experimenta Validation", Journal of the American College of Cardiology, 39: 1546-1554, 2002.

Mor-Avi et al. "Digital Path-Dependent Recompensation of Constrast-Enhanced Echocardiographic Images", Ultrasound in Medicine & Biology, 18(10): 831-842, 1992. Abstract.

Mor-Avi et al. "Myocardial Transit Time of the Echocardiographic Contrast Media", Ultrasound in Medicine & Biology, 19(8): 635-648, 1993. Abstract.

Mor-Avi et al. "Myocardial Regional Blood Flow: Quanitative Measurement by Computer analysis of Contrast Enhanced Echocardiographic Images", Ultrasound in Medicine & Biology, 19(8): 619-633, 1993. Abstract.

Oh et al. "Correlation of Regional Wall Motion Abnormalities Detected by Two-Dimensional Echocardiography With Perfusion Defect Determined by Technetium 99m Sestamibi Imaging in Patients Treated With Reperfusion Therapy During Acute Myocardial Infarction", American Heart Journal, 131: 32-37, 1996.

Sheehan et al. "Advantages and Applications of the Centerline Method for Characterizing Regional Ventricular Function", Circulation, 74: 293-305, 1986.

Spencer et al. "Use of Harmonic Imaging Without Echocardiographic Contrast to Improve Two-Dimensional Image Quality", American Journal of Cardiology, 82: 794-799, 1998.

Yuda et al. "Use of Cyclic Variation of Integrated Backscatter to Assess Contractile Reserve and Myocardial Viability in Chronic Ischemic Left Ventricular Dysfunction", Echocardiology, 19(4): 279-287, 2002.

Yoo et al. "Adaptive Clutter Filtering for Ultrasound Color Flow Imaging", Ultrasound in Medicine & Biology, 29(9): 1311-1320, 2003.

Krishna et al. "Subharmonic Generation From Ultrasonic Contrast Agents", Physics in Medicine and Biology, 44(3): 681-694, 1999.

Moseley "Evaluation of Abnormal Liver Function Tests", Medical Clinics of North America, 80(5): 887-906, 1996.

* cited by examiner

METHODS AND APPARATUS FOR ANALYZING ULTRASOUND IMAGES

RELATED APPLICATIONS

The present application is a Continuation-In-Part (CIP) of PCT Application No. PCT/IL2005/000012, filed on Jan. 4, 2005, which claims the benefit of priority from U.S. Provisional Patent Application No. 60/534,390, filed on Jan. 7, 2004. This application also claims the benefit of priority from U.S. Provisional Patent Application Nos. 60/623,218, filed on Nov. 1, 2004, and 60/699,933, filed on Jul. 18, 2005. The contents of each of the above applications are incorporated herein by reference in their entirety.

FIELD AND BACKGROUND OF THE INVENTION

The present invention relates to image analysis and, more particularly, to methods and apparatus for analyzing and improving the quality of images obtained, e.g., during contrast echocardiography.

Imaging is recognized as the most commonly used tool in medical diagnostics. Due to its non-invasive nature, imaging is the preferred procedure prior to any invasive treatment or analysis. Medical imaging techniques include Magnetic Resonance Imaging, X-ray imaging, gamma imaging, ultrasound imaging and the like.

In Magnetic Resonance Imaging, magnetic fields interact with the spins of the atoms in a tissue and the interaction results are monitored and analyzed to provide an image of the tissue. In X-ray imaging, X-ray radiation is applied to the body and different absorption and transmission characteristic of different tissues generate an image thereof. In gamma imaging, also known as radiological imaging, a radioactive isotope is injected to, inhaled by or ingested by a patient. The isotope is chosen based on bio-kinetic properties that cause preferential uptake by different tissues. Radiation emitted by the radioactive isotope is detected by radiation detectors outside the body, giving its spatial uptake distribution within the body. The obtained images can be two-dimensional images, in which case the camera is fixed in position, or three-dimensional images, in which case the body is scanned by the camera. Studies which produce two-dimensional images are called planar imaging studies, and studies which produce three-dimensional images are known as single photon emission computerized tomography (SPECT) and positron emission tomography (PET).

In ultrasound imaging, high frequency pulsed and continuous sound waves are applied to the body and the reflected sound waves are used to develop images of internal organs and the vascular system. The sound waves are generated and recorded by transducers or probes that are either passed over or inserted into the body. The resulting images can be viewed immediately on a video display or can be recorded for later evaluation in a single image or a cine-loop format.

Diagnostic ultrasound imaging is presently a preferred imaging modality in many medical fields, such as radiology, cardiology and gynecology. Cardiologists and other medical practitioners use cardiac ultrasound imaging, also termed echocardiography, to evaluate the condition of the heart. Echocardiography has the advantage of being a non-invasive, quick, inexpensive, convenient and safe diagnostic procedure, and is therefore practiced in many hospitals as well as private clinics.

The primary drawback of echocardiography is the difficulty of acquiring good quality images in patients with poor acoustic windows. Moreover, clutter and poor resolution can compromise the clinical utility of images of any patient produced by even the most sophisticated ultrasound scanners. With echocardiography, the difficulty of acquiring acceptable images is further compounded by the fact that the region of interest, the heart, has complex motion patterns. The advantages of echocardiography procedure on the one hand, and the unsatisfactory image quality on the other hand, have led researches to apply image processing techniques so as to at least partially improve the echocardiograph image.

One image processing technique is "thresholding," in which one or more parameters (typically intensity thresholds), are used to generate an output image. For example, in one implementation of the thresholding procedure, the intensity of each pixel in the original image is compared with a single intensity threshold. The original image is mapped onto a binary image in which each pixel has one of two polarities (say "0" and "1") depending whether the intensity of the corresponding pixel in the original image is higher or lower than the intensity threshold.

Image processing oftentimes involves mathematical operations performed on histograms characterizing the images. In image processing context, a histogram typically refers to a graph showing the number of pixels in an image at each different intensity value found in that image. For example, for an 8-bit grey-scale image, there are $2^8=256$ different possible intensity values, and the histogram graphically displays 256 numbers showing the distribution of pixels amongst those intensity values.

A well-known mathematical operation is "histogram equalization" (see, e.g., Eltoft et al. "Real-Time Image Enhancement in Two-Dimensional Echocardiography", Computers in Cardiology 1984:481). This technique is based on the assumption that images embodying the maximal possible intensity range display optimal contrasts. In conventional histogram equalization, an intensity transformation, also known as a Brightness Transfer Function (BTF), is used to increase the spread of the intensity histogram characterizing the image. Histogram equalization can also be combined with thresholding and/or intensity transformation [Gonzalez R. C. and Woods R. W., "Digital Image Processing," Addison-Wesley, pp. 166–171, 1992]. However, the results obtained using the above techniques are far from being satisfactory. In particular, echocardiograph images processed using prior art techniques suffer from poor resolution and a substantial amount of noise.

The major artifact in ultrasound images is clutter, which includes irrelevant information that appears in the imaging plane, obstructing the data of interest. There are several causes for the appearance of clutter in an ultrasonic image. A first cause is effective imaging of off-axis objects, primarily due to highly reflective objects in the transducer's sidelobes (e.g., the ribcage and the lungs). A second cause is known as multi-path or reverberations. Due to the geometry of the scanned tissue with respect to the transducer, and the local reflective characteristics of the tissue, a substantial amount of the transmitted energy is bounced back and forth in the tissue before reaching the transducer. As a result, the signal measured at a specific range-gate includes contributions from incorrect ranges, in addition to the relevant range swath.

A known method for reducing clutter is harmonic imaging [Spencer et al., "Use of Harmonic Imaging without Echocardiographic Contrast to Improve Two-Dimensional Image Quality," American Journal of Cardiology, 82:794, 1998]. In harmonic imaging, the ultrasound waves are transmitted at one frequency and received at twice the transmitted frequency. This technique, however, provide less than optimal results. Additionally, being based on adapting the data acquisition process, this technique cannot be applied to all types of echocardiograph images.

Several clutter rejection algorithms have been specifically developed for color-Doppler flow images in which effects of slow-moving objects are suppressed assuming that the blood flow velocity is much higher than the motion velocity of the surrounding tissue (to this end see, e.g., Herment et al., "Improved Estimation of Low Velocities in Color Doppler Imaging by Adapting the Mean Frequency Estimator to the Clutter Rejection Filter," IEEE Transactions on Biomedical Engineering, 43:919, 1996; Bjaerum et al., "Clutter filters adapted to tissue motion in ultrasound color flow imaging," IEEE Transactions on Ultrasonics Ferroelectrics & Frequency Control, 49, 6:693, 2002; Cloutier et al., "A new clutter rejection algorithm for Doppler ultrasound," IEEE Transactions on Medical Imaging, 22, 4:530, 2003; and Yoo et al, "Adaptive Clutter Filtering for Ultrasound Color Flow Imaging," Ultrasound in Medicine and Biology, 29, 9:1311, 2003).

Another known method for handling clutter, in particular in ultrasound images of patients with low echogenicity, is "contrast echocardiography" [Krishna et al., "Subharmonic Generation from Ultrasonic Contrast Agents," Physics in Medicine and Biology, 44:681, 1999]. In contrast echocardiography, contrast agent is used to enhance the backscatter from blood thereby to improve its delineation from the surrounding tissue. The contrast agent is designed to backscatter ultrasound energy, and is administered to a patient during or prior to the ultrasound imaging. Typical contrast agents comprise tiny "bubbles", also referred to as microbubbles, filled with a fluid (liquid or gas) having desired sound reflective properties. Ultrasound contrast agents can also include liquid emulsions, solids, encapsulated fluids, encapsulated biocompatible gases and/or combinations thereof. A contrast agent may be administered intravenously, intramuscularly, intraarterially or intracardially.

Contrast agents typically perfuse in surrounding tissue at different rates depending on the health and nature of the tissue (generally, healthy tissue has more capillaries than damaged tissue, and thus the contrast agents perfuse more readily through healthy tissue). Backscattered ultrasound energy from the different levels of contrast agent in tissue results in a differentiated image. By analyzing one or more ultrasound images, a skilled technologist can determine a diagnosis.

One protocol of contrast echocardiography, known as Left Ventricular Opacification (LVO), includes the injection of a bolus of contrast agent into the vein so as to fill the Left Ventricular (LV) cavity. Being highly reflective to the ultrasound waves, the contrast agent facilitates the delineation of the inner boundary (Endocardial boundary) of the cardiac muscle as a function of time.

LVO is typically performed using a relatively high mechanical index (high ultrasound transmission power). When increasing the transmission power, the power of the ultrasonic echo from the tissue increases almost linearly with the input power, while the power of the reflections from contrast agent increases non-linearly. Thus, the use of high mechanical indices provides a better contrast between the LV cavity and the cardiac muscle. However, high intensity pulses destroy the microbubbles of the contrast agent, and the LVO procedure requires continuous infusion of the contrast agent.

Even with contrast agents, ultrasound images are particularly difficult to interpret because of uneven attenuation. "Attenuation" is a measure of the scattering, reflection and absorption of ultrasonic energy by a particular substance whereby less of the energy passes entirely through that substance and beyond. Such variations in attenuation in different materials are the basis for echocardiography. However, if the ultrasound energy is significantly attenuated during transmission through a substance, true visualization of the contrast agent which appears in the tissue/organs beyond the attenuating areas is prevented, leading to a false diagnosis.

Contrast echocardiography is a potentially effective modality for assessing myocardial perfusion. In one method, the contrast agent's mean transit time within the myocardium is measured based on its concentration as a function of time [Mor-Avi et al., "Digital path-dependent recompensation of contrast-enhanced echocardiographic images", Ultrasound Med Biol 1992, 18:831–842; "Myocardial transit time of the echocardiographic contrast media", Ultrasound Med Biol 1993, 19:635–648; "Myocardial regional blood flow: Quantitative measurement by computer analysis of contrast enhanced echocardiographic images", Ultrasound Med Biol 1993, 19:619–633; "Contrast echocardiographic quantification of regional myocardial perfusion: Validation with an isolated rabbit heart model", J Am Soc Echocardiogr 1996; 9:156–165].

In another method, the myocardial perfusion is assessed using the contrast-agent's concentration replenishment curve, following a "flash", which is a series of high mechanical-index impulses which destroy the microbubbles within the Myocardium [Desco et al., "Myocardial perfusion assessment with contrast echocardiography", SPIE Proc 2001, 4325:514–522; Lafitte et al., "Contrast echocardiography can assess risk area and infarct size during coronary occlusion and reperfusion: Experimental validation", J Am Coll Cardiol, 2002, 39:1546–1554; Masugata et al., "Quantitative assessment of myocardial perfusion during graded coronary stenosis by real-time myocardial contrast echo refilling curves", J Am Coll Cardiol 2001, 37:262–269; Routh H F and Skyba D M., "Functional imaging with ultrasound", Medica Mundi, 2001, 46:59–64; Wei et al., "Quantification of myocardial blood flow with ultrasound-induced destruction of microbubbles administered as a constant venous infusion", Circulation, 1998, 97:473–483].

Both the above methods are based on the assumption that the contrast-agent's concentration is linearly correlated with the gray-level within the echocardiography image. Such procedures require using low mechanical index pulses (with the exception of transmitting a "flash"), in order to support the buildup of contrast agent within the Myocardium. In low mechanical index scenarios, the power of the returned signal is, of course, much lower than that in high mechanical index cases, and the difference between the power of the echoes from the contrast agent and from the tissue is significantly lower. Consequently, the acquired images are characterized by reduced Signal-to-Noise Ratios (SNRs).

Various techniques have been developed in order to improve the SNR in myocardial perfusion assessment. One such method is coherent contrast imaging (CCI). In CCI, two pulses with opposite phase are transmitted in each direction and the imaging is based on the coherent sum of the reflections from both pulses. Since the tissue's response to ultrasound energy is linear, most of the echoes from the tissue are rejected, while echoes from the contrast agent, which has a non-linear response to ultrasound, are enhanced.

Albeit the advantages of ultrasound imaging from standpoints of cost, availability and safety, many medical institutions prefer to perform myocardial perfusion tests using SPECT rather than contrast echocardiography. One of the reasons is the cumbersomeness of the currently available contrast echocardiography procedure, whereby a single plane is imaged for relatively long periods of time so as to support the build-up or decay of the contrast agent. As a result, even small vibrations of the transducer during the data acquisition may significantly reduce the accuracy of prior art methods.

It is recognized that the effectiveness in diagnostic imaging depends on the ability to accurately recognize the imaged organs. For example, in echocardiography, the determination of the location of the cardiac muscle within the scanned plane, and specifically of the Left Ventricle (LV), is of great importance. Information about the LV outlines as a function of time enables automatic extraction of rich local quantitative functional information.

However, with the present signal-to-noise ratio and substantial amount of clutter in echocardiograph images, visual as well as automatic determination of the LV outlines is rather difficult. An inherent problem with automatic determination of the LV outlines is the complex motion of the Mitral Valve and the Papillary Muscles, which further increase the computational load. An additional problem is the significant variations between different patients and different measurements of the same patient. Several attempts have been made to develop algorithms for automatic detection of the LV outlines [U.S. Pat. Nos. 5,457,754 and 6,346,124; and Jacobs et al., "Evaluating a Robust Contour Tracker on Echocardiographic Sequences," Medical Image Analysis, 3:63, 1999]. These attempts, however, had only limited success in border detection. For example, prior art fail to accurately detected contours outlining the outer boundaries of the LV.

It will be appreciated that there is a widely recognized need for, and it would be highly advantageous to have methods and apparatus for analyzing and improving the quality of images, devoid of the above limitations.

SUMMARY OF THE INVENTION

According to one aspect of the present invention there is provided a method of analyzing an ultrasound image of a target volume having therein at least two types of substances. The ultrasound image being represented by a plurality of intensity values over a grid of picture-elements. The method comprises: dividing a region-of-interest of the image to a set of mini-segments; for each mini-segment, calculating at least two representative intensity values, respectively representing the at least two types of substances; and applying attenuation corrections to each representative intensity value of at least a subset of the set of mini-segments so as to map the region-of-interest according to the at least two types of substances.

According to further features in preferred embodiments of the invention described below, the region-of-interest is defined by the method.

According to still further features in the described preferred embodiments the method further comprises identifying clutter picture-elements in the ultrasound image so as to define clutter-dominated mini-segments.

According to still further features in the described preferred embodiments the region-of-interest is the left ventricle of the cardiac muscle. According to still further features in the described preferred embodiments the region-of-interest is mapped according to perfusion levels within the left ventricle.

According to still further features in the described preferred embodiments the ultrasound image is a moving ultrasound image characterized by a plurality of picture-elements, the moving ultrasound image being formed of a set of still-images. According to still further features in the described preferred embodiments the moving ultrasound image comprises an ultrasound cine-loop image.

According to still further features in the described preferred embodiments the attenuation corrections are stationary over the set of still-images.

According to still further features in the described preferred embodiments the attenuation corrections are applied using a coarse correction factor to each representative intensity value of a respective mini-segment.

According to still further features in the described preferred embodiments the attenuation corrections vary over the set of still-images.

According to still further features in the described preferred embodiments the attenuation corrections are applied using a time-dependent correction factor to each representative intensity value of a respective mini-segment.

According to still further features in the described preferred embodiments the time-dependent correction factor is interpolated from a coarse correction factor using an average distance between the mini-segment and a transducer generating the ultrasound image.

According to still further features in the described preferred embodiments the coarse correction factor comprises the difference between a maximal intensity median over time for at least a portion of the mini-segments and a median intensity value of the mini-segment.

According to still further features in the described preferred embodiments the at least two types of substances comprise an ultrasound contrast agent and an additional substance being other than the ultrasound contrast agent.

According to still further features in the described preferred embodiments the additional substance comprises tissue.

According to still further features in the described preferred embodiments the attenuation corrections are applied using a predetermined functional dependence between concentration of the contrast agent and a local attenuation coefficient.

According to still further features in the described preferred embodiments the attenuation corrections are applied using a predetermined functional dependence between concentration of the contrast agent and a total reflection cross-section.

According to still further features in the described preferred embodiments the clutter-dominated mini-segments are defined as mini-segments having at least a predetermined portion of clutter picture-elements.

According to still further features in the described preferred embodiments the clutter picture-elements are identified as picture-elements having intensity values above a predetermined percentile of an intensity histogram characterizing the region-of-interest.

According to still further features in the described preferred embodiments the at least two representative intensity values comprise a first representative intensity value defined as an average over the mini-segment of intensity values corresponding to the ultrasound contrast agent, and a second representative intensity value defined as an average over the mini-segment of intensity values corresponding to the additional substance.

According to still further features in the described preferred embodiments the region-of-interest is characterized by an intensity histogram which is fitted to a sum of a plurality of localized functions, whereby the intensity values corresponding to the ultrasound contrast agent and the intensity values corresponding to the additional substance are identified using the plurality of localized functions.

According to still further features in the described preferred embodiments the plurality of localized functions comprises a first localized function and a second localized function.

According to still further features in the described preferred embodiments the additional substance is identified by the first localized function, and the ultrasound contrast agent is identified by the second localized function.

According to still further features in the described preferred embodiments the plurality of localized functions comprises a first localized function, a second localized function and a third localized function.

According to still further features in the described preferred embodiments the tissue is identified by the first and the second localized function, and the ultrasound contrast agent is identified by the third localized function.

According to still further features in the described preferred embodiments the tissue is identified by the first localized function, the ultrasound contrast agent is identified by the second localized function and intensity values corresponding to clutter in the ultrasound image are identified by the third localized function.

According to another aspect of the present invention there is provided apparatus for analyzing an ultrasound image of a target volume having therein at least two types of substances. The apparatus comprises a dividing unit, for dividing a region-of-interest of the image to a set of mini-segments; a representation unit, for calculating, for each mini-segment, at least two representative intensity values, respectively representing the at least two types of substances; a mapping unit, for mapping the region-of-interest according to the at least two types of substances, the mapping unit being associated with attenuation correction functionality to apply attenuation correction to each representative intensity value of at least a subset of the set of mini-segments.

According to further features in preferred embodiments of the invention described below, the apparatus further comprises a region definer, for defining the region-of-interest.

According to still further features in the described preferred embodiments the apparatus further comprises a clutter identifier, for identifying clutter picture-elements in the ultrasound image, to thereby define clutter-dominated mini-segments.

According to yet another aspect of the present invention there is provided a method of defining a region-of-interest in an ultrasound image being represented by a plurality of intensity values over a grid of picture-elements. The method comprises: transforming the grid into a polar representation defined by a radial direction represented by a plurality of range-gates and a circumferential direction represented by a plurality of angle-gates; for each angle-gate, integrating intensity values along the radial direction so as to provide a set of radial-integrated intensity values, and applying a thresholding procedure to the set of radial-integrated intensity values, so as to define a radial interval corresponding to the angle-gate; thereby defining the region-of-interest in the ultrasound image.

According to further features in preferred embodiments of the invention described below, the method further comprises performing at least one morphological operation subsequently to the thresholding procedure.

According to still further features in the described preferred embodiments the method further comprises calculating, for each picture-element of the plurality of picture-elements, a set-averaged intensity value, thereby providing an average intensity matrix representing the moving image, and using the average intensity matrix to correct the region-of-interest.

According to still further features in the described preferred embodiments the method further comprises correcting the region-of-interest using a high-derivative rejection procedure.

According to still another aspect of the present invention there is provided apparatus for defining a region-of-interest in an ultrasound image being represented by a plurality of intensity values over a grid of picture-elements. The apparatus comprises: a transformation unit, for transforming the grid into a polar representation defined by a radial direction represented by a plurality of range-gates and a circumferential direction represented by a plurality of angle-gates; an integration unit, for integrating intensity values along the radial direction so as to provide a set of radial-integrated intensity values for each angle-gate, the integration unit being associated with a thresholding unit to applying a thresholding procedure to the set of radial-integrated intensity values, so as to define a radial interval corresponding to the angle-gate.

According to further features in preferred embodiments of the invention described below, the apparatus further comprises a morphological unit being associated with a thresholding unit for performing at least one, morphological operation subsequently to the thresholding procedure.

According to still further features in the described preferred embodiments the apparatus further comprises an error correction unit for calculating, for each picture-element of the plurality of picture-elements, a set-averaged intensity value, thereby to provide an average intensity matrix representing the moving image, whereby the region-of-interest is corrected using the average intensity matrix.

According to still further features in the described preferred embodiments the error correction unit corrects the region-of-interest using a high-derivative rejection procedure.

The present invention successfully addresses the shortcomings of the presently known configurations by providing a method and apparatus for analyzing ultrasound images.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 31b shows sensitivity and specificity calculated for the distributions of

FIG. 31a using a thresholding procedure with different thresholds, according to various exemplary embodiments of the present invention.

DESCRIPTION OF THE PREFERRED EMBODIMENTS

Figure 1:
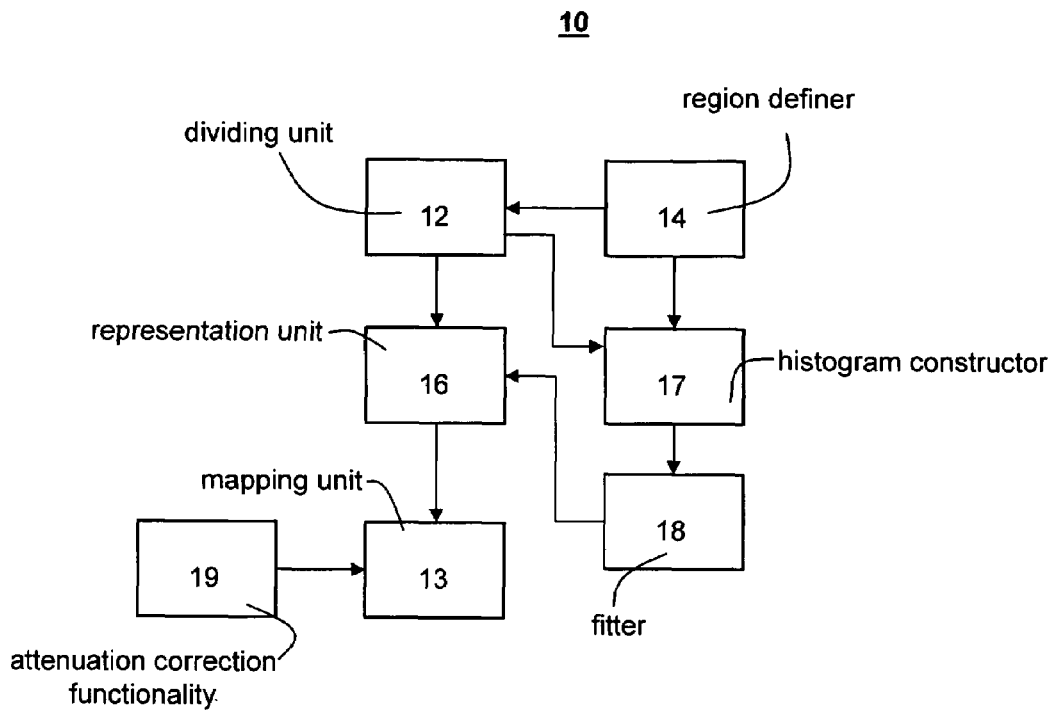
FIG. 1 is a schematic illustration of an apparatus for analyzing an ultrasound image of a target volume according to various exemplary embodiments of the present invention.

The present embodiments comprise a method and apparatus which can be used for analyzing and processing images. Specifically, the present embodiments can be used to analyze and improve the quality of still as well as moving images, including, without limitation, single-frame or cine-loop ultrasound images, obtained, e.g., during contrast echocardiography. Various exemplary embodiments of the invention can be used for quantitative assessment of myocardium perfusion by contrast echocardiography.

The principles and operation of method and apparatus according to the present embodiments may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

According to one aspect of the present invention there is provided an apparatus for analyzing an ultrasound image of a target volume, which apparatus is generally referred to herein as apparatus 10. The target volume includes two or more types of substances, and apparatus 10 maps a region-of-interest within the target volume according to the types of substances present therein. For example, in one embodiment, the target volume includes two types of substances: a tissue and an ultrasound contrast agent; in another embodiment, the target volume includes three types of substances: a first type of tissue (e.g., soft tissue), a second type of tissue (e.g., hard tissue) and a contrast agent. More than two types of tissues and more than one type of contrast agent are also contemplated.

It is expected that during the life of this patent many relevant ultrasound imaging techniques will be developed and the scope of the terms "ultrasound image" and "types of substances" is intended to include all such new technologies a priori.

In the preferred embodiments in which one or more of the substances is an ultrasound contrast agent, apparatus 10 preferably maps the region-of-interest according to concentration levels of the contrast agent(s), to allow quantitative assessment of local concentrations. This is particularly useful when the region-of-interest within the ultrasound image comprises the myocardium, e.g., the myocardial inner wall of the LV. Since local concentrations of the contrast agent in capillaries of the myocardium correlate well with myocardial perfusion, apparatus 10 can serve as a non-invasive and cost effective replacement for traditional myocardial perfusion assessment technologies such as SPECT and MRI.

The ultrasound image can be a single ultrasound image or a set of still-images, e.g., an ordered set (a series) of images forming a moving image. In various exemplary embodiments of the invention the ultrasound image comprises a set of still-images forming an ultrasound cine-loop image, or, more preferably, a contrast echocardiograph cine-loop image. A single-still image in a set of still-images is interchangeably referred to herein as a "frame".

The image is preferably arranged grid-wise in a plurality of picture-elements, e.g., pixels, arrangements of pixels, and the like.

The term "pixel" is sometimes abbreviated herein to indicate a picture element. However, this is not intended to limit the meaning of the term "picture element" which refers to a unit of the composition of an image.

According to a preferred embodiment of the present invention the grid is a rectangular (e.g., Cartesian) grid, but this need not necessarily be the case, as other grids (triangular, polar, etc.) can be defined. The set of images is preferably represented by a plurality of intensity values (e.g., grey-levels) over the grid.

Referring now to the drawings, FIG. 1 is a schematic illustration of apparatus 10, which comprises a dividing unit 12, for dividing a region-of-interest of the image to a set of mini-segments. According to a preferred embodiment of the present invention the number of mini-segments is larger than 20, more preferably larger than 30, even more preferably larger than 40, say 45 mini-segments. The region-of-interest can be embedded in the original image in a pre-processing stage, or it can be inputted to apparatus 10 (e.g., by a pre-processing unit or by the user). Optionally and preferably, apparatus 10 can comprise a region definer 14, for defining the region-of-interest. A representative example of a technique for defining the region-of-interest is provided hereinafter.

Apparatus 10 further comprises a representation unit 16 which calculates, for each mini-segment, a representative intensity value for each type of substance. Thus, each mini-segment is attributed with at least two representative intensity values, one for each type of substance. Typically, but not obligatorily, the representative intensity values for a given mini-segment are integrated backscatter (IBS) values, which can be calculated by averaging intensity values over the mini-segment. For example, when the target volume includes an ultrasound contrast agent, intensity values corresponding to the contrast agent can be averaged over the mini-segment to provide the first representative intensity value of the mini-segment, and intensity values corresponding to other substances the contrast agent can be averaged to provide the second representative intensity value.

The identification of intensity values corresponding to the different types of substances (e.g., contrast agent and tissue) can be obtained using the intensity histogram of the region-of-interest. A histogram of the region-of-interest refers to a graph showing the number of pixels in the region-of-interest at each different intensity value found in the region-of-interest. In other words, the histogram of the region-of-interest is a function, H(u), over the intensity domain which returns the number of pixels or an equivalent thereof (e.g., probability, percentage), for a given intensity, u.

Thus, according to a preferred embodiment of the present invention apparatus 10 comprises a histogram constructor 17, for constructing an intensity histogram characterizing the region-of-interest. The intensity histograms can be in any form known in the art such as a graph showing the number of matrix-elements of the respective matrix at each different intensity value found in therein. Alternatively, the histograms may be in a numeric form, e.g., two-dimensional arrays in which pairs of numbers represent intensity values and their corresponding occupation numbers in the matrices. According to a preferred embodiment of the present invention a specific intensity histogram is calculated for each mini-segment, thereby allowing the identification of different types of substances to be performed locally.

In various exemplary embodiments of the invention the intensity histogram of the region-of-interest is fitted to a sum of a plurality of localized functions, whereby intensity values corresponding to each type of substance are identified using the localized functions. Being used to fit the intensity histogram, the localized functions are also defined over the intensity domain. Thus, according to the presently preferred embodiment of the invention apparatus 10 comprises a fitter 18 which fits the histogram to a sum (e.g., a weighted sum) of localized functions.

As used herein "localized function" refers to any function having a local support and which is significantly suppressed far (say, at a distance of 8–12 widths of the local support) from the local support. A localized function is generally characterized by a center and a width. Representative examples of localized functions include, without limitation, a Gaussian function, a Lorentzian function, a hyperbolic secant function (also known as sech), a logistic distribution and the like. Additionally, the localized function can be represented as a series or an integral of other functions. For example, in this embodiment, the localized function can be a Fourier transform, a wavelet transform and the like.

The location (over the intensity domain) and width of each localized function is determined during the fitting procedure, which can be performed in any way known in the art for minimizing an appropriate merit function such as, but not limited to, steepest descent, Newton or combination thereof.

The use of localized function to fit the intensity histogram is disclosed in International Patent Application, Publication No. WO 2005/065028, the contents of which are hereby incorporated by reference. In this application, the intensity histogram of the LV cavity and the myocardium, but in the absence of contrast agents, is fitted to a sum of three localized functions, were a first function, localized at low intensities, describes the LV cavity, a second function, localized at medium intensities, describes low-intensity pixels within the cardiac muscle, and a third function, localized at high intensities, describes high-intensity pixels within the cardiac muscle.

The number and characteristics (width, height, location in the intensity domain) of the localized functions used according to the present embodiments depend on the region-of-interest, types of substances and type of ultrasound image. For example, when the LV cavity is excluded from the region-of-interest, there is no need to define a localized function for the LV cavity. This embodiment is particularly useful when the analysis of the ultrasound image is for the purpose of determining myocardial perfusion, whereby the region-of-interest comprises the myocardium but is substantially devoid of the LV cavity.

As used herein, a region-of-interest which is substantially devoid of the LV cavity refer to a region-of-interest in which at least X % of its area includes tissues {other cavities also reduce the overall performance}, where X is 85, more preferably 90, even more preferably 95.

For such region-of-interest, the number of localized functions can be two or more, depending, as stated, on the type of ultrasound image and substances present in the target volume.

For example, when the target volume includes one contrast agent, and the ultrasound image includes, beside the typical high intensities of the contrast agent, also, low-intensity tissue pixels and high-intensity tissue pixels, three localized functions can be used. Thus, a first function, localized at low intensities, describes low-intensity tissue pixels, a second function, localized at medium intensities, describes high-intensity tissue pixels, and a third function, localized at high intensities, describes pixels corresponding to the contrast agent. For example, suppose that H(g) is fitted to the sum of three localized functions, $G_1$, $G_2$ and $G_3$, whereby $G_1$ intersects with $G_2$ at $g=g_1$ and $G_2$ intersects with $G_3$ at $g=g_2$, where $g_2>g_1$. Suppose further than the intensity range of H(g) is from $g=g_{min}$ to $g=g_{max}$ (for 8-bit image $g_{min}$ can be 0 and $g_{max}$ can be 255). Then, according to the presently preferred embodiment of the invention low-intensity tissue pixels are identified as pixels with intensity value from $g_{min}$ to $g_1$, high-intensity tissue pixels are identified as pixels with intensity value from $g_1+1$ to $g_2$, and pixels corresponding to the contrast agent are identified as pixels with intensity value from $g_2+1$ to $g_{max}$.

Prior to the identification of the different pixels, the intensity histogram can be enhanced, e.g., by histogram equalization, histogram specification and the like. The intensity histogram can also be subjected to further operations such as reduction or expansion. Additionally, a low-pass filter (e.g., a binomial filter or a Gaussian filter) can be applied on at least a portion of the intensity histogram. Preferably, the low-pass filter is applied near the intersecting points between the localized functions so as to minimize information loss.

The localized functions can also be used for calculating the representative intensity value for the types of substances. In various exemplary embodiments of the invention the representative intensity values are the location of the centers of localized functions. For example, suppose that a particular mini-segment is characterized by a histogram H(g) which is fitted to sum of three localized functions, $G_1$, $G_2$ and $G_3$, respectively describing low-intensity tissue pixels, high-intensity tissue pixels and contrast agent pixels. The representative intensity value of the tissue can be the location of the center of $G_1$ or $G_2$, more preferably $G_1$ and the representative intensity value of the contrast agent can be the location of the center of $G_3$.

The localized functions can also be tailored to describe, or identify, clutter pixels. In this embodiment, the localized functions can comprise, for example, a first function, localized at low intensities (e.g., from $g_{min}$ to $g_1$), which describes tissue pixels, a second function, localized at medium intensities (e.g., from $g_1+1$ to $g_2$), which describes pixels corresponding to the contrast agent, and a third function, localized at high intensities (e.g., from $g_2+1$ to $g_{max}$), which describes clutter pixels.

As will be appreciated by one of ordinary skill in the art the terms "low", "medium", "high", used in conjunction with the localization of the localized functions, are defined relatively to the overall span of the intensity histogram. Although the location and width of each localized function is determined during the fitting procedure, a simplification of the fitting procedure can be achieved by introducing one or more constraints on the location and/or width of one or more of the localized functions. For example, without limiting the scope of the present invention to any specific set of constraints, the first localized function can be centered between, say, the 10th and the 30th percentile of the intensity histogram, the second localized function can be centered between, say, 40th and the 60th percentile of the intensity histogram, and the third localized function can be centered between, say, the 70th and the 90th of the intensity histogram.

Several ultrasound imaging techniques such as the CCI technique described in the Background section above or pulse inversion, which is a special case of CCI in which two pulses with opposite phase are used, provide ultrasound images in which the echoes from tissue in the target volume are suppressed. In these techniques, although the target region contains both tissue substances and ultrasound contrast agent, only a small fraction of the information present in the stream of data representing the ultrasound image is attributed to tissue substance.

When the echoes from the tissue are suppressed, two localized functions can be used in the fitting procedure of the intensity histogram. For example, H(g) can be fitted to the sum of two localized functions, $G_1$ and $G_2$, whereby $G_1$ intersects with $G_2$ at $g=g_1$. The function which is localized at low intensities, can describe pixels corresponding to noise including residuals of echoes from tissue, whereby pixels having intensity from $g_{min}$ to $g_1$ are identified as noise or residuals of echoes. Similarly, the function which is localized at high intensities, can describe pixels corresponding to the contrast agent, and which are identified as having intensity from $g_1+1$ to $g_{max}$. Again, the terms "low" and "high" are relative terms which depend on the overall span of the intensity histogram. A typical location of the first localized function is between the 10th and the 30th percentile of the intensity histogram, and a typical location of the second localized function is between the 60th and the 90th percentile of the intensity histogram.

Oftentimes, the number of pixels within a single mini-segment in a single frame is rather low. In order to obtain better results, the intensity histogram for each mini-segment and each frame can be calculated as follows. First, a temporal averaging is applied over the set of still-images. This can be done, for example, by averaging the intensity value of each pixel with the intensity values of the corresponding pixels in the preceding and following frames. Second, the intensity histogram for each mini-segment and frame, can be calculated using a larger bin size (e.g., bin size of 2) to support the small datasets. Third, a smoothing procedure (e.g., cubic Spline) can be applied for each intensity histogram. The smoothing procedure can be a two-dimensional procedure or it can be a one-dimensional procedure performed, e.g., firstly for each frame over different mini-segments and secondly for each mini-segment over different frames.

The clutter pixels can also be determined by a thresholding procedure, in which the intensity-value of each pixel is compared to a predetermined threshold $T_R$, whereby pixels having intensity-values larger than $T_R$ are marked as clutter-pixels. The threshold $T_R$ can be a constant threshold, or it can be extracted from intensity information, such as, but not limited to, the intensity histogram of the ultrasound image or the intensity histogram of the region-of-interest. For example, in various exemplary embodiments of the invention $T_R$ is set to the k-th percentile of the intensity histogram of the image, where k is from about 60 to about 95.

In another alternative embodiment, the clutter pixels are determined by the method disclosed in International Patent Application, Publication No. WO 2005/065028.

Apparatus 10 further comprises a mapping unit 13, for mapping the region-of-interest according to the types of substances. Mapping unit is associated with attenuation corrections functionality 19 which applies attenuation corrections to each representative intensity value of one or more of the mini-segments. According to a preferred embodiment of the present invention the mini-segments are categorized to clutter-dominated mini-segments and mini-segments which are substantially clutter-free. Clutter-dominated mini-segments are preferably defined as mini-segments having at least a predetermined portion (e.g., 50%, 60%, 70% or more) of clutter picture-elements. When the ultrasound image comprises a set of still-images, an averaging procedure over the set (median, mean, weighted average, trimmed mean, reciprocal of sum of reciprocals, Hodges-Lehmann estimate, etc.) can be used prior to the definition of clutter-dominated mini-segments. For example, denoting the percentage of clutter picture-elements in the s-th mini-segment of the p-th element of the set by $R_{s,p}$, the thresholding procedure for defining the clutter-dominated mini-segments can be applied for each s on the median of $R_{s,p}$ over p.

The attenuation corrections can then be applied to mini-segments in which the portion of clutter picture-elements is below this predetermined portion. Alternatively, the attenuation corrections can be applied both for clutter-dominated mini-segments and for other mini-segments. Still alternatively, two schemes of attenuation corrections can be applied: one scheme to clutter-dominated mini-segments and one scheme to other mini-segments.

In any event, the procedure in which the different types of substances are identified for the mapping is performed per mini-segment. In various exemplary embodiments of the invention a different identification procedure is performed for clutter-dominated mini-segments and a different identification procedure is performed for mini-segments which are substantially clutter-free.

When the ultrasound image is a single image, the attenuation corrections applied to the representative intensity value are preferably stationary, but can have spatial dependence. When the ultrasound image is a set of still-images forming a moving image, the attenuation corrections can be stationary (with spatial dependence), or both spatial dependent and time-dependent. In the embodiment in which stationary attenuation corrections are applied, mini-segments describing the same or similar portions of the target volume are applied with the same attenuation corrections. In the embodiment in which time-dependent attenuation corrections are applied the attenuation corrections can differ from one still-image to the other (time dependence) and from one mini-segment to the other (spatial dependence).

The ultrasound image is typically obtained from an ultrasound imaging system which transmits ultrasonic waves into the target volume and receives reflected waves from different objects or materials present in the target volume. The attenuation corrections are calculations of the attenuation of the ultrasonic wave while propagating through the target volume.

Typically, there are three mechanisms which attenuate the ultrasonic wave: (i) geometrical distribution of the wavefront; (ii) absorption or scattering from substances along the propagation path; and (iii) non ideal reflection from the imaged substances. Thus, denoting the initial power of the ultrasonic wave by $P_T$, the power of the received wave, $P_R$, is given by:

$$P_R = G_R A_1 A_2 A_3 \cdot P_T, \qquad (EQ. 1)$$

where $G_R$ is the effective gain of the ultrasound imaging system and $A_1$, $A_2$, $A_3$, are the attenuations due to the above three mechanisms.

Considering the imaging process in more details, a spherical ultrasonic wave is transmitted from the transducer. In the absence of any impedance changes, the energy carried by the wave is reduced as a function of the distance r from the transducer according to the inverse square law. Additionally, the ultrasonic wave experiences cumulative attenuation due to interactions with different substances (tissue, contrast agent) along the propagation path. The wave impinges on elements in the target region and being reflected therefrom. Once reflected, the ultrasonic wave changes its direction but continues to propagate hence to be attenuated again both according to the inverse square law and due to interaction with the substances.

For a volume element $V(R, \theta)$ centered at a distance R and angle $\theta$ with respect to the ultrasound transducer's centerline, the different contributions to the attenuation can be written as follows:

$$A_1 = (1/r^2)^2 = 1/r^4; \qquad (EQ. 2)$$

$$A_2 = \exp\left[-\int_0^R 2\lambda(r, \theta) dr\right]; \text{ and} \qquad (EQ. 3)$$

$$A_3 = \sigma_k, \qquad (EQ. 4)$$

where $\lambda$ is the local attenuation coefficient, and $\sigma_k$ is the total reflection cross-section for the ultrasonic wave to be reflected from the k-th substance within the elementary volume (e.g., $\sigma_1$ for tissue and $\sigma_2$ for contrast agent).

It is to be understood the integral sign appearing in Equation 3 and the equations that follow is not intended to limit the scope of the present invention to mathematical operations on continuous intervals, and that non-continuous (e.g., discrete) intervals are also contemplated. For non-continuous intervals, the integral operation should be replaced by summation. For example, when the distance r is defined on a discrete set $\{r_i\}$, i=1, 2, . . . , n, with $r_1=0$ and $r_n=R$, an integration over r should be understood as summation over $r_i$:

$$\int_0^R dr \to \sum_{i=1}^n r_i \qquad (EQ. 5)$$

Ideally, knowing the value and/or functional dependence of $\lambda$ and $\sigma$, and knowing the effective gain of the ultrasound imaging system, one can calculate the attenuation corrections. In practice, however, $\lambda$ and $\sigma$ are not known and some modeling is required to calculate $P_R$.

One model which can be employed is known as Time Gain Control (TGC). TGC calculations are known in the art, and are typically employed by the ultrasound imaging system. TGC typically includes corrections for the attenuation in substances along the propagation path, while neglecting the two-way spherical wave decay according to the inverse square law. Traditional TGC is performed under the assumption that $\lambda$ changes mainly with the distance r, and approximates the r-dependence of $\lambda$ by dividing the maximal distance from the transducer to small swaths of equal size, where the attenuation is constructed by adding the (equal) contributions of the individual swaths. The contribution of a single swath can be selected by the operator.

The TGC attenuation correction is given by:

$$\exp\left[\int_0^R C(r) dr\right] \qquad (EQ. 6)$$

where C(r) is called the TGC correction coefficient. The mismatch between the TGC correction and the actual attenuation along the path is therefore given by:

$$\exp\left[\int_0^R (C(r) - 2\lambda(r, \theta)) dr\right]. \qquad (EQ. 7)$$

Once the traditional TGC is applied, the signal typically has a very wide dynamic range, which is a result of the difference $C(r)-2\lambda(r,\theta)$ and the enormous difference between the reflection cross-sections of different types of substances (e.g., bones, soft tissue, blood, contrast agent). In order to produce images with an acceptable dynamic range of intensity levels, a special Brightness Transfer Function (BTF) is further applied to the signal. Typically, the transfer function is logarithmic for weak signals and saturates so as to produce the maximal allowable videointensity $g_{max}$ at strong signals.

For strong signals, the following expression for $P_R$, is obtained using Equations 1–7 above:

$$P_R = \frac{P_T G_R \sigma_k}{R^4} \exp\left[\int_0^R (C(r) - 2\lambda(r, \theta)) dr\right]. \qquad (EQ. 8)$$

For weak signals, for which the BTF is logarithmic, the intensity level, I, is proportional to the logarithm of $P_R$:

$$I(R, \theta) = B + \log(\sigma_k(R, \theta)) + \qquad (EQ. 9)$$
$$\log(P_T G_R) - 4\log(R) + \int_0^R (C(r) - 2\lambda(r, \theta)) dr$$

where B is a parameter which describes the overall gain due to the BTF and which depends on the type of BTF employed by the ultrasonic imaging system.zzz In various exemplary embodiments of the invention the mismatch in Equation 7 (which is manifested in the last term of Equation 9) is corrected for by adding a coarse correction factor, $A_s$, which is preferably calculated for each mini-segment s of the image. In the embodiments in which the ultrasound image is a set of still-images, $A_s$ preferably comprises the difference between a maximal median intensity value over the set of still-images, the median being calculated over the different frames p, and a median intensity value of mini-segment s:

$$A_s = \text{Max}_s\{\text{Median}_p(t_{s,p})\} - \text{Median}_p(t_{s,p}) \qquad (EQ. 10)$$

where $t_{s,p}$ is the intensity level corresponding to the tissue in the s-th mini-segment in the p-th frame (the p-th element of the set of still-images).

Equation 10 thus describes a stationary procedure for calculating attenuation correction. This procedure is based on the assumption that there are only small variations in the temporal average (over an integral number of heartbeats) of the tissue's reflection cross-section per unit volume over the myocardium (excluding reflections from the contrast agent). This assumption is logical because the entire myocardium is essentially of the same tissue type. Although local fiber directionality imposes temporal variations of tissue's reflection cross-section, these variations are cancelled or significantly reduced in the temporal averaging.

In the embodiments in which the attenuation corrections vary over set, the attenuation corrections are applied using a time-dependent correction factor to each representative intensity value of a respective mini-segment. This can be done in more than one way. In one embodiment, the time-dependent correction factor for each mini-segment is interpolated from $A_s$ using the average distance between the respective mini-segment and the transducer. In other words, this embodiment comprises a two-step procedure in which in a first step $A_s$ is calculated for each mini-segment and in a second step $A_{s,p}$ is calculated by updating $A_s$ for each frame p according to the distance between s and the transducer.

In another embodiment, particularly useful for ultrasound images in which the echoes from tissue in the target volume are suppressed, there is a predetermined functional dependence between the time-dependent correction factor and the concentration of the contrast agent. More specifically, according to the presently preferred embodiment of the invention $\sigma_k$ and/or $\lambda$ are each independently a function (e.g., a linear function) of the concentration level, $\rho$, of the contrast agent in volume V:

$$\log[\sigma_k(R, \theta)] = f[\rho(R, \theta)] \quad \text{(EQ. 11)}$$

$$\log[\lambda(R, \theta)] = g[\rho(R, \theta)] \quad \text{(EQ. 12)}$$

where $f$ and $g$ are predetermined functions.

Substituting Equations 11 and 12 into Equation 9, one obtains:

$$I(R, \theta) = \quad \text{(EQ. 13)}$$
$$f(\rho(R, \theta)) + \log(P_T G_R) - 4\log(R) + \int_0^R (C(r) - 2g(\rho(R, \theta)))dr$$

The only unknown parameter in Equation 13 is $\rho(R,\theta)$. In each frame, $\rho(R,\theta)$ can be evaluated for each sampling-volume separately. For example, for each ultrasound beam position defined by an interval $[\theta, \theta+d\theta]$, $\rho$ can be calculated for a series of range-gates, $R_0, R_1, R_2, \ldots$, where the calculation at each range-gate makes use of the values of $\rho$ in the previous range-gates. The typical resolution in R (the difference between successive range-gates) is from 1 to about 10 picture elements (e.g., 2 or 3 picture elements), and the typical resolution in $\theta$ (width of the above interval) is from about 0.5 to about 5 degrees (e.g., 1 or 2 degrees).

As used herein "about" refers to ±10%.

When the target-area includes the myocardium, the concentration level of the contrast agent is indicative of the local myocardial perfusion. Thus, the present embodiments successfully map the region-of-interest according to perfusion levels within the left ventricle.

In the preferred embodiments in which $f$ and $g$ are linear functions, Equations 11 and 12 can be reduced to:

$$\log[\sigma_k(R, \theta)] = \alpha \cdot \rho(R, \theta) \quad \text{(EQ. 14)}$$

$$\log[\lambda(R, \theta)] = \beta \cdot \rho(R, \theta) \quad \text{(EQ. 15)}$$

and the corresponding form of Equation 9 can be solved analytically, e.g., $$\rho(R_0, \theta) = \frac{I(R_0, \theta) - \log(P_T G_R) + 4\log(R_0)}{\alpha}, \quad \text{(Eq. 16)}$$

$$\rho(R_1, \theta) = \frac{I(R_1, \theta) - \log(P_T G_R) + 4\log(R_1) - C(R_0) + 2\beta \cdot \rho(R_0, \theta)}{\alpha}.$$

As stated, apparatus 10 can comprise a region definer 14 for defining the region-of-interest. Region definer 14 can define the region-of-interest using the technique disclosed in International Patent Application, Publication No. WO 2005/065028. Alternatively and preferably, the region-of-interest is defined by integrating intensity values along radial directions as further detailed hereinbelow.

Figure 2:
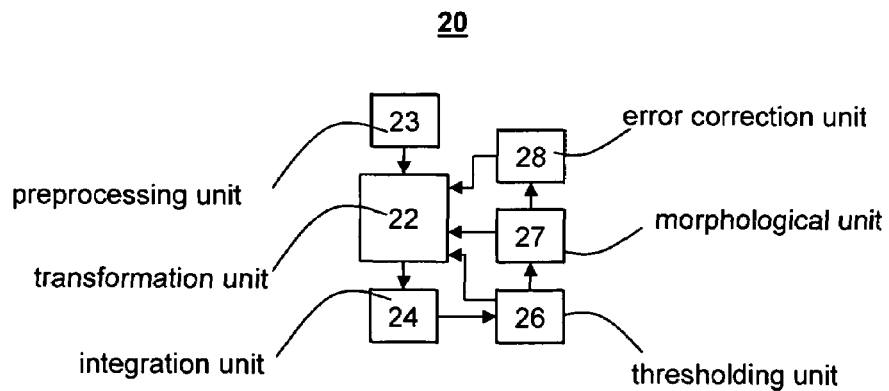
FIG. 2 is an apparatus for defining a region-of-interest in an ultrasound image according to various exemplary embodiments of the present invention.

Reference is now made to FIG. 2 which is a simplified illustration of an apparatus 20 for defining a region-of-interest in an ultrasound image, according to various exemplary embodiments of the present invention. The ultrasound image is preferably arranged grid-wise in a plurality of picture-elements and can be of any of the aforementioned forms (still image, moving image, cine-loop image, etc.). Apparatus 20 can be incorporated in apparatus 10 above to enact region definer 14.

Apparatus 20 comprises a transformation unit 22, for transforming the grid into a polar representation defined by a radial direction represented by a plurality of range-gates and a circumferential direction represented by a plurality of angle-gates. Transformation unit can also be used for restoring the original representation of the image, once the region-of-interest is defined. The transformation of images to and from polar representation can be done in any way known in the art, see, e.g., WO 2005/065028.

The range-gates and angle-gates of the polar representation represent the axial and lateral resolution of the polar representation. In other words, the range-gates and angle-gates form a discrete system of coordinates. Each pixel is thus represented by the pair of numbers, one being selected from a discrete set of range-gates and the other being selected from a discrete set of angle-gates. The typical difference between successive range-gates and successive angle-gates is, as stated, from 1 to about 10 picture elements for the range-gates, and from about 0.5 to about 5 degrees for the angle-gates.

As will be appreciated by one ordinarily skilled in the art, the polar representation can comprise a radial matrix, R, storing the distance of a respective picture-element from the origin of the polar coordinate system, and an angular matrix, $\theta$, storing the angle of a respective picture-element relative to one direction in the original coordinate system. The origin can be a user-defined origin, or it can be determined automatically, e.g., as disclosed in WO 2005/065028.

For example, suppose that the grid of pixels of the ultrasound image is a rectangular grid. A pixel, located at the m-th row and n-th column of the rectangular grid, is represented in the new polar representation by the pair (R(m, n), $\theta$(m, n)), where R(n, m) and $\theta$(n, m) are two matrix-elements of the matrices R and $\theta$.

When the ultrasound image comprises a set of still-images, the transformation is preferably performed globally for all the still-images of the set.

The definition of the region-of-interest can be preceded by one or more preprocessing operations, for improving the efficiency of the clustering procedure, minimizing misclassifications and/or improving the quality of the images. Thus, according to a preferred embodiment of the present invention, apparatus 20 comprises a preprocessing unit 23, for performing at least one preprocessing operation. Many preprocessing operations and combination thereof are contemplated, representative examples include, without limitation, removal, replacement and interpolation of picture-elements, either temporarily or permanently. Typically, the preprocessing is directed at the application of one or more low-pass filters, so as to remove strong noise.

Apparatus 20 further comprising an integration unit 24, for integrating intensity values along the radial direction. As stated, the term "integration", when applied to a non-continuous (e.g., discrete) interval should be understood as summation. Unit 24 preferably integrates, for each angle-gate, along the radial direction from a predetermined range-gate (say, the origin) to each range-gate along the radial direction. A set of radial-integrated intensity values is thus provided for each angle-gate.

According to a preferred embodiment of the present invention integration unit 24 is associated with a thresholding unit 26 which applies a thresholding procedure to the radial-integrated intensity values, so as to define, for each angle-gate, $\theta'$, a radial interval, $\tilde{R}(\theta')$. The radial interval $\tilde{R}(\theta')$ can then be defined as the value of the range-gate for which the thresholding procedure yields a "TRUE" value or any equivalent thereof.

For example, denoting the radial-integrated intensity value corresponding to range-gate r' and angle-gate, $\theta'$, by $C_{\theta'}(r')$, the thresholding procedure can be used to obtain a vector $B_{\theta'}(r')$ whose elements assume Boolean values (say, "TRUE" and "FALSE", "1" and "0", etc.) for each range-gate r', as follows:

$$B_{\theta'}(r') = [C_{\theta'}(r') < T_R], \qquad \text{(EQ. 17)}$$

where $T_R$ is a predetermined threshold. $\tilde{R}(\theta')$ can then be defined as the first value of r' for which $B_{\theta'}(r')$="TRUE". Typically, the value of the threshold $T_R$, is from about 0.5 to about 0.7.

Prior to the identification of $\tilde{R}(\theta')$, B can be subjected to one or more morphological operations, such as erosion and dilation [to this effect see R. C. Gonzalez and R. W. Woods, "Digital Image Processing", pp. 518–548, Addison-Wesley Publishing Company, 1992]. The morphological operations can be performed by a morphological unit 27. Broadly speaking, morphological operation involved the passing of a convolution kernel, also known as the structuring element, over the Boolean vector, and, based upon the convolution between the structuring element and the Boolean vector, determining whether or not to change the polarity of a particular element of the vector. The morphological dilation operation generally thickens regions found to be significant, while the morphological erosion operation generally eliminates edges.

When the ultrasound image comprises a set of still images, the integration, thresholding and morphological operations are preferably performed for each still-image separately. As will be appreciated by one of ordinary skill in the art, in this embodiment, C, B and $\tilde{R}$ carry an additional frame-index, p. Thus, the set of radial-integrated intensity values is denoted $C_{p,\theta'}(r')$, the Boolean vector is denoted $B_{p,\theta'}(r')$ and the radial interval is denoted $\tilde{R}(p,\theta')$.

According to a preferred embodiment of the present invention apparatus 20 further comprises an error correction unit 28 for correcting the radial interval. Typically, the error-correction process comprises one or more procedures which detect and replace missing or erroneous elements in $\tilde{R}$. When the ultrasound image comprises a set of still images the error correction process preferably comprises the calculation of set-averaged intensity value for each picture-element. Specifically, an average intensity matrix whose matrix-elements represent picture-elements of the ultrasound image. Each matrix-element of the average intensity matrix is calculated by averaging the intensity values of the respective picture-element over the set. The error correction can also comprise a procedure in which sections in $\tilde{R}$ which are characterized by high-derivatives are identified and rejected. For example, elements of $\tilde{R}$ in which the (discrete) derivative is higher than a predetermined positive threshold or lower than a predetermined negative threshold can be marked. Subsequently, sections between high positive and high negative derivatives can be removed from $\tilde{R}$ or declared invalid. The discrete derivative can be calculated, e.g., by:

$$\frac{d\tilde{R}}{d\theta} = \frac{\tilde{R}(\theta_{n+1}) - \tilde{R}(\theta_n)}{\theta_{n+1} - \theta_n}, \qquad \text{(EQ. 18)}$$

the predetermined positive threshold can be of the order of a few, say, 6–10, range-gates, and the predetermined negative threshold can be approximately the same with opposite sign. Typical thresholds are +8 range-gates for the positive threshold and −7 range-gates for the negative threshold.

The error correction process can also comprise an additional thresholding procedure in which more than one threshold is used for defining the radial interval. For example, the additional thresholding procedure can utilize two thresholds, e.g., $T_L$ for low-intensities and $T_H$ for high-intensities, to provide two Boolean vectors and, consequently, two radial intervals, $R_L$ and $R_H$, which in turn can be used for constructing the corrected radial interval. The corrected radial interval can be obtained by combining $R_L$ and $R_H$ by maximization, averaging or any other suitable method.

Figure 3:
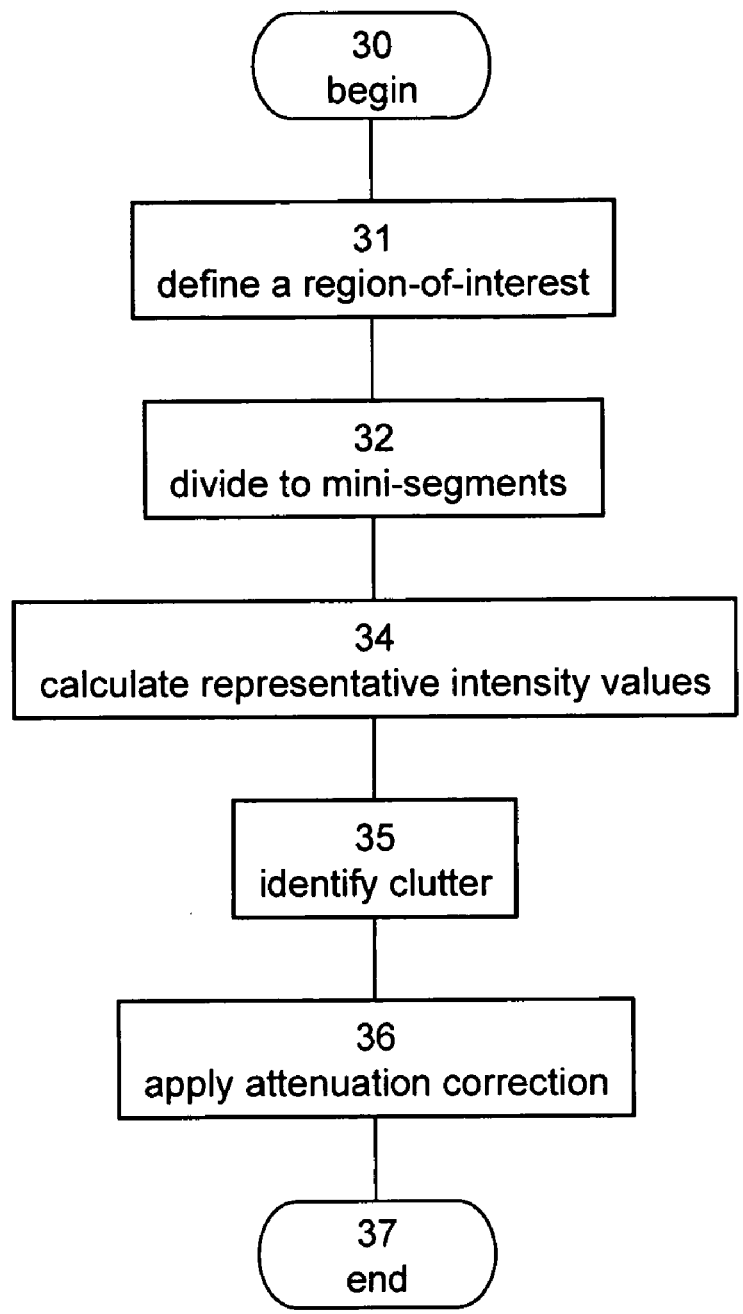
FIG. 3 is a flowchart diagram of a method for analyzing an ultrasound image of a target volume according to various exemplary embodiments of the present invention.

Reference is now made to FIG. 3 which is a flowchart diagram of a method for analyzing an ultrasound image of a target volume, according to various exemplary embodiments of the present invention. The ultrasound image can be of any of the aforementioned forms.

It is to be understood that, unless otherwise defined, the method steps described hereinbelow can be executed either contemporaneously or sequentially in many combinations or orders of execution. Specifically, the ordering of the flowchart of FIG. 3 is not to be considered as limiting. For example, two or more method steps, appearing in the following description or in the flowchart of FIG. 3 in a particular order, can be executed in a different order (e.g., a reverse order) or substantially contemporaneously.

The method begins at step 30 and optionally and preferably continues to step 31 in which a region-of-interest is defined. The region-of-interest can be defined, for example, using apparatus 20 above. A representative example of a method for defining the region-of-interest is provided hereinafter in the description accompanying FIG. 4. The regionof-interest, as stated, can also be embedded in the original image in a pre-processing stage, or it can be inputted, e.g., by the user. The method continues to step 32 in which the region-of-interest is divided to a set of mini-segments, as further detailed hereinabove. The method continues to step 34 in which two or more representative intensity values for each mini-segment are calculated. The representative intensity values are, preferably, average intensity values as further detailed hereinabove. The method continues to optional step 35 in which clutter is identified as further detailed hereinabove. In step 36 of the method the attenuation corrections are applied for each representative intensity value, as further detailed hereinabove.

The method ends at step 37.

Figure 4:
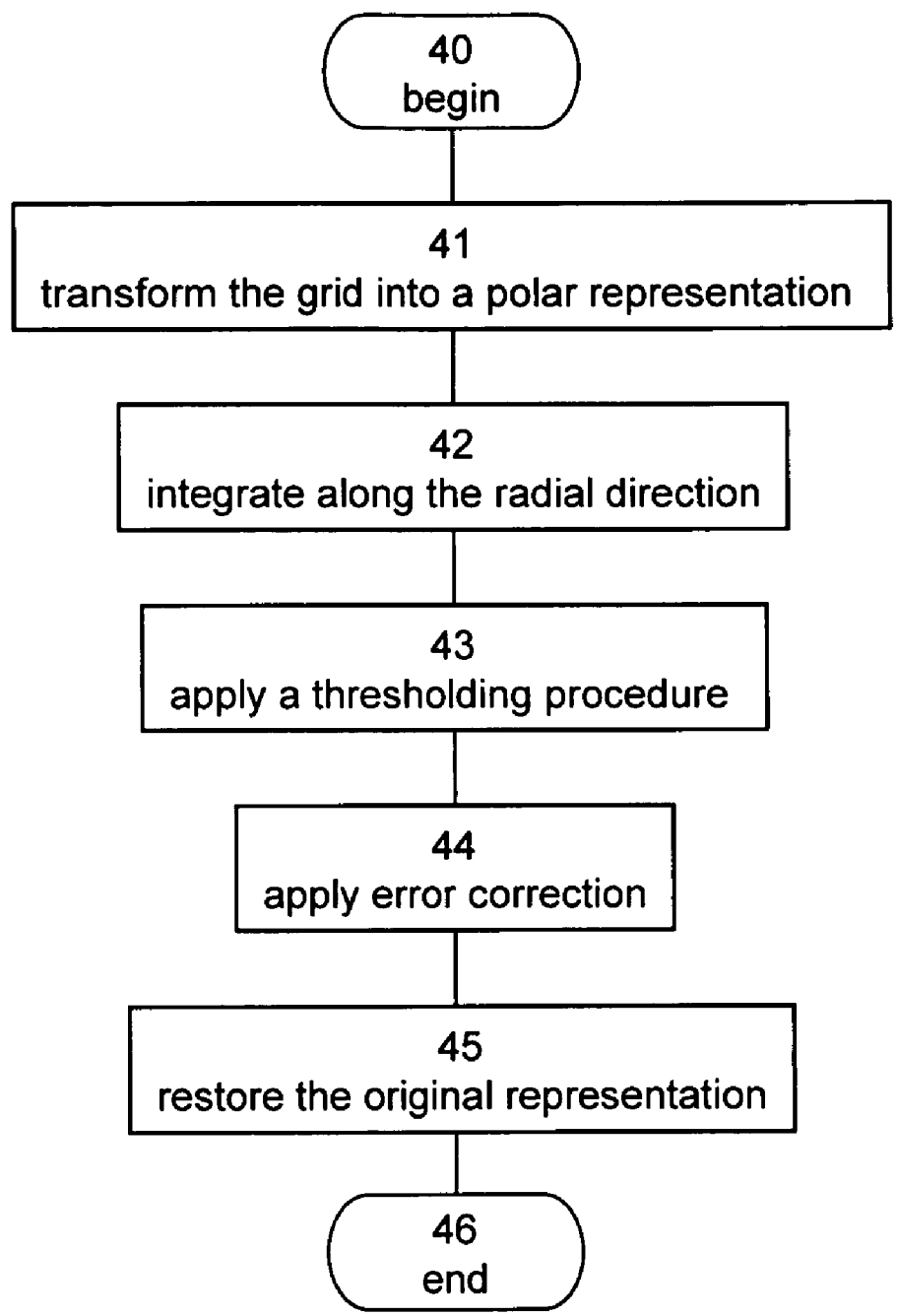
FIG. 4 is a flowchart diagram of a method for defining a region-of-interest in an ultrasound image according to various exemplary embodiments of the present invention.

Reference is now made to FIG. 4 which is a flowchart diagram of a method for defining a region-of-interest in an ultrasound image, according to various exemplary embodiments of the present invention. The ultrasound image can be of any of the aforementioned forms. As stated hereinabove, the method steps described hereinbelow can be executed either contemporaneously or sequentially in many combinations or orders of execution, and the ordering of the flowchart of FIG. 4 is not intended to be limiting.

The method begins at step 40 and continues to step 41 in which the grid is transformed into polar representation, as further detailed hereinabove. The method continues to step 42 in which, for each angle-gate, intensity values are integrated along the radial direction, as further detailed hereinabove. The method continues to step 43 in which a thresholding procedure is applied so as to define the radial interval as further detailed hereinabove. In various exemplary embodiments of the invention the method continues to step 44 in which an error correction process is applied to the radial interval as further detailed hereinabove. Once the region-of-interest is defined, the method can continue to step 45 in which the original coordinate system is restored by inverting the transformation used for obtaining the polar representation. For example, when the original coordinate system is rectangular, the polar representation is transformed to rectangular representation.

The method ends at step 46.

Additional objects, advantages and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions illustrate the invention in a non limiting fashion.

Example 1

Detection of the Endocardial Boundary in Contrast Echocardiography

The teachings of the present embodiments were employed for detecting the endocardial boundary in cine-loop ultrasound images produced during contrast echocardiography in low mechanical index scenario. The cine loop was provided in Cartesian coordinate system. As further demonstrated below, the application of the teachings of the present embodiments allows an automatic outlining of the endocardial boundary to a high level of accuracy, although the signal-to-noise ratio of the image was considerably low.

Materials and Methods

Image Processing

The main obstacle in the automatic detection of the LV endocardial boundary in the low mechanical index scenario is the low signal-to-noise ratio which characterizes the image. Basically, the reduction of strong noise and speckle by low-pass filtering may be performed by temporal filtering and/or spatial filtering in different directions. Strong temporal filtering would cause the calculated boundaries to be non-responsive to the temporal variability in the boundary location. Strong spatial filtering using conventional methods, based on two-dimensional kernels (either linear or non-linear filtering), would reduce the visibility of the endocardial boundary, since both the LV cavity and the myocardium are opacified.

In the present example, the region-of-interest was defined by employing the method steps of FIG. 4. Integration was performed in directions approximately perpendicular to the boundary of the endocardium. The integration scheme was found to be effective for both additive and multiplicative noise, and allowed the minimization of spatial as well as temporal filtering. Filtering was later applied on the outlines of the region-of-interest for further corrections. As will be appreciated by one ordinarily skilled in the art, the application of spatial and temporal filtering on the outline and not on the echocardiographic images is advantageous because there is no reduction of the endocardial boundary visibility. The method successfully detected the endocardial boundary which was observed as a dark stripe between the bright LV cavity and the bright myocardium. Following is a detailed description of the image processing used for defining the region-of-interest.

The transformation to polar representation (step 41 in the flowchart diagram of FIG. 4) was preceded by a preprocessing step in which two consecutive two-dimensional low-pass filters were applied in order to reduce the noise level. A first low-pass filter was a linear filter which was applied according to the following equation:

$$S_p = F_p * \frac{1}{9}\begin{pmatrix} 1 & 1 & 1 \\ 1 & 1 & 1 \\ 1 & 1 & 1 \end{pmatrix}, \qquad (\text{EQ. 19})$$

where $F_p$ is the original cine-loop frame, and $S_p$ is the smoothed cine-loop frame.

A second filter was a median filter, using a 3×3 kernel. The cine-loop frame after application of both filters is denoted $S_p'$. The use of median filter allowed to preserve edges, and the use of linear filter allowed handling strong noise, because linear filters produce mean values over small regions, which mean values can differ from the local values.

Figure 5:
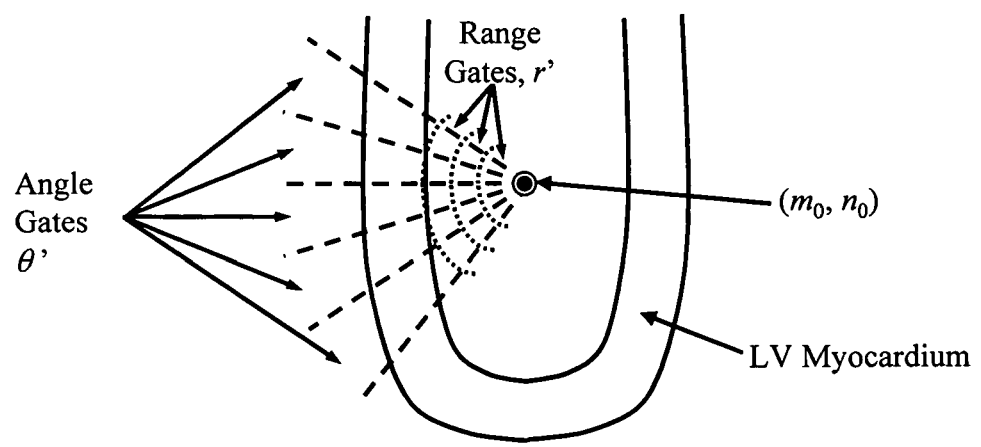
FIG. 5 is a schematic illustration of a polar representation of the left ventricle according to various exemplary embodiments of the present invention.

FIG. 5 schematically illustrates the polar representation of the ultrasound image. The transformation to polar representation was applied globally to all the frames of the cine loop. The polar representation was defined with respect to a pre-selected origin, which, in Cartesian coordinate system is denoted herein ($m_0$, $n_0$), where the left number is the row index and the right number the column index. For each pixel (m, n) in the Cartesian coordinate system, the distance r and the angle θ with respect to the user-defined reference point were calculated according to the following transformation:

$$r(m, n) = \sqrt{(m - m_0)^2 + (n - n_0)^2} \quad \text{(EQ. 20)}$$

$$\theta(m, n) = \arctan\left(\frac{n - n_0}{m - m_0}\right).$$

The values of r and θ were digitized, to obtain the range-gates, denoted r', and angle-gates, denoted θ'. The following digitization procedure was employed:

$$r'(m, n) = \left[\frac{r(m, n)}{\Delta r}\right] + 1 \quad \text{(EQ. 21)}$$

$$\theta'(m, n) = \left[\frac{\theta(m, n)}{\Delta \theta}\right] + \left[\frac{\pi}{\Delta \theta}\right] + 1$$

where the range-resolution, Δr was selected to be 2 pixels, and the angular resolution, Δθ, was selected to be 2 degrees (2π/180 radians).

Note that whereas θ can have any value between −π and π, θ' is a positive integral. Also note, that the minimal value r' and θ' is 1.

The polar representation of the cine-loop, $P_p$, was calculated as follows. First, the group of pixel locations corresponding to each range-gate and angle-gate, L(r',θ'), was located. Second, for each frame p, range-gate r' and angle-gate θ', $P_p(r',\theta')$ was defined as the maximal gray-level intensity over the pixels located within L(r',θ').

In the polar representation, the area corresponding to the range-angle-gate (r',θ') was fount to be sensitive to the range. Specifically, for small values of r', each range-angle-gate was insufficient to span an appropriate basis and many elements of the $P_p(r',\theta')$ matrix were remained unassigned. The missing $P_p(r',\theta')$ values were estimated as follows: for each θ, all the unassigned $P_p(r',\theta')$ elements which precede the first valid $P_p(r',\theta')$ were set to the average between the first two valid $P_p(r',\theta')$ elements. All other undefined $P_p(r',\theta')$ element were set to the mean value over the valid values in a 5×5 block surrounding them, where "valid elements" refers to elements for which a value has been assigned.

The number of range-gates within the entire data-region viewed by the transducer for each angle-gate θ', D(θ'), was defined as i−1 where i is the index of the first range-gate for which $P_p(r',\theta')$=0 for any value of p.

Figure 6A:
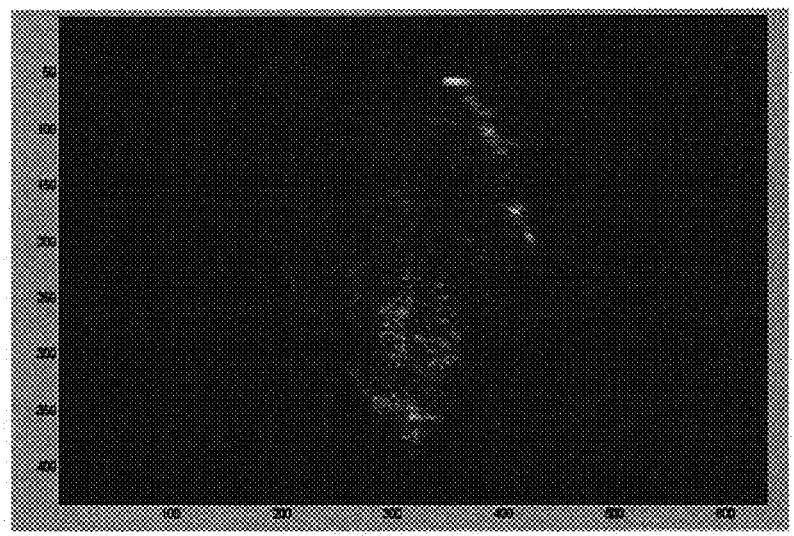
FIGS. 6a–b are examples of a single frame of a cine-loop ultrasound image in Cartesian (FIG. 6a) and polar (FIG. 6b) representations, constructed according to various exemplary embodiments of the present invention.
Figure 6B:
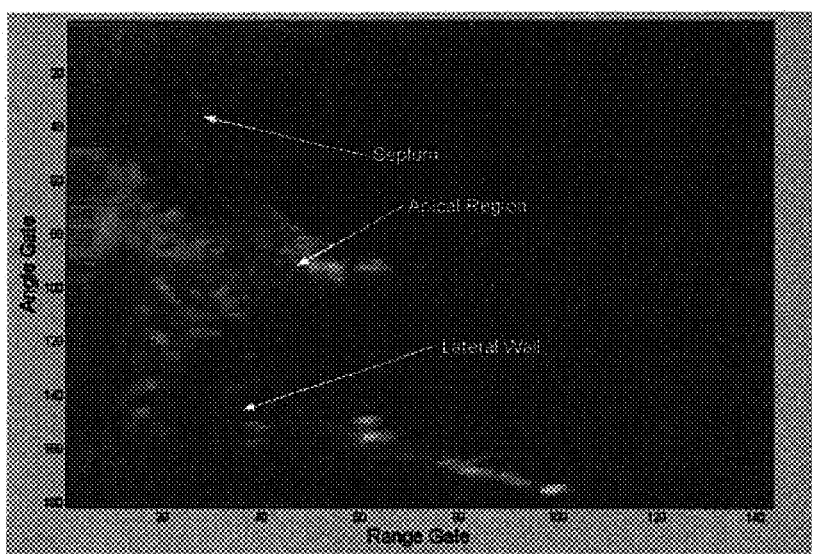

Examples of a single echocardiographic frame in Cartesian and polar representation are shown in FIGS. 6a–b, respectively.

Figure 7:
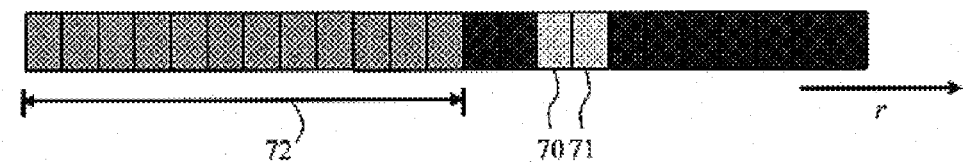
FIG. 7 is a schematic illustration of range-gates used in a procedure for defining a radial interval, according to various exemplary embodiments of the present invention.

The definition of the radial interval, R̃(p,θ'), was performed separately for each frame p and angle-gate θ'. The procedure is illustrated in FIG. 7. Shown in FIG. 7 are a range-gate 70, a range-gate 71 and a group 72 of range-gates, in a single frame and for a single angle-gate. Range-gate 70 represents range-gate r', which is a loop variable, range gate 71 represent the range-gate immediately following range-gate 70 downstream radial direction r, and group 72 represents r'−N range-gates which precede range-gate 70 upstream radial direction r. In the present example, N was set to be 2, but any other number smaller than r' (including zero) can be used. The value of range-gate 70 was averaged with the value of range-gate 71, and divided by a reference value which was calculated as the mean value of group 72:

$$C_{p,\theta'}(r') = \frac{\frac{1}{2}[P_p(r', \theta') + P_p(r' + 1, \theta')]}{\frac{1}{r' - N - 1} \sum_{n=1}^{r'-N-1} P_p(n, \theta')}. \quad \text{(EQ. 22)}$$

The calculation of $C_{p,\theta'}$ was repeated for each r', and, as stated for each θ' and p. The buffer of N range-gates (size of group 72) enabled handling gradual changes in the gray-level between the LV cavity and the endocardium.

As will be appreciated by one ordinarily skilled in the art, when Equation 22 is calculated for each r' in a predetermined interval (i.e., r'=$r_1$, $r_1$+1, $r_1$+2, . . . , $r_n$, where $r_1$ and $r_n$ represent the end-points of the predetermined interval) the calculation can be viewed as one-dimensional integration along the radial direction, from r'=$r_1$ to r'=$r_n$. In the present example, $r_1$ was set to be 10 and $r_n$ was set to be the maximal r', so as to ensure that mostly elements of $P_p(r',\theta')$ which have been originally defined as valid would be used. This turned out to be an acceptable requirement given to the relatively large dimensions of the LV.

The rational behind the above procedure is that by performing integration along the radial direction, the number of valid elements of $P_p(r',\theta')$ which contributed to the calculation of each element of R̃(p,θ') was maximized. This allowed better statistics which was advantageous in view of the low signal-to-noise ratio of the echocardiographic images.

Range-gates for which $C_{p,\theta'}$ was lower than a predetermined threshold $T_R$, were declared as belonging to the endocardial boundary (or any other boundary). Range-gates for which $C_{p,\theta'}$ was higher than $T_R$ were declared as belonging to the LV cavity (or any other cardiac cavity). The endocardial boundary was thus defined using a vector $B_{p,\theta'}(r')$ whose elements assume Boolean values ("0" or "1", in the present example):

$$B_{p,\theta'}(r')=[C_{p,\theta'}(r')<T_R]. \quad \text{(EQ. 23)}$$

In the present example a value of 0.6 was selected for $T_R$.

The endocardial boundary had a noticeable width, hence appeared as a series of several consecutive 1's in $B_{p,\theta'}(r')$. Once $B_{p,\theta'}(r')$ was constructed, the morphological filters "Erode" and "Dilate" were used for discarding series of length 1 which were assumed to be noise:

$$\hat{B}_{p,\theta'}(r')=\text{Erode}(\text{Dilate}(B_{p,\theta'}(r'), (1\ 1)),(1\ 1)). \quad \text{(EQ. 24)}$$

The value of R̃(p,θ') was set to the index of the first non-zero value in $\hat{B}_{p,\theta}(r')$. If no such index was found, a negative value (e.g., −1), which was interpreted as "invalid value", was used.

R̃(p,θ') was further subjected to an error correction process. Special attention was given to the apical region, which is oftentimes saturated by clutter. In order to estimate the location of the endocardial boundary in the apical region, temporal averaging was applied to enhance the signal-to-noise ratio. Such technique is valid, since the apical wall motion in normal patients is much slower than the wall motion in other regions of the cardiac muscle.

Figure 8:
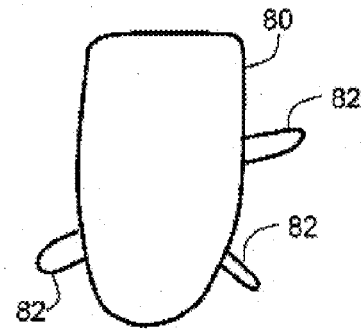
FIG. 8 is a schematic illustration of a pattern representing the endocardial boundary and several extending patterns representing regions overshooting the endocardial boundary.

The error correction process included repeated application of a high-derivative rejection procedure which was designed to identify parts in R̃(p,θ') which overshot the endocardial boundary. The objective of the high-derivative rejection procedure is illustrated in FIG. 8. Shown in FIG. 8 is a pattern 80 representing the endocardial boundary and several additional patterns 82 extending from pattern 80 and representing overshooting regions. The high-derivative rejection procedure identifies the additional patterns and marks them as invalid.

Given an array $A(\theta')$, the high-derivative rejection procedure performs the following steps. The procedure locates elements in $A(\theta')$ for which there is a high positive derivative and stores the corresponding indices in an order set of indices $\{I\}$. The procedure further locates elements in $A(\theta')$ for which there is a high negative derivative and stores the corresponding indices in another order set of indices $\{J\}$. In the present example ascending order sets were used. Positive derivatives higher than 8 range-gates and negative derivatives lower than −7 were considered "high derivatives."

The procedure traverses the sets $\{J\}$ and $\{I\}$, and for each j in the set $\{J\}$, which resides between two consecutive elements i and k in the set $\{I\}$, all the elements i through j are marked as invalid. If there is an element j in $\{J\}$, whose value is greater than the last elements i in $\{I\}$, the procedure marks all the elements i through j as invalid. This step refers to the last high-derivative region along $A(\theta')$. In other words, the procedure identifies and marks as invalid the region between the high positive and high negative derivatives. The procedure proceeds to a smoothing step in which the updated $A(\theta')$ undergoes a median filter with a 3-element kernel. The procedure ends after the smoothing step.

During the error correction process, $\tilde{R}(p,\theta')$ was subjected to a series of successive matrix operations aimed at identifying invalid matrix-elements in $\tilde{R}(p,\theta')$ and replacing them with interpolated values. To better understand the process, instead of redefining the matrix $\tilde{R}(p,\theta')$ after each matrix operation, several operations in the description below are explained by defining new matrices constructed by performing matrix operations on previously defined matrices. Thus, for example, as will be explained below, the result of the application of the high-derivative rejection procedure on $\tilde{R}(p,\theta')$ was denoted $R_1(p,\theta')$, the result of applying a thresholding procedure on $R_1(p,\theta')$ was denoted $R_2(p,\theta')$, etc. For the sake of conciseness, whenever a matrix or a vector is referred to by its entirety, the indices p and $\theta'$ were omitted, unless needed to avoid confusion. Thus, for example, $\tilde{R}$ refers to a matrix and $\tilde{R}(p,\theta')$ refers to the matrix-element at the p-th row and $\theta'$-th column of $\tilde{R}$.

Figure 9:
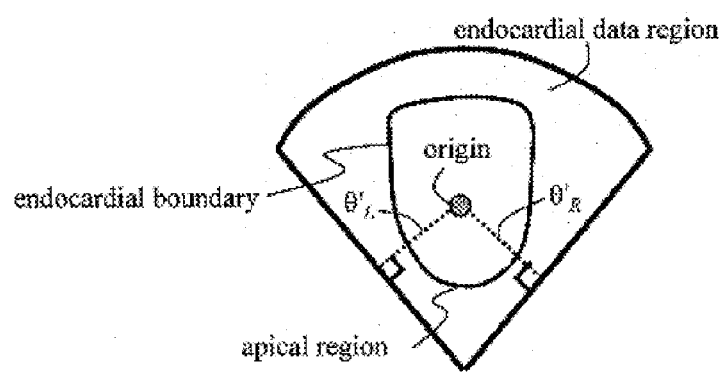
FIG. 9 is a schematic illustration of the echocardiographic data-region in a procedure in which the apical region of the endocardial boundary was located, according to various exemplary embodiments of the present invention.

In apical two-chamber and apical four-chamber views, the point along the endocardial boundary which is closest to the transducer location, is usually near the center of the apical region. The error correction process thus included the location of the apical region, which was performed as follows (see FIG. 9). The bounds of the apical region were defined by two straight lines perpendicular to the left and the right bounds of the echocardiographic data-region, and go through the origin. Note that each of the two lines corresponds to a single angle-gate, which was found using planar geometry considerations. The angle-gate indices for the two lines are denoted in FIG. 9 by $\theta'_L$ and $\theta'_R$.

Due to the noisy nature of the data, the endocardial boundaries obtained according to a time-averaged frame were used as a reference for error correction. Although the application of temporal averaging over the entire cine-loop produces imprecise results, the temporal averaging improved the visibility of the LV cavity, at least for the area of the image that remains opacified throughout the cardiac cycle and for the apical region. The boundaries for the time-averaged frame were found as follows.

Temporal averaging was applied over the entire cine-loop for each pixel. The results were stored as matrix-elements in a matrix denoted M:

$$M(r',\theta') = \frac{1}{F}\sum_{p=1}^{F} P_p(r',\theta') \quad \text{(EQ. 25)}$$

where F is the number of frames in the cine-loop.

M was used for integrating along the radial direction, as further explained above (see Equation 22 and FIG. 7):

$$C_{\theta'}(r') = \frac{\frac{1}{2}[M(r',\theta') + M(r'+1,\theta')]}{\frac{1}{r'-N-1}\sum_{n=1}^{r'-N-1} M(n,\theta')}. \quad \text{(EQ. 26)}$$

A thresholding procedure was then applied to $C_{\theta'}(r')$ of Equation 26. Unlike in the case of $\tilde{R}$, two thresholds, $T_L$ and $T_H$ were applied. In the present example, the value of 0.75 was used for $T_L$ and the value of 0.9 was used for $T_H$. Thus, two Boolean vectors were defined, $B_{\theta'}^L(r')$ and $B_{\theta'}^H(r')$:

$$B_{\theta'}^L(r') = [C_{\theta'}(r') < T_L] \quad \text{(EQ. 27)}$$

$$B_{\theta'}^H(r') = [C_{\theta'}(r') < T_H] \quad \text{(EQ. 28)}$$

For each angle-gate $\theta'$, the indices of the first non-zero value of $B_{\theta'}^L(r')$ and $B_{\theta'}^H(r')$ were used to define two vectors, respectively denoted by $R_L(\theta')$ and $R_H(\theta')$. Each of the two vectors underwent the high-derivative rejection scheme described above. Additionally, values of $R_L(\theta')$ and $R_H(\theta')$ that were close to the data-region bounds were marked as invalid. This was performed in order to handle cases in which part of the endocardial boundary was outside the data-region.

An additional vector $R_M(\theta')$ was defined by merging $R_L(\theta')$ and $R_H(\theta')$ as follows:

$$R_M(\theta') = \text{Max}\{R_L(\theta'), R_H(\theta')\} \quad \text{(EQ. 29)}$$

Figure 10:
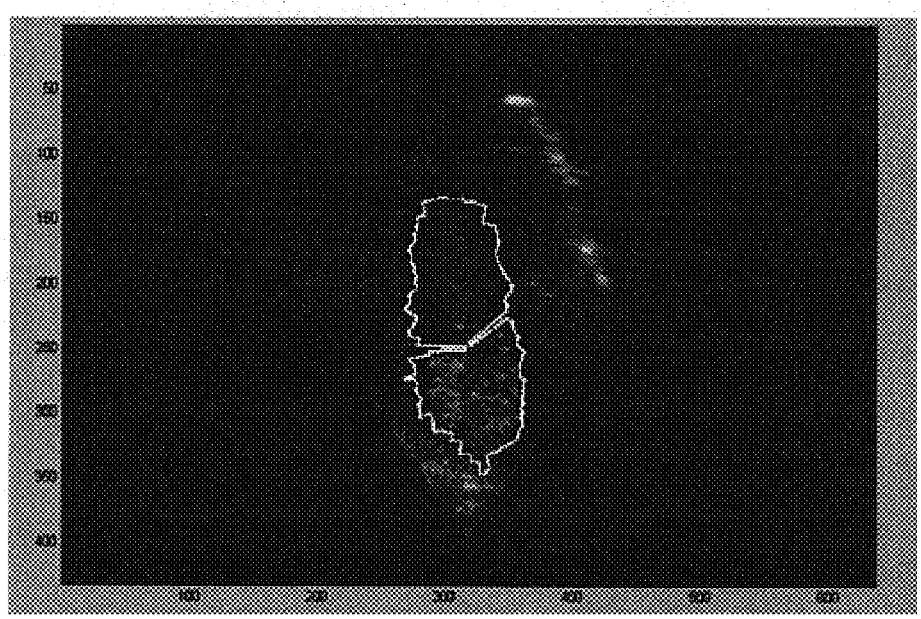
FIG. 10 is an imagery example of a radial interval constructed by a double-threshold scheme, according to various exemplary embodiments of the present invention.
Figure 11A:
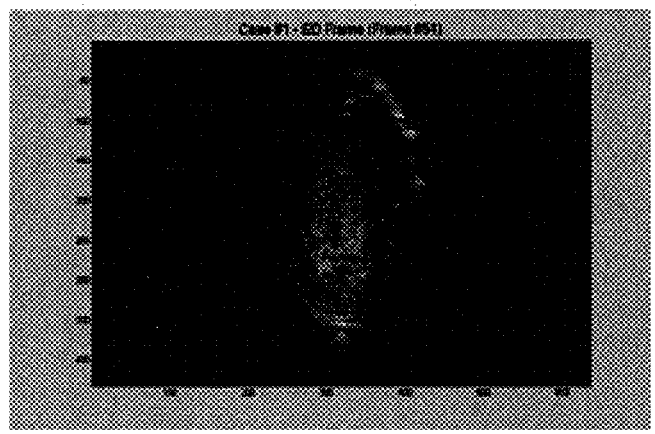
FIGS. 11a–13f show automatically defined endocardial boundary for 3 cine-loop examples, denoted case No. 1 (FIGS. 11a–f), case No. 2 (FIGS. 12a–f) and case No. 3 (FIGS. 13a–f), obtained according to various exemplary embodiments of the present invention.
Figure 11B:
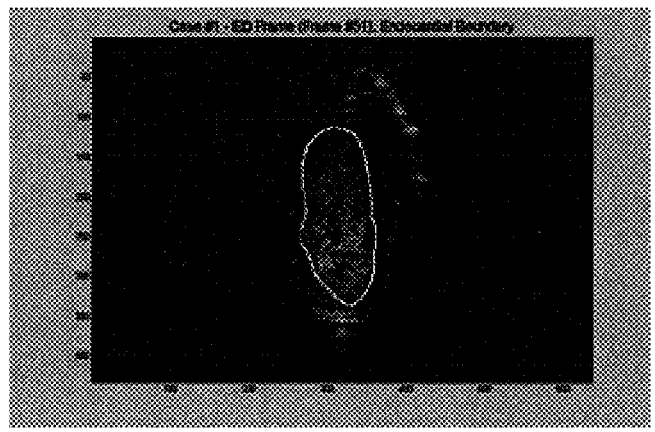
Figure 11C:
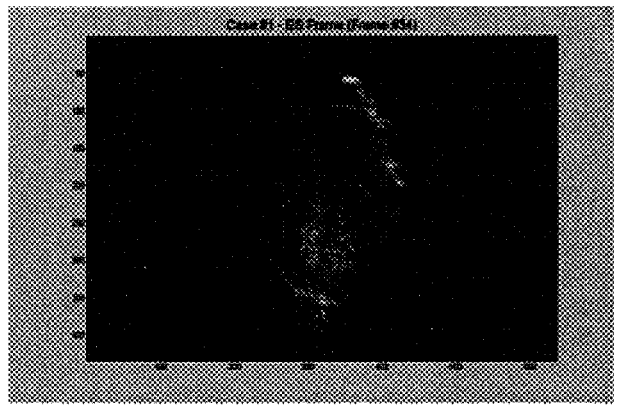
Figure 11D:
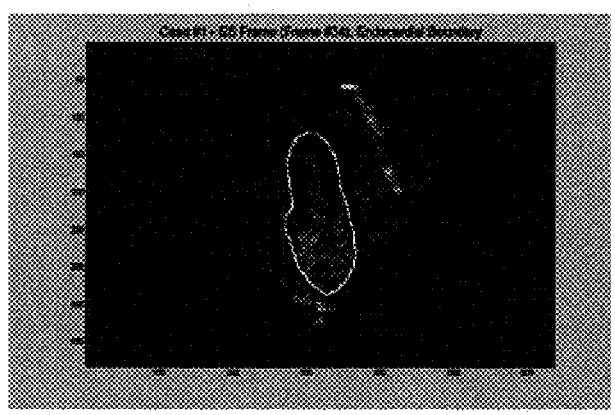
Figure 11E:
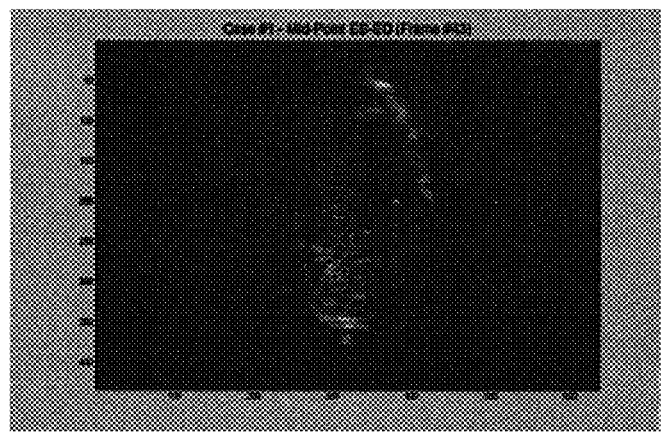
Figure 11F:
Figure 12A:
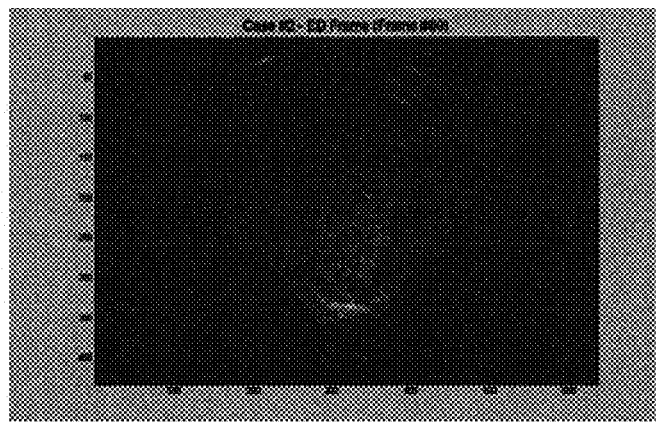
Figure 12B:
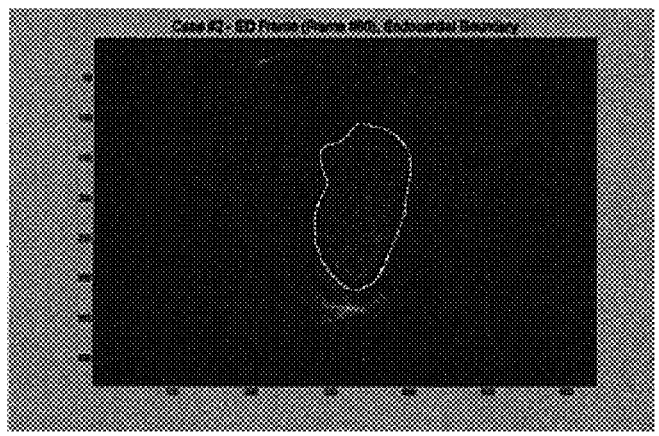
Figure 12C:
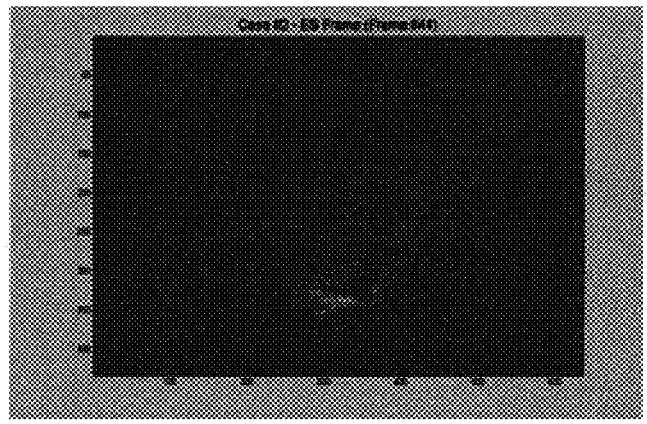
Figure 12D:
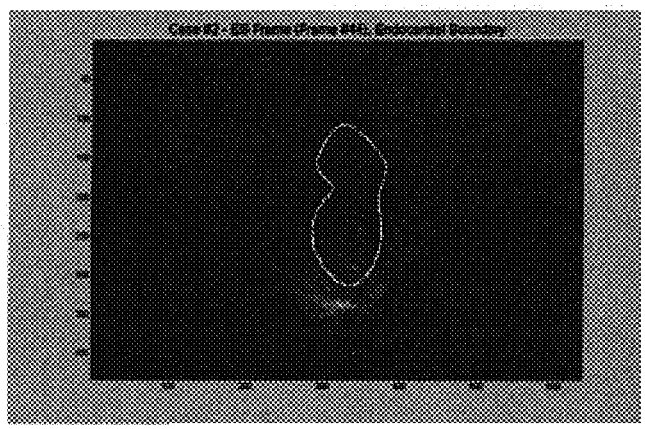
Figure 12E:
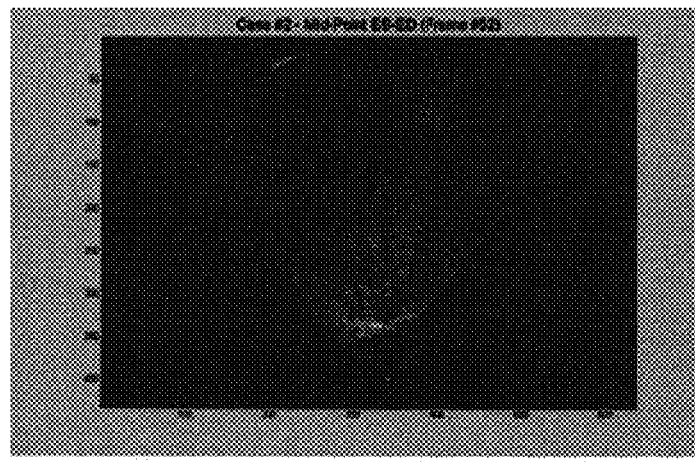
Figure 12F:
Figure 13A:
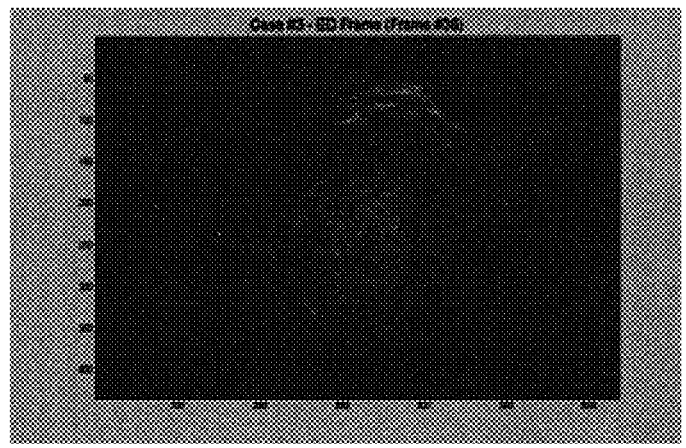
Figure 13B:
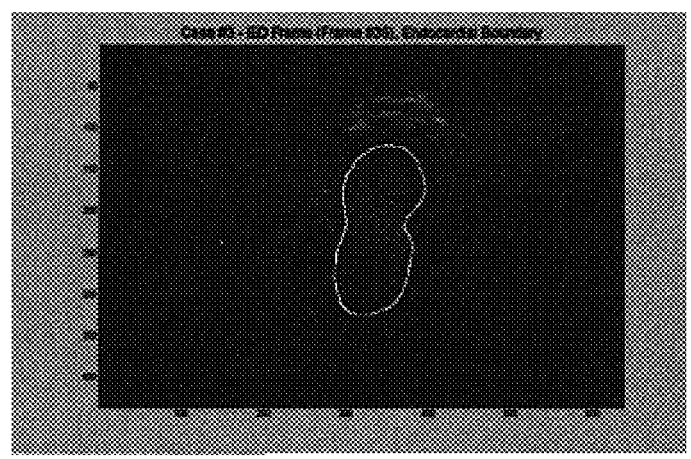
Figure 13C:
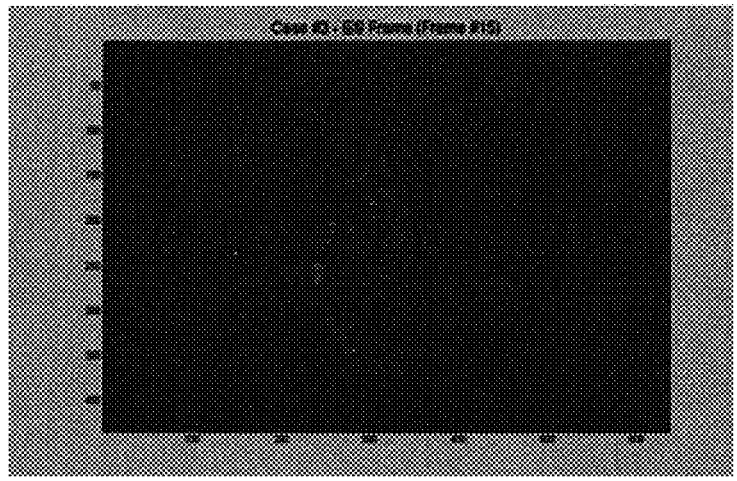
Figure 13D:
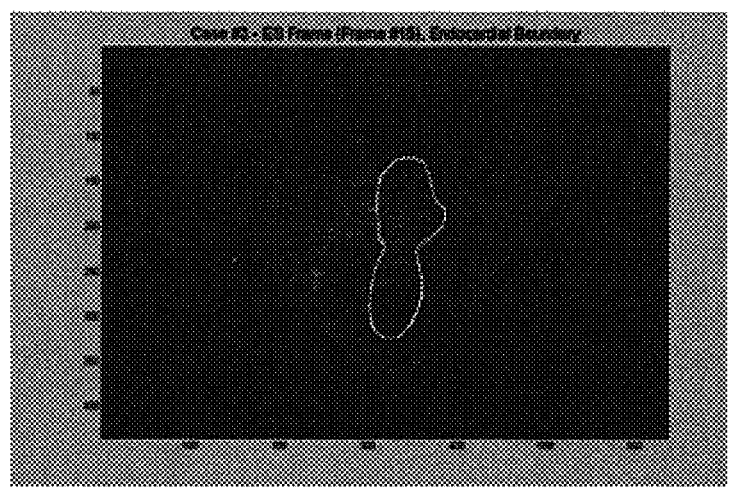
Figure 13E:
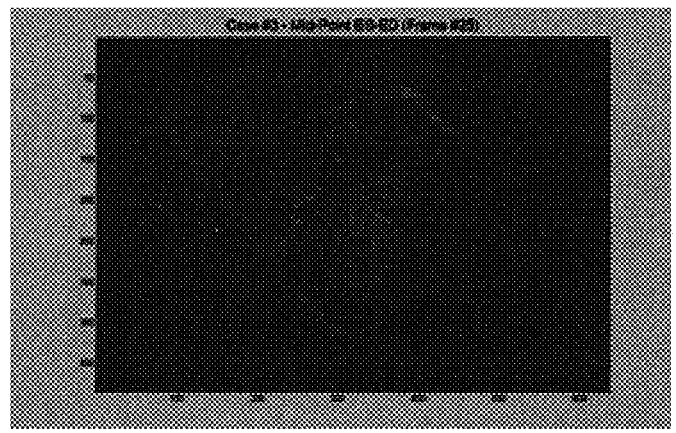
Figure 13F:
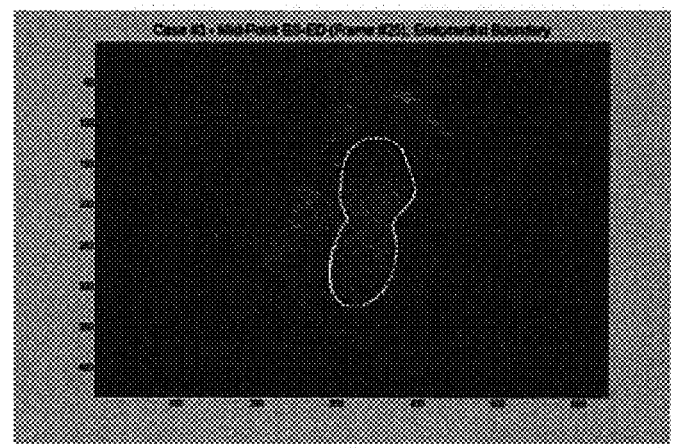
Figure 14A:
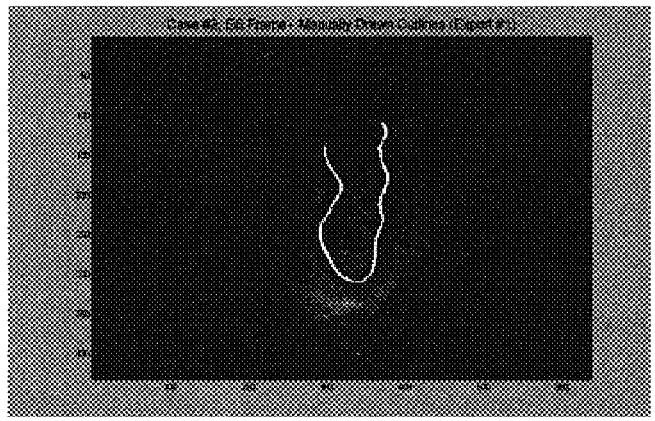
FIGS. 14a–15c show examples for manually drawn endocardial boundary (FIGS. 14a–b and 15a–b) and the boundary computed according to various exemplary embodiments of the present invention (FIGS. 14c and 15c), for and an end-systolic (ES) frame of case No. 2 (FIGS. 14a–c) and an end-diastolic (ED) frame of case No. 3 (FIG. 15a–c)
Figure 14B:
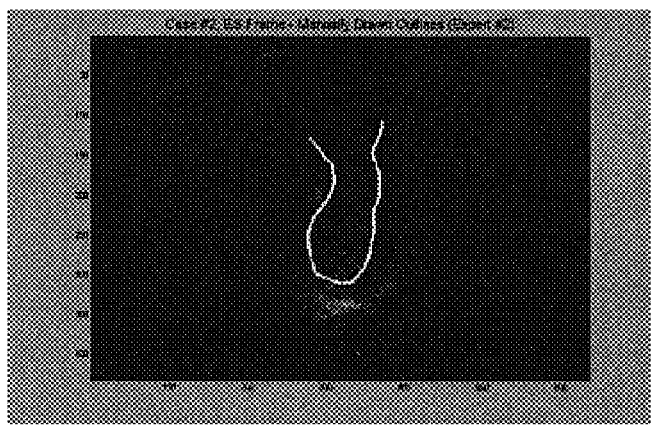
Figure 14C:
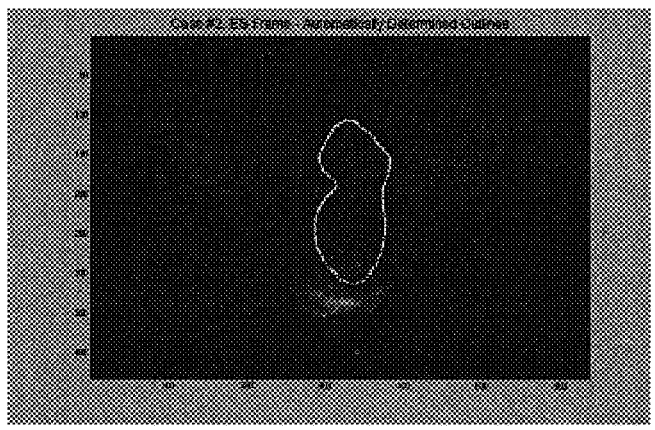

As a result of the double-threshold scheme, the number of valid elements in $R_M(\theta')$ was significantly increased. An example for $R_M(\theta')$ is shown in FIG. 10 in Cartesian coordinate system.

The error-correction procedure proceeded to a step in which a new matrix $R_1$ was constructed by applying the high-derivative rejection procedure to each frame of $\tilde{R}$. Similarly to the treatment of $R_L$ and $R_H$, elements of $\tilde{R}$ that were close to the data-region bounds were marked as invalid.

An additional matrix, $R_2$, was constructed using the matrix $R_1$ and the vector $R_M(\theta')$ by marking all matrix-elements in $R_1$ which deviated from the corresponding elements in $R_M(\theta')$ by more than a predetermined threshold $T_2$ as invalid. Mathematically:

$$R_2(p,\theta') = \begin{cases} R_1(p,\theta') & |R_1(p,\theta') - R_M(\theta')| < T_2 \\ -1 & \text{otherwise} \end{cases} \quad \text{(EQ. 30)}$$

$T_2$ was set to the value of 15, but it was verified by the present Inventors that the quality of the results is not sensitive to the choice of $T_2$, provided its value is proportional to the spatial resolution of the image. The assumption in Equation 30 was based on the fact that the cardiac wall-motion during the heartbeat is physiologically limited.

To minimize clutter effects, all elements in $R_2$ whose angle-gate falls within the apical region (see FIG. 9) were replaced by the corresponding elements of $R_M(\theta')$.

The error correction process included an additional step in which an additional matrix $R_3$ was constructed by marking the end-points of the apical region as invalid. In The present example, the first 2 and the last 2 angle-gates in the apical region were marked invalid. Another matrix $R_4$ was constructed by marking angular regions affected by the papillary muscles as invalid. The papillary muscles were detected manually but can also be detected automatically, as described in WO 2005/065028.

An additional matrix $R_s$ was constructed by applying a sliding-window of size 9×5 to $R_4(p,\theta')$. Each element in $R_s$ was the median over the elements in the relevant window location, excluding the invalid elements. An additional matrix $R_5$ was constructed using $R_s$ and $R_4$ by marking all matrix-elements in the $R_4$ which deviated from the corresponding matrix-elements in $R_s$ by more than a predetermined threshold $T_E$ as invalid:

$$R_5(p,\theta') = \begin{cases} R_4(p,\theta') & \frac{|R_4(p,\theta') - R_S(p,\theta')|}{R_S(p,\theta')} > T_E \\ -1 & \text{otherwise} \end{cases} \quad \text{(EQ. 31)}$$

$T_E$ was set to the value of 0.25, but it was verified by the present Inventors that the quality of the results is not sensitive to this choice.

$R_5$ was used to construct a binary matrix $R_B$, containing "1" for each invalid matrix-element in $R_5$, and "0" for all other elements. The binary matrix was subjected to a morphological dilation operation. An additional matrix, $R_6$ was constructed by mapping the invalid elements of $R_B$ onto $R_5$. Specifically, for each element in $R_B$ that is equal to 1, the corresponding matrix-element in $R_5$ was marked as invalid.

The invalid elements is $R_6$ were replaced by the result of cubic interpolation. Due to the cyclic nature of $R_6$ (typically in $\theta'$, but also in p, when the cine-loop includes an integral number of heart beats), the actual interpolation was performed on the following matrix instead of $R_6$:

$$R_7(p,\theta') = \begin{pmatrix} (R_6(p,\theta')) & (R_6(p,\theta')) & (R_6(p,\theta')) \\ (R_6(p,\theta')) & (R_6(p,\theta')) & (R_6(p,\theta')) \\ (R_6(p,\theta')) & (R_6(p,\theta')) & (R_6(p,\theta')) \end{pmatrix} \quad \text{(EQ. 32)}$$

The interpolation was performed only for the invalid points in the central sub-matrix of $R_7$. The resulting matrix, including the completed data, is denoted $R_8$. An additional matrix $R_9$, was obtained by applying smoothing procedure on $R_8$ in both indices (angular and temporal). The smoothing included weak and localized low-pass filter followed by cubic Spline. Even though the Spline is sufficient, it was found that the use of low-pass filter enhanced the effect of the Spline, reducing its sensitivity to small localized errors.

An additional matrix $R_C$ was constructed by applying a high-pass filter to $R_9$, designed to detect high deviations between a range-angle gate (and its immediate surroundings) and the average between two groups of range-angle gates (one on each side along the spatial axis):

$$R_C(p,\theta') = \quad \text{(EQ. 33)}$$
$$R_9(p,\theta') * \begin{pmatrix} -\frac{1}{6} & 0 & 0 & 0 & 0 & \frac{1}{9} & \frac{1}{9} & \frac{1}{9} & 0 & 0 & 0 & 0 & -\frac{1}{6} \\ -\frac{1}{6} & 0 & 0 & 0 & 0 & \frac{1}{9} & \frac{1}{9} & \frac{1}{9} & 0 & 0 & 0 & 0 & -\frac{1}{6} \\ -\frac{1}{6} & 0 & 0 & 0 & 0 & \frac{1}{9} & \frac{1}{9} & \frac{1}{9} & 0 & 0 & 0 & 0 & -\frac{1}{6} \end{pmatrix}.$$

An additional matrix $R_T$ was constructed by applying a constant threshold $T_C$ to $R_C$. In the present example, $T_C$ was set to 1. All the elements of $R_T$ within the apical region (see FIG. 9) were set to 0, because the information regarding the apical region is based on the time-averaged frame. $R_T$ was subjected to morphological dilation operation with a kernel of size 7×7. The invalid elements of $R_T$ were mapped onto $R_8$. Specifically, for each element in $R_T$ that is equal to 1, the corresponding matrix-element in $R_8$ was marked as invalid. The final corrected radial interval $R(p,\theta')$ was obtained by replacing invalid elements in $R_9$ by the result of linear interpolation.

$R(p,\theta')$ was transformed back to Cartesian coordinates using the matrices $r'(m,n)$ and $\theta'(m,n)$ of Equations 21. Specifically, for each frame p, the pixels belonging to the LV cavity were described by a binary matrix $C_p(m,n)$. The matrix receives the value 1 for pixels within the LV cavity, and 0 for the rest of the pixels:

$$C_p(m,n) = [r(m,n) \leq R(p,\theta'(m,n))] \quad \text{(EQ. 34)}$$

The binary matrix defining the LV Endocardial boundaries, $B_p(m,n)$ was found using the morphological filter Erode:

$$B_P(m,n) = C_p(m,n) - \text{Erode}\left(C_p(m,n), \begin{pmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \\ 1 & 1 & 1 & 1 & 1 \end{pmatrix}\right) \quad \text{(EQ. 35)}$$

Data Acquisition 9 cine-loops of contrast echocardiograph images were recorded from seven different Intensive Care Cardiac Unit (ICCU) patients. The cine-loops were in apical four-chamber and apical two-chamber views. The data have been collected using Vivid-3® and Vivid-7® (GE Healthcare) imaging platforms. The contrast agent used was Optison® Microbubbles. The frame-rate ranges were between 27 frames per second and 48 frames per second. In the present example, no coherent contrast imaging was employed. The data acquisition protocol was as follows:

1. Standard B-Scan cardiac imaging was performed in apical two-chamber and apical four-chamber views. A single cine-loop was stored in each view.
2. The preset was changed to Contrast (in Vivid-3®) or LV Contrast (in Vivid-7®), and the mechanical index was set to 0.1 (in Vivid-3®) or 0.14 (in Vivid-7®). Cine-loops in apical four-chamber and apical two-chamber views were stored.
3. A 0.6 ml bolus of Optison® Microbubbles contrast agent was administered via venous injection. At the same time, apical four-chamber imaging was used to make sure that the contrast agent has reached the Left Ventricle.

4. Constant infusion of Optison® followed the bolus, at a drip rate of 8 ml/hr. The infusion tube was filled with 2.4 ml of Optison®, while the syringe in the infusion pump was filled with Saline (no mixing between the saline and the contrast agent).
5. Imaging was stopped for 90 seconds in order to build-up the myocardial opacification. After 90 seconds, a cine-loop was stored at both apical four-chamber and apical two-chamber views. Visual estimation was performed to ensure significant myocardial opacification. In non significant cases, an additional bolus of 0.6 ml was administered and the procedure (90 seconds buildup and imaging in apical four-and two-chamber views) was repeated until significant myocardial opacification was achieved.

Scoring

Once the cine-loops were recorded the image processing of the present embodiments was applied to automatically define the outline of the myocardial boundary. The outlines have been compared to visually determined outlines by two cardiologists. In each cine-loop, the LV has been divided into 6 segments. The segments used in apical four-chamber view were: (i) basal Septum, (ii) mid-Septum, (iii) apical Septum, (iv) apical Lateral, (v) mid-Lateral and (vi) basal Lateral. The segments used in apical two-chamber view were: (i) basal Inferior, (ii) mid-Inferior, (iii) apical Inferior, (iv) apical Anterior, (v) mid-Anterior and (vi) basal Anterior. For each segment the overall performance of the automatic outline definition was qualitatively assessed.

Additionally, the cardiologists were asked to draw the contours of the endocardial boundary over a printed version of the end-diastolic (ED) and end-systolic (ES) frames of each examined cine-loop. The drawn outlines for each frame were transformed into polar representation and stored in the vectors $R_{m1}(p,\theta')$ for the first cardiologist and $R_{m2}(p,\theta')$ for the second cardiologist. Note that, in this case, p can only receive two values: one corresponding to the ED frame, and the other corresponding to the ES frame.

Two sets of quantitative parameters were defined. A first such set was based on the Mean Absolute Error (MAE):

$$MAE_1(p) = \frac{\Delta r}{N_{\theta'}} \sum_{\theta'} |R_a(p,\theta') - R_{m1}(p,\theta')| \quad (EQ.\ 36)$$

$$MAE_2(p) = \frac{\Delta r}{N_{\theta'}} \sum_{\theta'} |R_a(p,\theta') - R_{m2}(p,\theta')|$$

$$MAE_{1-2}(p) = \frac{\Delta r}{N_{\theta'}} \sum_{\theta'} |R_{m2}(p,\theta') - R_{m1}(p,\theta')|,$$

and a second based on the Mean Relative Absolute Error (MRAE):

$$MRAE_1(p) = \frac{1}{N_{\theta'}} \sum_{\theta'} \frac{|R_a(p,\theta') - R_{m1}(p,\theta')|}{R_{m1}(p,\theta')} \quad (EQ.\ 37)$$

$$MRAE_2(p) = \frac{1}{N_{\theta'}} \sum_{\theta'} \frac{|R_a(p,\theta') - R_{m2}(p,\theta')|}{R_{m2}(p,\theta')}$$

$$MRAE_{1-2}(p) = \frac{1}{N_{\theta'}} \sum_{\theta'} \frac{|R_{m2}(p,\theta') - R_{m1}(p,\theta')|}{R_{m1}(p,\theta')},$$

where $N_{\theta'}$ is the number of angle-gates used. Note that $R(p,\theta')$, $R_{m1}(p,\theta')$, and $R_{m2}(p,\theta')$ are given in pixels.

Results

Table 1, below, summarizes the score given by the cardiologists to each segment of each examined cine-loop. The scores range from 5 ("excellent") to 1 ("completely unacceptable"). Mean and standard deviation (SD) were calculated using cardiologists and all nine cases.

TABLE 1

| | Segment | | | | | |
|---|---|---|---|---|---|---|
| Case | (i) | (ii) | (iii) | (iv) | (v) | (vi) |
| 1 | 4, 4 | 3, 3 | 4, 4 | 5, 5 | 4, 4 | 3, 2 |
| 2 | 3, 3 | 4, 4 | 5, 5 | 4, 4 | 4, 4 | 3, 3 |
| 3 | 4, 3 | 5, 3 | 4, 4 | 4, 3 | 5, 4 | 3, 2 |
| 4 | 4, 3 | 5, 4 | 4, 3 | 5, 3 | 4, 4 | 4, 3 |
| 5 | 4, 4 | 5, 5 | 4, 3 | 5, 5 | 5, 5 | 3, 3 |
| 6 | 4, 4 | 5, 4 | 5, 2 | 3, 2 | 4, 4 | 4, 4 |
| 7 | 5, 3 | 5, 4 | 4, 5 | 4, 5 | 4, 5 | 4, 4 |
| 8 | 3, 3 | 4, 4 | 3, 2 | 4, 3 | 4, 4 | 3, 4 |
| 9 | 3, 3 | 4, 2 | 5, 3 | 3, 3 | 4, 2 | 4, 3 |
| Mean | 3.6 | 4.1 | 3.8 | 3.9 | 4.1 | 3.3 |
| SD | 0.6 | 0.9 | 1.0 | 1.0 | 0.7 | 0.7 |

Table 2, below, summarizes the values of the scoring parameters (see Equations 36 and 37), relating to the mismatch between the manually drawn outlines and the automatically detected boundaries. The values of the scoring parameters are given for both the ED and the ES frame of each examined cine-loop. Mean and SD were calculated using equal weights for all nine cases.

TABLE 2

| Case | Phase | $MAE_1$ | $MAE_2$ | $MAE_{1-2}$ | $MRAE_1$ | $MRAE_2$ | $MRAE_{1-2}$ |
|---|---|---|---|---|---|---|---|
| 1 | ED | 8.53 | 12.90 | 14.47 | 0.131 | 0.161 | 0.257 |
| | ES | 11.36 | 6.93 | 12.61 | 0.310 | 0.093 | 0.350 |
| 2 | ED | 5.26 | 9.37 | 6.93 | 0.080 | 0.104 | 0.097 |
| | ES | 7.50 | 12.62 | 10.69 | 0.151 | 0.272 | 0.196 |
| 3 | ED | 9.89 | 7.57 | 13.09 | 0.138 | 0.113 | 0.198 |
| | ES | 8.16 | 4.93 | 9.05 | 0.356 | 0.135 | 0.485 |
| 4 | ED | 4.04 | 9.61 | 8.83 | 0.053 | 0.118 | 0.111 |
| | ES | 4.31 | 6.39 | 5.77 | 0.087 | 0.099 | 0.098 |
| 5 | ED | 5.82 | 10.31 | 8.29 | 0.083 | 0.162 | 0.115 |
| | ES | 5.41 | 8.32 | 6.19 | 0.099 | 0.142 | 0.112 |
| 6 | ED | 8.16 | 9.73 | 4.99 | 0.111 | 0.116 | 0.072 |
| | ES | 10.50 | 11.71 | 6.54 | 0.214 | 0.240 | 0.132 |
| 7 | ED | 2.78 | 8.60 | 8.75 | 0.030 | 0.089 | 0.102 |
| | ES | 6.41 | 5.01 | 4.21 | 0.103 | 0.064 | 0.068 |
| 8 | ED | 7.64 | 10.82 | 4.62 | 0.095 | 0.135 | 0.060 |
| | ES | 8.95 | 7.84 | 11.73 | 0.157 | 0.124 | 0.239 |
| 9 | ED | 7.18 | 12.19 | 6.53 | 0.089 | 0.136 | 0.083 |
| | ES | 3.98 | 3.40 | 3.82 | 0.068 | 0.053 | 0.068 |
| Mean | | 7.0 | 8.8 | 8.2 | 0.13 | 0.13 | 0.16 |
| SD | | 2.4 | 2.8 | 3.2 | 0.09 | 0.05 | 0.11 |

FIGS. 11a–13f show the results for the automatically defined endocardial boundary for 3 cine-loop examples, denoted case 1 (FIGS. 11a–f), case 2 (FIGS. 12a–f) and case 3 (FIGS. 13a–f). Shown in FIGS. 11–13 are: the ED frames without (a) and with (b) the automatically defined endocardial boundary; the ES frames without (c) and with (d) the automatically defined endocardial boundary; and the mid-point (in time) between the ES and ED frames without (e) and with (f) the automatically defined endocardial boundary.

As shown in FIGS. 11–13, the image quality in case 1 is relatively high, case 2 shows low image quality, and case 3 is of higher quality than case 2. In all 3 cases, although the image quality is different, the automatically defined endocardial boundary generally fits the visual estimation. The mean qualitative scores (averaging over the scores given by the cardiologists for all the segments) were 3.75, 3.83, and 3.67 for cases 1, 2 and 3, respectively (on a 1–5 scale).

Figure 15A:
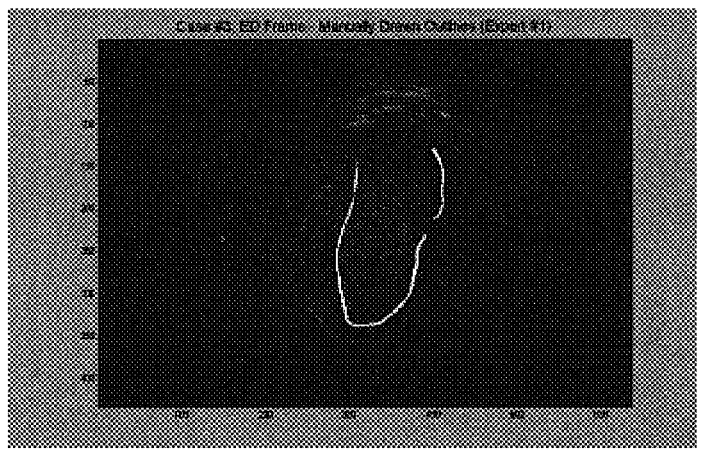
Figure 15B:
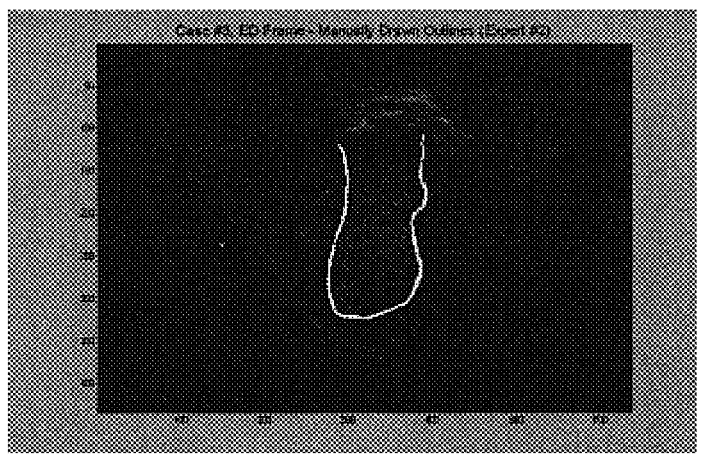
Figure 15C:
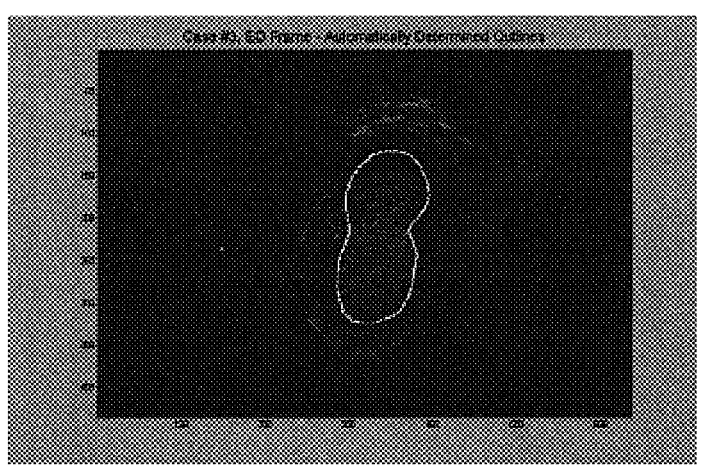

FIGS. 14a–c and 15a–c show examples for the manually drawn endocardial boundary (FIGS. 14a–b and 15a–b) and the boundary computed using the present embodiments (FIGS. 14c and 15c), for the ES frame of case 2 (FIGS. 14a–c) and the ED frame of case 3 (FIG. 15a–c).

The values of the six scoring parameters of Equations 36 and 37 were: $MAE_1=7.50$, $MAE_2=12.62$, $MAE_{1-2}=10.69$, $MRAE_1=0.151$, $MRAE_2=0.272$, and $MRAE_{1-2}=0.196$, for the ES frame of case 2; and $MAE_1=9.89$, $MAE_2=7.57$, $MAE_{1-2}=13.09$, $MRAE_1=0.138$, $MRAE_2=0.113$ and $MRAE_{1-2}=0.198$ for the ED frame of case 3. In these examples, the inter-observer variability was very similar to the variability between the automatically detected boundaries and the manually drawn boundaries.

Example 2

Attenuation Corrections

The teachings of the present embodiments were employed for calculating attenuation corrections on cine-loop ultrasound images produced during contrast echocardiography in low mechanical index scenario.

Materials and Methods

Data Acquisition 10 cine-loops of contrast echocardiograph images were recorded from seven different ICCU patients. The cine-loops were in apical four-chamber and apical two-chamber views. The data have been collected using the equipment and methods described in Example 1 above.

In each cine-loop, the LV cardiac muscle has been divided into segments (i)–(vi) as described in Example 1 above. Each segment has been categorized by cardiologists into one of three groups: normal, hypokinetic or akinetic. Out of the 60 segments (in 10 cine-loops), 38 have been defined as normal, 7 as hypokinetic and 15 as akinetic. Due to the small number of hypokinetic segments, most of the analysis has been performed using two categories: normal and abnormal (hypo/akinetic).

Image Processing

Image processing was performed in accordance with the present embodiments by calculating the stationary coarse correction factor $A_s$ (see Equation 10 above) and the time-dependent correction factor $A_{s,p}$. In the present example, the calculation of $A_{s,p}$ was by plotting $A_s$ as a function of the time-averaged distance R(m,n) of the mini-segment from the transducer and interpolating the plot using the data for both the left and the right wall within the imaging plane. $A_{s,p}$ was calculated for each mini-segment s and each frame p. Additionally, the dependence of $A_s$ on R(m,n) was compared with the dependence of $A_s$ on the mean distance traversed by the beam along the LV cavity, D(m,n).

Two parameters have been defined to quantitatively define the temporal variability in the attenuation-corrected gray-level for each mini-segment. The first parameter was the local Span $\Delta_s$ of the attenuation-corrected contrast agent's gray-level during the cardiac cycle, normalized to the mean local gray-level of the Contrast agent:

$$\Delta_s = \frac{\text{Max}_f\{g_{s,p}\} - \text{Min}_f\{g_{s,p}\}}{\text{Mean}_f\{g_{s,p}\}}, \quad (EQ. 38)$$

where $g_{s,p}$ is the attenuation-corrected contrast agent's gray-level, corresponding to mini-segment s in frame p.

The second parameter was the phase $\phi_{max}^s$ of the cardiac cycle, at which the contrast agent's local gray-level has reached its maximal value. Below, the phase is given as percentage with respect to the cycle as determined according to Electrocardiography (ECG). In order to reduce the effects of noise, smoothing Spline has been applied to the data prior to locating the peak.

Mean Square Error (MSE) between the graphs of $A_s$ versus R(m,n) for the left and the right wall was calculated for cases 1–6. The MSE between the graphs of $A_s$ versus D(m,n) for the left and the right wall was also calculated using the data for the same 6 cases.

Results

Figure 16A:
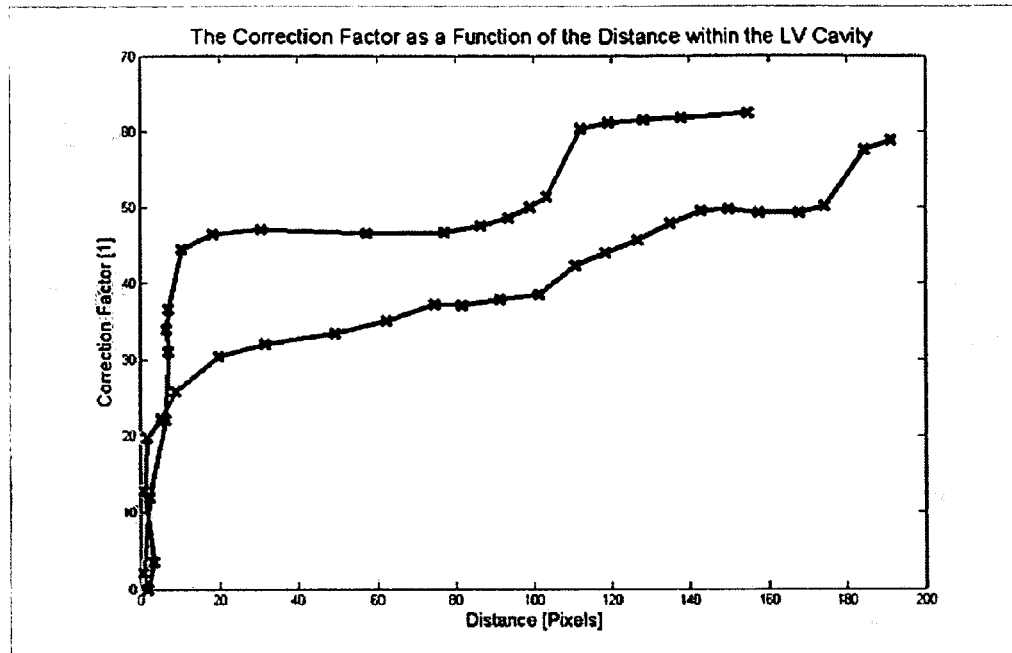
FIG. 16a shows the attenuation correction factor, $A_s$, as a function the mean distance $D(m,n)$ traversed by the beam along the left ventricular cavity, as calculated according to various exemplary embodiments of the present invention.
Figure 16B:
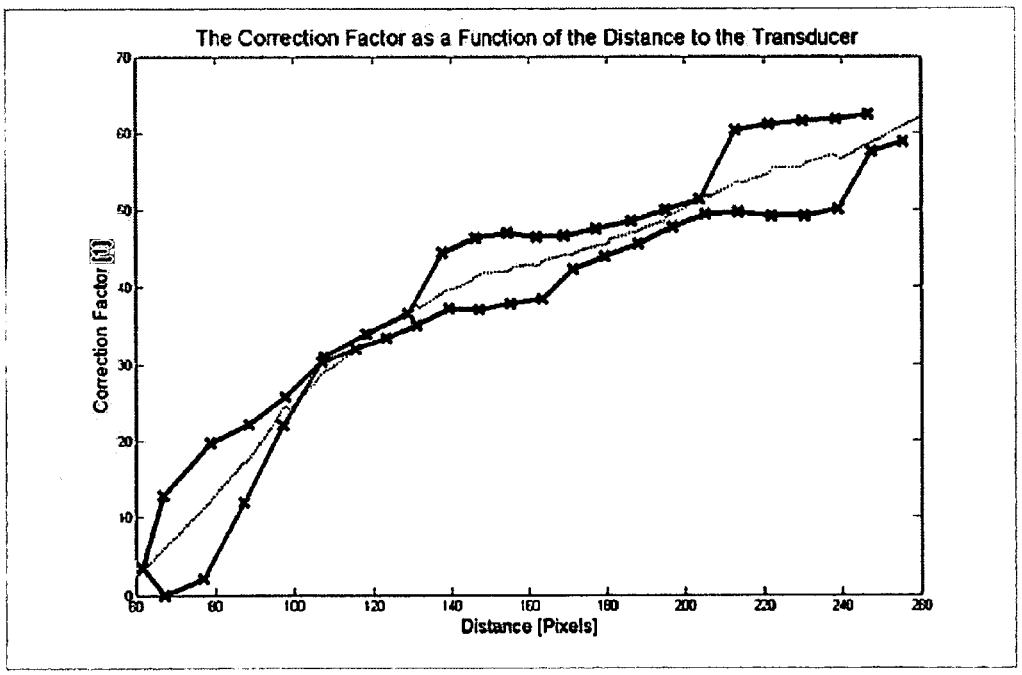
FIG. 16b shows attenuation correction factor, $A_s$, as a function of the time-averaged distance $R(m,n)$ of the mini-segment from the transducer, as calculated according to various exemplary embodiments of the present invention.

FIGS. 16a–b are graphs of $A_s$ as a function of D(m,n) (FIG. 16a) and $A_s$ as a function of R(m,n) (FIG. 16b) for each mini-segment of a single cine-loop. As shown in FIGS. 16a–b, the graphs for the two walls are much closer when correcting for the distance from the transducer R(m,n) than when using the distance passed within the LV cavity D(m,n).

In the six cine-loops, cases 1–6, the MSE for the graphs of $A_s$ versus R(m,n) was 64±69, whereas the MSE for the graphs of $A_s$ versus D(m,n) was 238±290. The huge difference supports the use of R(m,n) in the calculation of the time-dependent attenuation correction factor, in accordance with various exemplary embodiments of the invention.

Figure 17A:
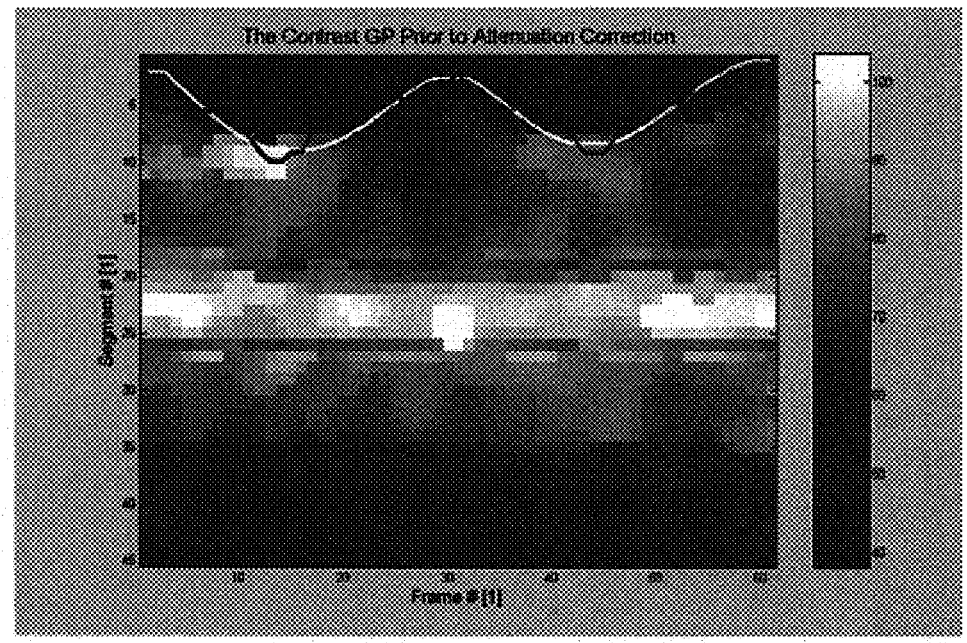
FIGS. 17a–b show the gray-level of a contrast agent as a function of a mini-segment index and a frame number, before (FIG. 17a) and after (FIG. 17b) the application of the attenuation correction, according to various exemplary embodiments of the present invention.
Figure 17B:
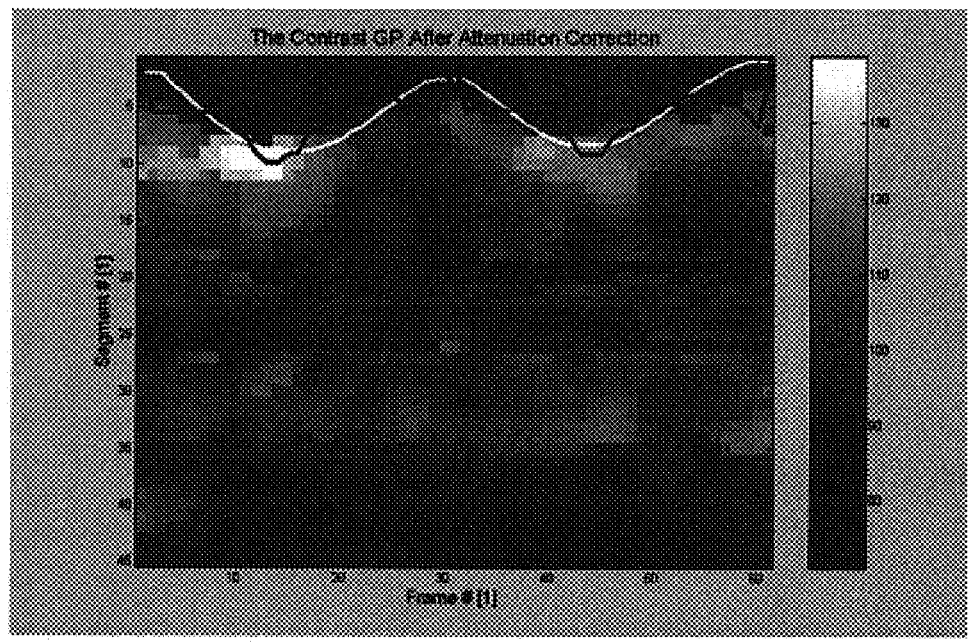

FIGS. 17a–b show the gray-level of the contrast agent for case 2 as a function of the mini-segment index (ordinate) and frame number (abscissa), before (FIG. 17a) and after (FIG. 17b) the application of the attenuation correction, according to the present embodiments. Note that the mini-segments span the LV cardiac muscle, starting at the basal region of the left wall, going through the apical region, up to the basal region of the right wall. As shown, the attenuation correction process reduces the difference in videointensity between the different mini-segments.

Figure 18:
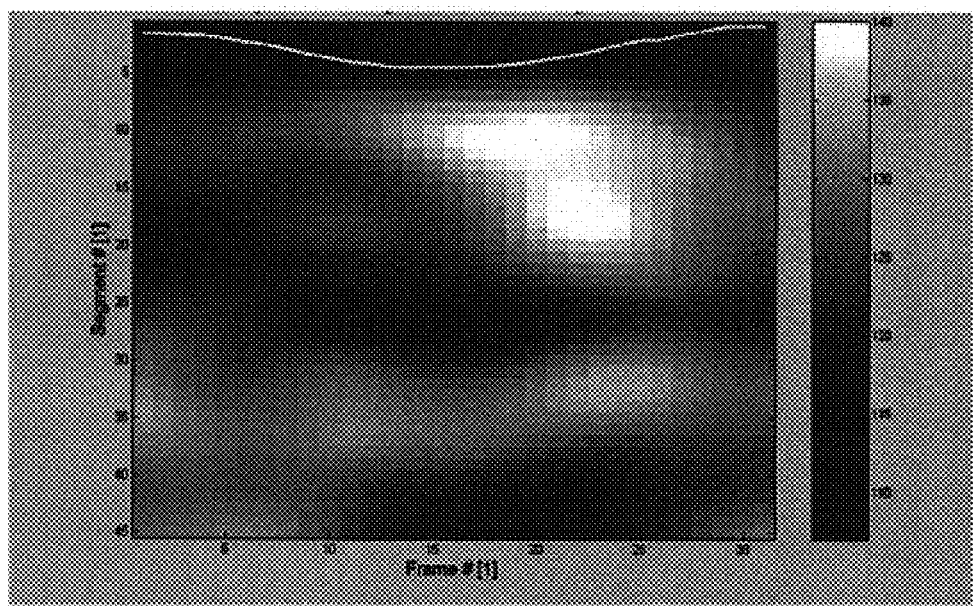
FIG. 18 shows another example of the gray-level of the contrast agent after the application of the attenuation correction, for a case in which the septum has been diagnosed as hypokinetic, the apex as Akinetic and the lateral wall as normal.
Figure 19:
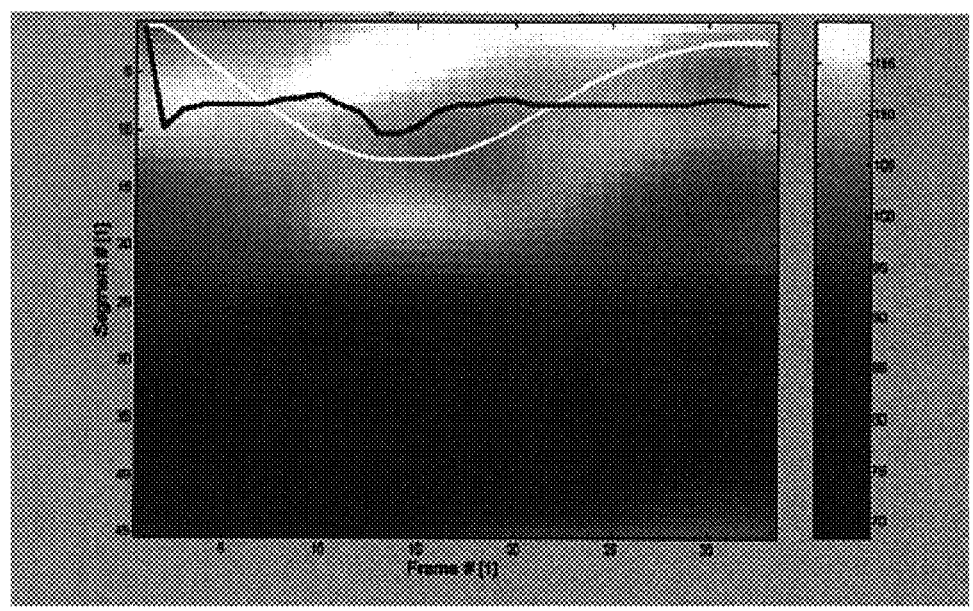
FIG. 19 shows an additional example of the gray-level of the contrast agent after the application of the attenuation correction, for a case in which the inferior wall has been diagnosed as normal and the anterior wall as Akinetic.

Additional examples for the attenuation-corrected gray-levels of the contrast agent are shown, for a single heartbeat, in FIG. 18 for case 1 and FIG. 19 for case 5. In FIG. 18 the septum has been diagnosed as hypokinetic, the apex as akinetic and the lateral wall as normal. In FIG. 19, the inferior wall has been diagnosed as normal, and the anterior wall as akinetic.

The temporal variability in all examples shown in FIGS. 17b, 18 and 19 is apparent. Similar results were obtained for all other cases. The viewed pattern changed only slightly from one cardiac cycle to the next.

Figure 20:
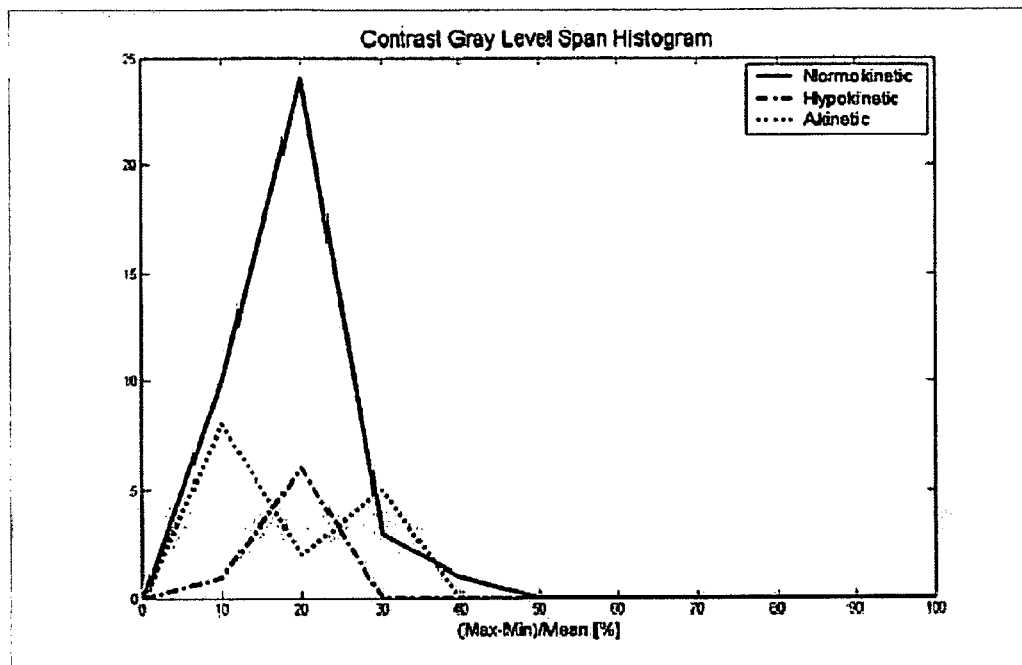
FIG. 20 is a histogram of the contrast gray-level span, $\Delta_s$, as calculated, according to various exemplary embodiments of the present invention.

FIG. 20 is a histogram of the contrast gray-level span $\Delta_s$, and Table 3 below summarizes the mean and standard deviation of $\Delta_s$ for normokinetic, hypokinetic, akinetic and abnormal segments.

TABLE 3

| | Contrast Gray-level Span $\Delta_s$ [%] |
|---|---|
| normokinetic | 18 ± 7 |
| hypokinetic | 17 ± 4 |
| akinetic | 18 ± 10 |
| abnormal | 17 ± 8 |

These results show that there is no correlation between the contrast agent's gray-level span and the kinesis of the cardiac tissue, in contrast to prior art studies (see e.g., Yuda et al., "Use of cyclic variation of integrated backscatter to assess contractile reserve and myocardial viability in chronic ischemic left ventricular dysfunction", Echocardiography, 2002, 19:279–287). A possible explanation for the absence of correlation is that, while the LV contracts, the imaging plane goes through different points within the cardiac muscle (due to out-of-plane motion). Each point has its own reflection cross-section (mainly due to the three-dimensional geometry of the capillaries in which the contrast agent resides). Hence, the measured temporal variability results from two effects: the temporal variability for each point within the muscle, and the out-of-plane motion. On the other hand, since the regional perfusion is not expected to change rapidly, the overall videointensity of the region can still be correlated to the local perfusion.

Figure 21:
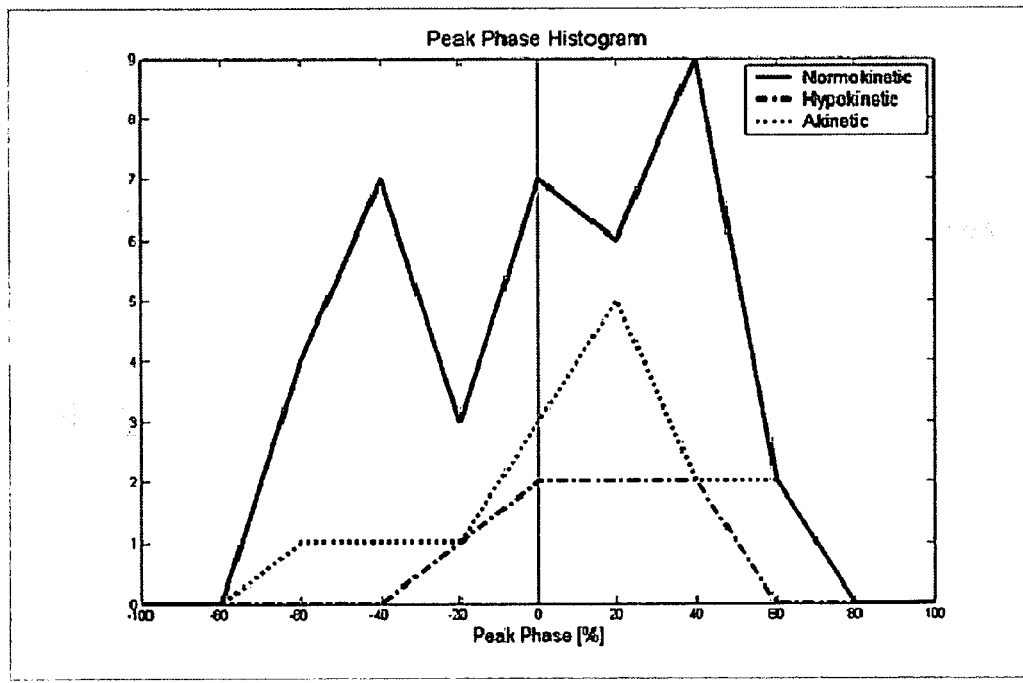
FIG. 21 is a histogram of the contrast gray-level peak phase, $\phi_{max}$, as calculated according to various exemplary embodiments of the present invention.

FIG. 21 is a histogram of the contrast gray-level peak phase $\phi_{max}^s$, and Table 4 below summarizes the mean and standard deviation of $\phi_{max}^s$ for the normokinetic, hypokinetic, akinetic and abnormal segments.

TABLE 4

| | Contrast Gray-level Peak Phase $\phi_{max}^s$ [%] |
|---|---|
| normokinetic | 1 ± 35 |
| hypokinetic | 16 ± 23 |
| akinetic | 11 ± 32 |
| abnormal | 13 ± 29 |

As shown in FIG. 21, while the values for normokinetic tissue are symmetrically distributed about phase 0%, the peak phase for hypokinetic and akinetic tissue is noticeably biased towards positive values. Without being bound to any theory, it is hypothesized that these results demonstrate that the blood is supplied to abnormal tissue relatively late within the cycle.

Example 3

Perfusion Quantification

The teachings of the present embodiments were employed for performing quantitative evaluation of local perfusion in the left ventricle. The procedure was applied to cine-loop ultrasound images produced during contrast echocardiography in a low mechanical index scenario without coherent contrast imaging. As further demonstrated below, the application of the teachings of the present embodiments allows an automatic quantification of local perfusion, even for low signal-to-noise ratio ultrasound images.

Materials and Methods

Image Processing

The boundary between the LV cavity and the myocardium was automatically defined, by the method described in Example 1 above. The Cartesian and polar representations of the boundary for the p-th frame were stored in the binary matrix $B_p$ and the vector $R_p(\theta')$, respectively. A region-of-interest was defined for each frame separately, and was further divided to 45 mini-segments defined according to the local wall-motion. The region-of-interest was stored in another binary matrix denoted $M_p(m,n)$. From practical considerations, the region-of-interest included a narrow strip of about half the maximal width of the cardiac muscle, so as to exclude the endocardium and the epicardium. The region-of-interest thus contained both tissue-dominated and contrast agent-dominated pixels.

The segmentation was performed as follows. Since the low signal-to-noise ratio prevented tissue tracking, an alternative method has been used. Hence, tissue tracking was emulated by a method known as the Centerline method (Sheehan et al., "Advantages and applications of the centerline method for characterizing regional ventricular function", Circulation 1986, 74:293–305) and commonly used in SPECT imaging.

Figure 22:
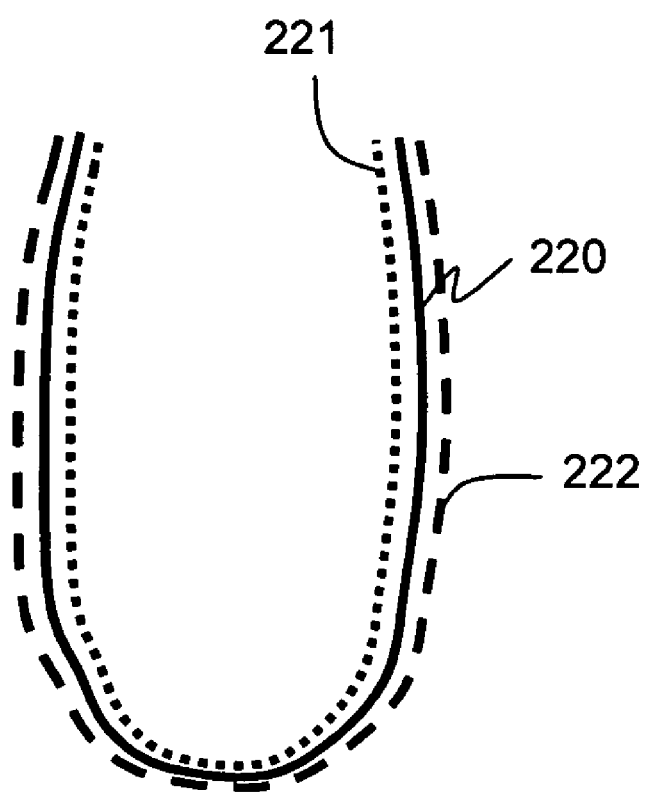
FIG. 22 is a schematic illustration on a centerline method employed in various exemplary embodiments of the invention.

The method is illustrated in FIG. 22. A centerline 220 was defined as a curve being equidistant to the endocardial boundary at ES (designated 221) and the endocardial boundary at ED (designated 222). It was assumed that most of the wall motion attributed to the endocardial boundary is along a line perpendicular to centerline 220. Thus, denoting the frame indices corresponding to ES and ED, by $p_{es}$ and $p_{ed}$ respectively, centerline 220 was defined by averaging the vector $R_p(\theta')$ with $p=p_{es}$ and the vector $R_p(\theta')$ with $p=p_{ed}$. The polar coordinates of centerline 220 were stored in the vector $C(\theta')$. All the elements in $C(\theta')$ between the points of the Annulus were set manually to zero.

Centerline 220 was then divided to 45 mini-segments of equal length. The two-dimensional vectors defining the location of the points separating the mini-segments are denoted $Q_s$, where s is the index of the point separation point.

Another binary matrix, $S_s(m,n)$, was constructed to define the area corresponding to each mini-segment s. The matrix-elements of $S_s(m,n)$ were set to 1 for all the pixels whose geometric location is between the line perpendicular to the centerline at $Q_s$ and the line perpendicular to the centerline at $Q_{s+1}$ (note that the lines perpendicular to the Centerline are not necessarily radial). All other matrix-elements of $S_s(m,n)$ were set to 0. Since, the locations may include pixels from both walls of the cardiac muscle only pixels whose distance from the mid-point of the mini-segment, $\frac{1}{2}(Q_s+Q_{s+1})$, was below a predetermined threshold, were considered as part of the segment s. In the present example, the predetermined threshold was set to 55 pixels.

Figure 23:
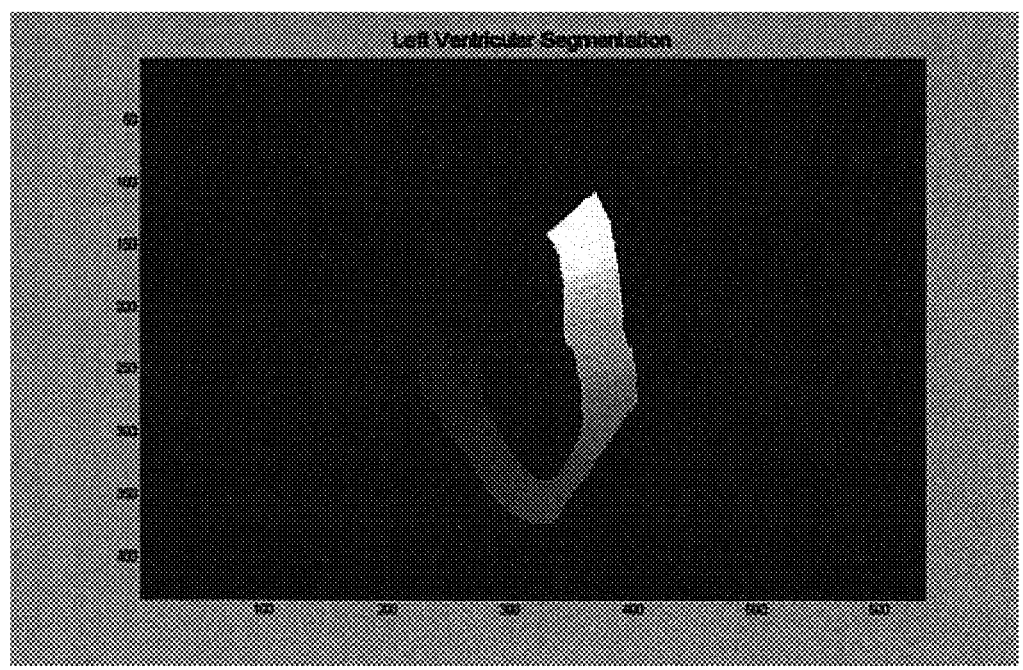
FIG. 23 is an imagery example of a segmentation employed in various exemplary embodiments of the invention.

An example of the segmentation is shown in FIG. 23.

The area $S_{s,p}(m,n)$ corresponding to the s-th mini-segment at the p-th frame was defined as the intersection between $S(m,n)$ and $M_p(m,n)$:

$$S_{s,p}(m,n) = S_s(m,n) \cap M_p(m,n). \quad (EQ. 39)$$

Once the mini-segments were defined, they were scanned to define clutter-dominated mini-segments, which in the present example were defined as mini-segments having at least 50% of clutter pixels. Clutter pixels were defined as pixels having a gray-level that exceeds the 85th percentile of the gray-levels in the cine-loop.

When the above clutter detection method was applied on 3 cine-loops with visually detected clutter regions and 3 cine-loops with no visually detected clutter regions (total of 270 mini-segments), the method successfully detected the clutter-dominated mini-segments, with zero false negative and two (0.7%) false positive mini-segments.

Figure 24:
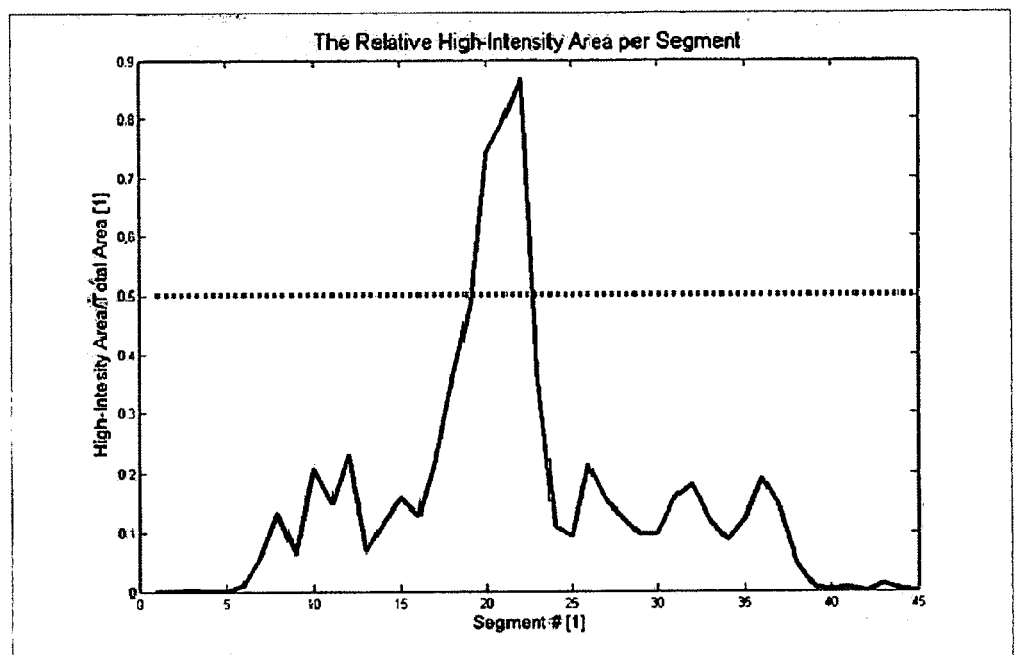
FIG. 24 shows a median over time of the percentage of clutter-pixels as a function of mini-segment index, calculated according to various exemplary embodiments of the present invention.
Figure 25A:
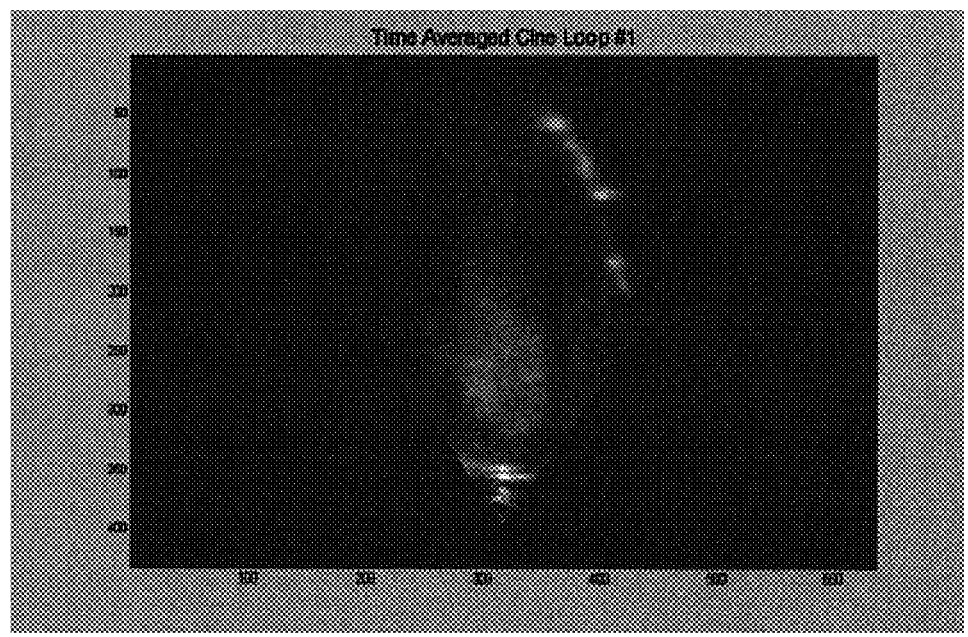
FIGS. 25a–b show the result of applying temporal averaging to each pixel in a cine-loop (FIG. 25a) and the corresponding clutter-dominated region (FIG. 25b), according to various exemplary embodiments of the present invention.
Figure 25B:
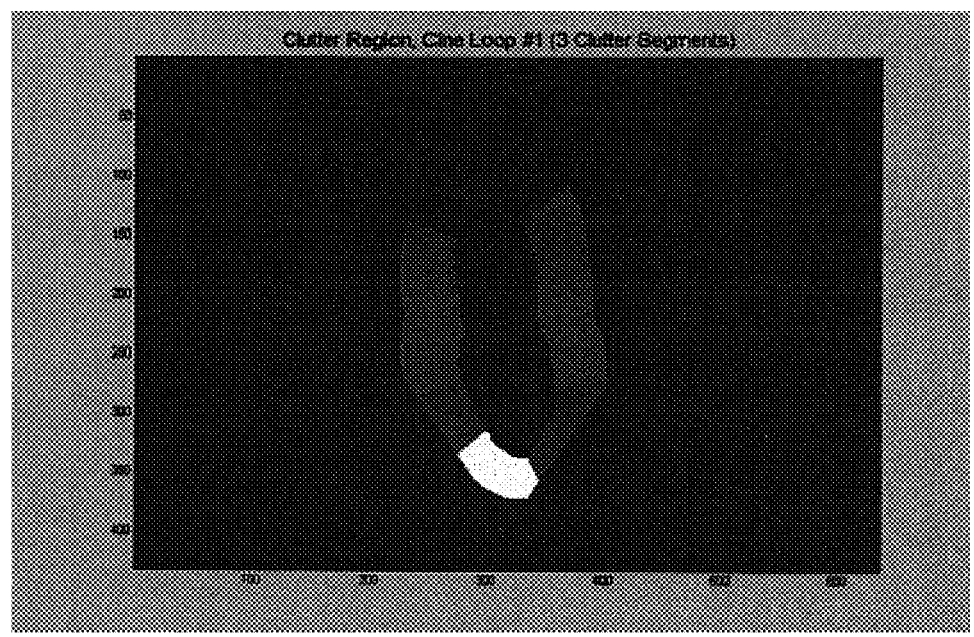

An example for the median over time of the percentage of clutter-pixels in the mini-segments is plotted in FIG. 24. In this example, mini-segments Nos. 18 through 24 were defined as clutter-dominated. FIGS. 25*a*–*b* show the result of applying temporal averaging to each pixel in a cine-loop (FIG. 25*a*) and the corresponding clutter-denominated region (FIG. 25*b*).

Each frame has been processed to calculate for each mini-segment, two representative intensity values, which, in the present example were selected to be two IBS values, corresponding to echoes returned from tissue and echoes returned from the contrast agent. The two IBS values were calculated using gray-level histogram of mini-segments as further detailed hereinbelow with reference to FIG. 26.

A gray-level histogram was constructed for each mini-segment and each frame from a three-term moving average (over time) of the gray-level values of the mini-segments. The complete set of gray-level histograms can be view as a function of three variables H(p,s,g) where s is a mini-segment index, p is a frame index and g is a gray-level. This function was subjected to two-dimensional cubic Spline smoothing, both in the s-g plane (for fixed p) and in the p-g plane (for fixed s).

Figure 26:
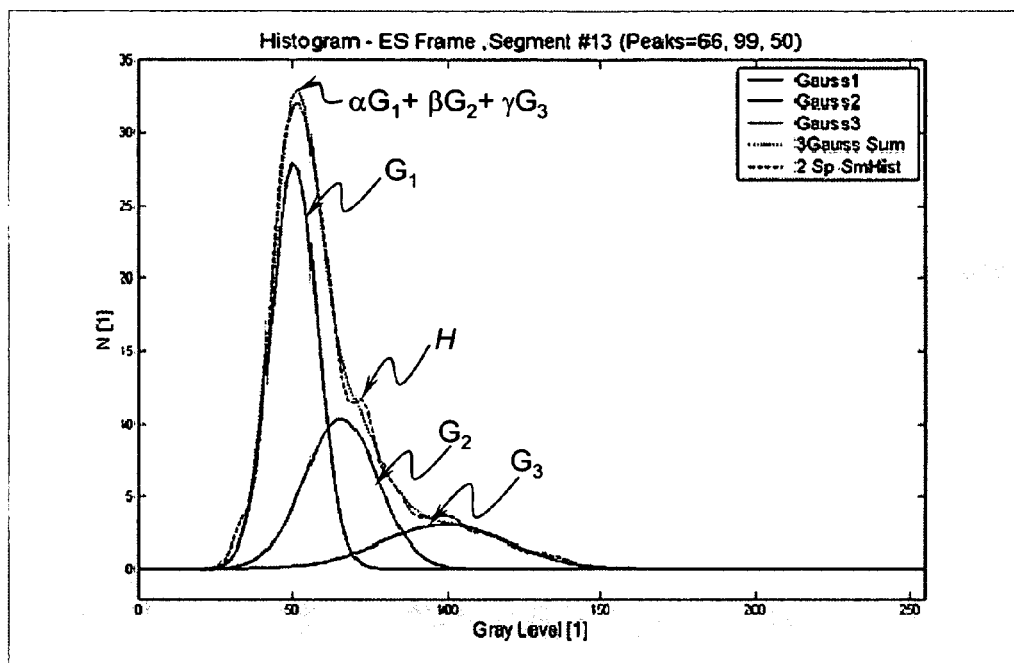
FIG. 26 shows a three-Gaussians fit to a gray-level histogram of a single mini-segment, performed according to various exemplary embodiments of the present invention.

Each of the resulting gray-level histograms $H_{s,p}(g)$ was fitted to a sum of three Gaussians, $G_1$, $G_2$ and $G_3$, respectively localized in the low, medium and high intensity regions of the histogram. In the example of FIG. 26 (case No. 1, ES frame, mini-segment No. 13, no clutter, $G_1$, $G_2$ and $G_3$, were centered at gray-levels of g=50, g=66 and g=99, respectively. As shown in FIG. 26 the goodness of the fit is high.

For mini-segments which were not classified as clutter-dominated, $G_1$ and $G_2$ were used to identify pixels corresponding to echoes from tissue ($G_1$ for low-intensity tissue pixels, $G_2$ for high-intensity tissue pixels), and $G_3$ was used to identify pixels corresponding to echoes from the contrast agent.

For clutter-dominated mini-segments, $G_3$ was used to identify pixels corresponding to echoes from tissue, $G_2$ was used to identify pixels corresponding to echoes from the contrast agent, and $G_3$ was used to identify (and reject) clutter pixels. Once the Gaussian parameters have been calculated for each mini-segment s in each frame p, the two IBS values $IBS_1$ and $IBS_2$ were set to the location of the center of the fitted Gaussians. Specifically, $IBS_1$ was set to the location of the center of the Gaussian which corresponded to the tissue (in case there was more than one such Gaussian, the first Gaussian was used), and $IBS_2$ was set to the location of the center of the Gaussian corresponding to the contrast agent.

In order to validate the procedure for calculating the IBS values, 184 mini-segments were randomly selected in different frames of two cine-loops (case No. 1 and case No. 2). 33 mini-segments were clutter-dominated and 151 were substantially clutter-free. For each mini-segment, the mean gray-level for both the tissue and the contrast agent was estimated visually (on a scale from 0 to 255, rounded to the closest multiple of 5, due to estimation inaccuracy). The visual estimation has been compared to the automatically determined values.

Once the IBS values were calculated the attenuation correction procedure of Example 2 was applied to each IBS value of each mini-segment in each frame.

The image processing further included the generation of perfusion maps. To this end, two types of perfusion maps were generated. A first type was generated by applying a thresholding procedure to the mean videointensity values for each pixel and each frame. The thresholding procedure included band-pass filter with a lower threshold for rejecting tissue pixels, and an upper threshold for rejecting clutter pixels. The thresholds were selected according to the gray level corresponding to a perfusion level of 40%, using the attenuation correction factor for the relevant mini-segment and frame.

A second type of perfusion map was generated by defining local perfusion levels. The perfusion level per mini-segment $P_s$ was defined using the difference between the median (over time) of the attenuation-corrected IBS values:

$$P_s = \frac{1}{N_{90}} (\overline{IBS_2^s} - \overline{IBS_1^s}), \quad \text{(EQ. 40)}$$

where $N_{90}$ is the 90th percentile of the expression $(\overline{IBS_2^s} - \overline{IBS_1^s})$ over all mini-segments. The values of $P_s$ were used to create a perfusion map the region-of-interest.

Data Acquisition

The perfusion quantification was performed on the 10 cine-loops which were acquired as described in Example 2 above. The clinical categorization of Example 2 (normal, hypokinetic or akinetic) has also been used in the present Example for comparison.

Note that the method employed in the present example uses many mini-segments, while the clinical evaluation only refers to six segments per cine-loop. In order to compare the two datasets, the median value over all the mini-segments belonging to each segment has been calculated.

For the purpose of detecting abnormal (hypokinetic or akinetic) tissue, sensitivity and specificity measures were defined as follows:

Sensitivity$(c)=Pr(P_s \leq c|\text{abnormal})$

Specificity$(c)=Pr(P_s > c|\text{normal})$ (EQ. 41)

where Pr stands for probability and c is a threshold which was determined from the distributions of $P_s$.

Results

Figure 27A:
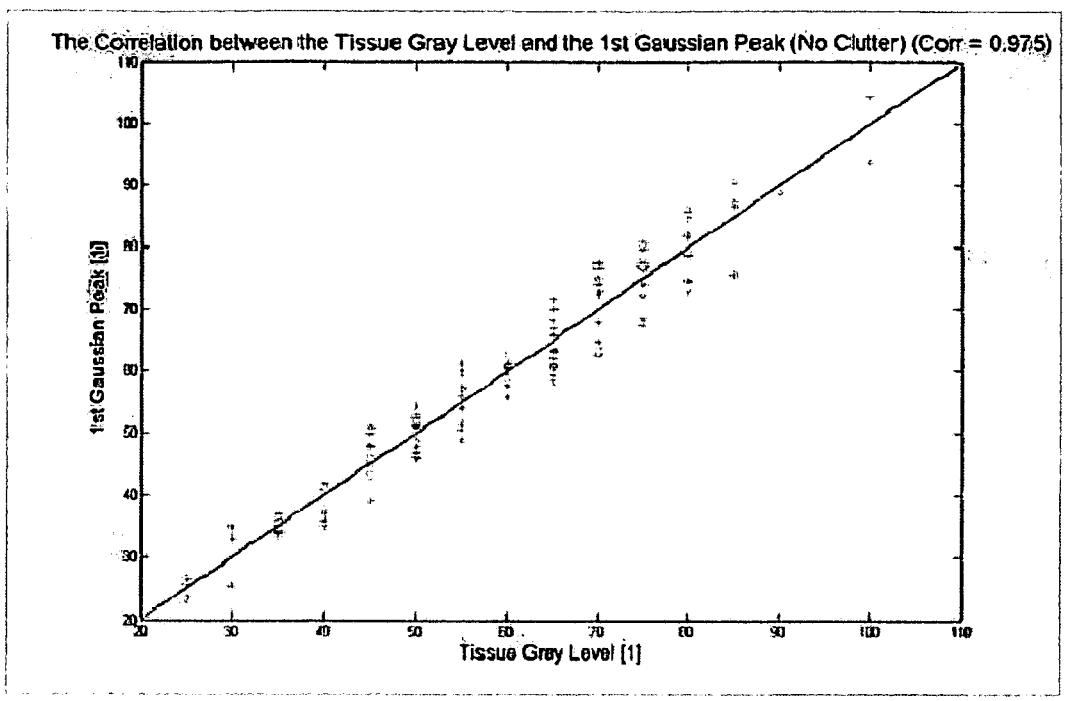
FIGS. 27a–b show correlation between visual and automatic identification of tissue (FIG. 27a) and contrast agent (FIG. 27b) performed for clutter-free mini-segments according to various exemplary embodiments of the present invention.
Figure 27B:
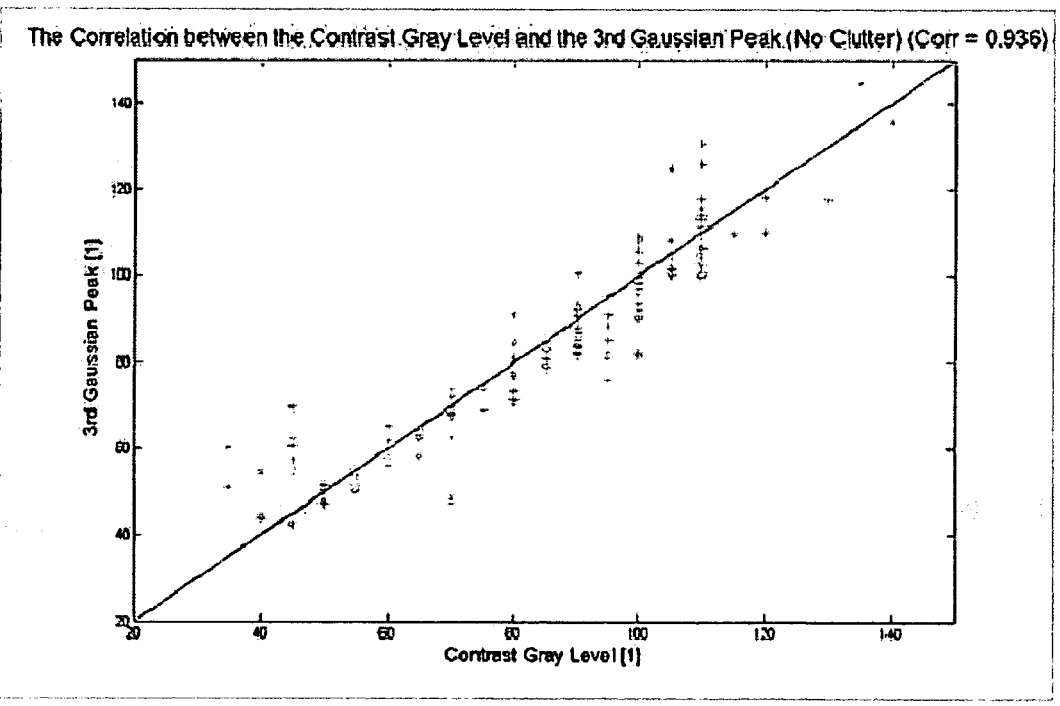

FIGS. 27*a*–*b* show the correlation between the automatic (via Gausian fitting) and visual identification of tissue (FIG. 27*a*) and contrast agent (FIG. 27*b*) for the 151 clutter-free mini-segments. In FIG. 27*a* the correlation is between the visually estimated tissue gray level and the peak of the first Gaussian. In FIG. 27*b* the correlation is between the visually estimated contrast agent gray level and the peak of the third Gaussian. As shown in FIGS. 27*a*–*b*, a good linear correlation ($r^2=0.975$ for FIG. 27*a* and $r^2=0.936$ for FIG. 27*b*) was found for the clutter-free cases.

Figure 28A:
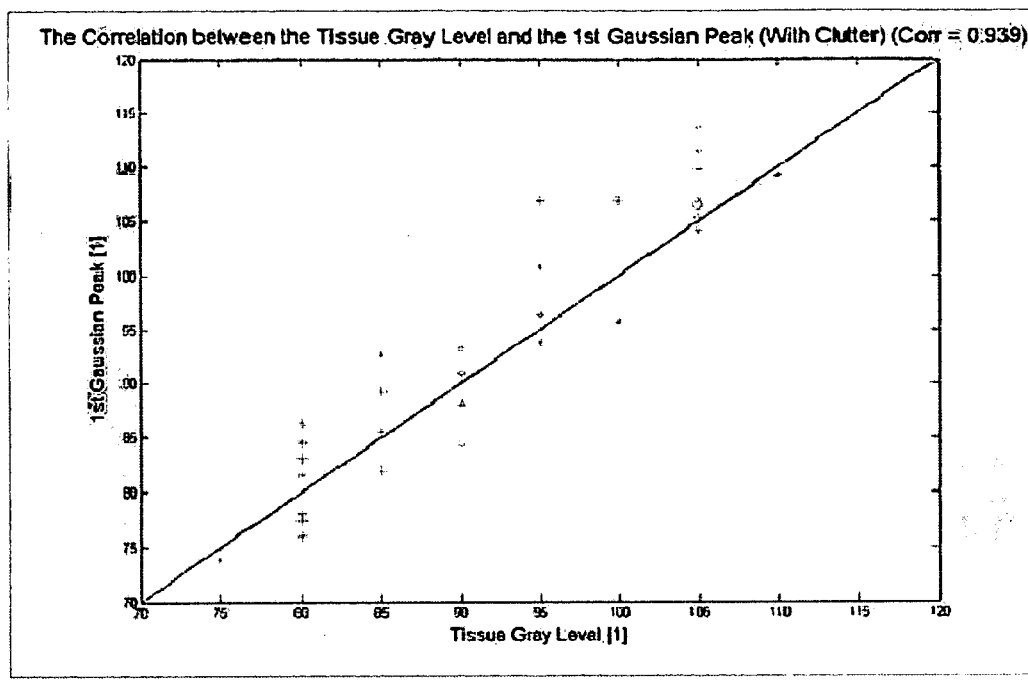
FIGS. 28a–b show correlation between visual and automatic identification of tissue (FIG. 28a) and contrast agent (FIG. 28b) performed in for clutter-dominated mini-segments according to various exemplary embodiments of the present invention.
Figure 28B:
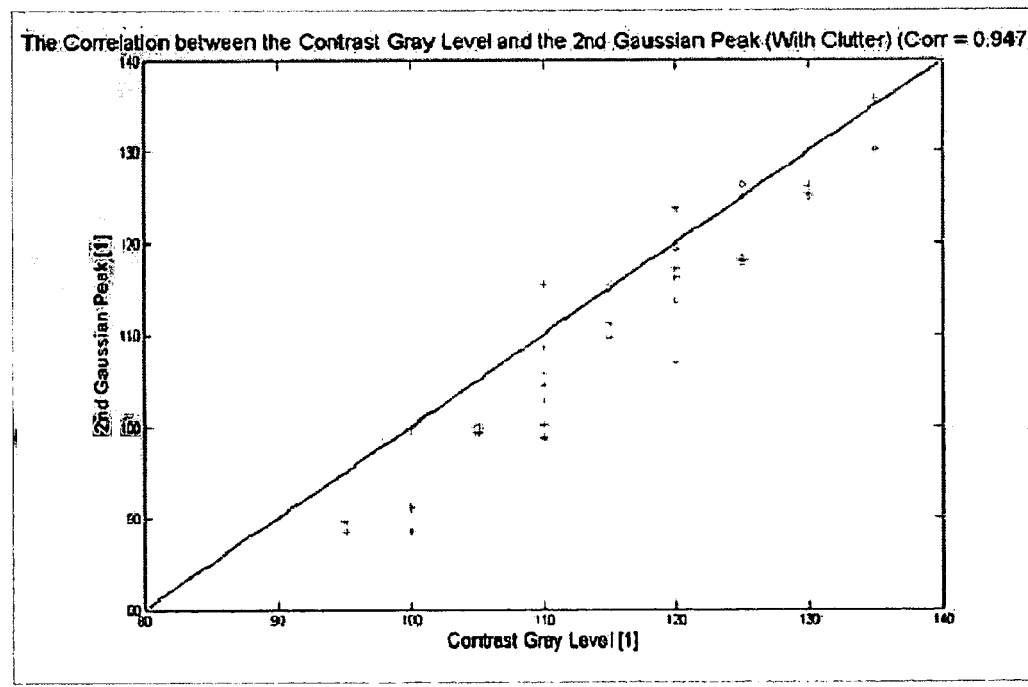

FIGS. 28*a*–*b* show the correlations between the automatic and visual identification of tissue (FIG. 28*a*) and contrast agent (FIG. 28*b*) for the 33 clutter-dominated mini-segments. In FIG. 27*a* the correlation is between the visually estimated tissue gray level and the peak of the first Gaussian. In FIG. 27*b* the correlation is between the visually estimated contrast agent gray level and the peak of the second Gaussian. Similarly to the clutter-free case, a good linear correlation ($r^2=0.939$ for FIG. 28*a* and $r^2=0.947$ for FIG. 28*b*) was found.

Figure 29:
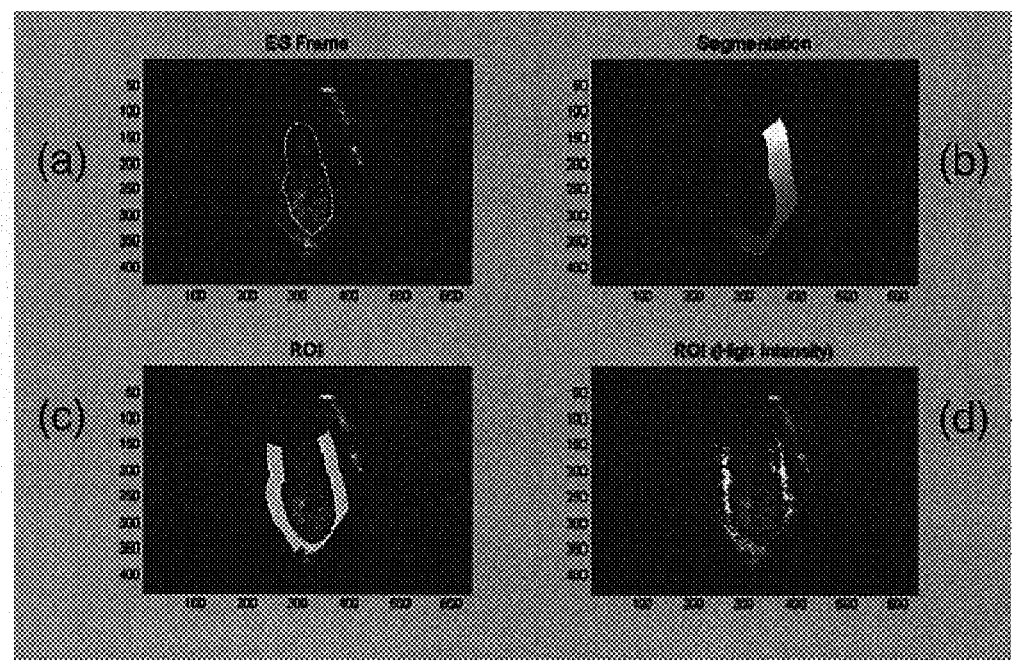
FIGS. 29a–d show an endocardial boundary (FIG. 29a); the corresponding segmentation map (FIG. 29b); the corresponding myocardial region-of-interest (FIG. 29c); and the corresponding opacified regions (FIG. 29d), obtained according to various exemplary embodiments of the present invention.

FIGS. 29a–d show direct parametric imaging of the perfusion for the ES frame of case No. 1. Shown in FIGS. 29a–d are the original frame with marking showing the endocardial boundary (FIG. 29a); the segmentation map (FIG. 29b); the original frame with marking showing the myocardial region-of-interest (FIG. 29c); and the original frame with marking showing opacified regions as determined by the thresholding procedure (FIG. 29d). As demonstrated in FIG. 29d, the apical region shows low Opacification, corresponding to lack of perfusion. FIG. 29 thus demonstrates a typical case of a patient which has undergone Apical Myocardial Infarct.

Figure 30A:
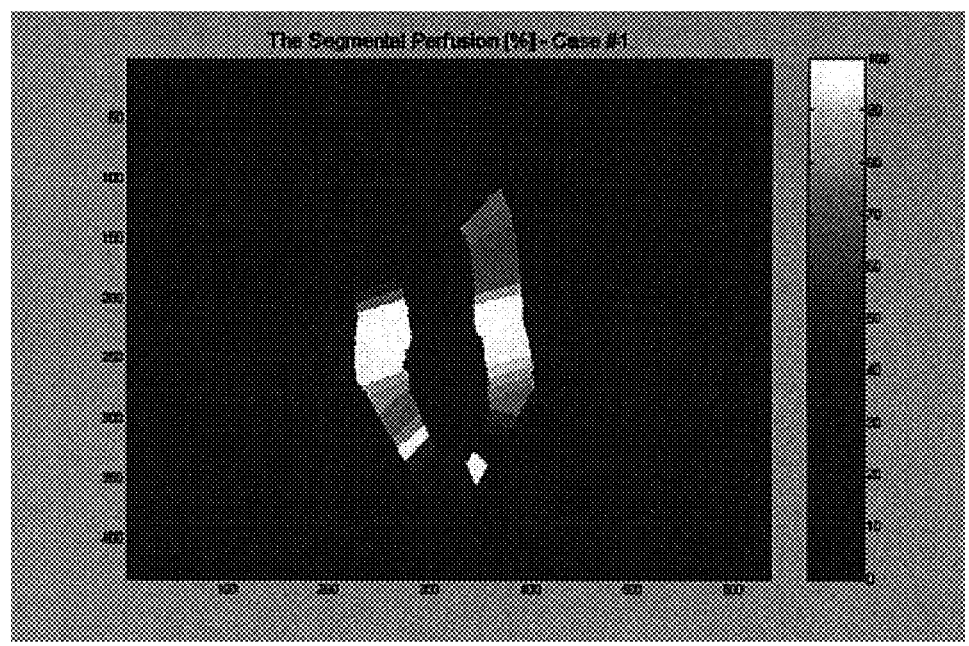
FIGS. 30a–c are perfusion maps constructed, according to various exemplary embodiments of the present invention.

FIG. 30a is a perfusion map constructed for case No. 1 (apical four-chamber view), using the calculated values of $P_s$ (see Equation 40). Different values of $P_s$ are represented by different gray-levels in the perfusion map. The grayscale bar on the right defines the perfusion level corresponding to each displayed gray level. Note the very low values in the apical region, and relatively low values in the basal Septum (top left part of the map), in agreement with the findings of the thresholding procedure (see FIG. 29). The septum (left part of the map) has been diagnosed as hypokinetic, the apex as akinetic, and the lateral wall (right part of the map) as normal.

Figure 30B:
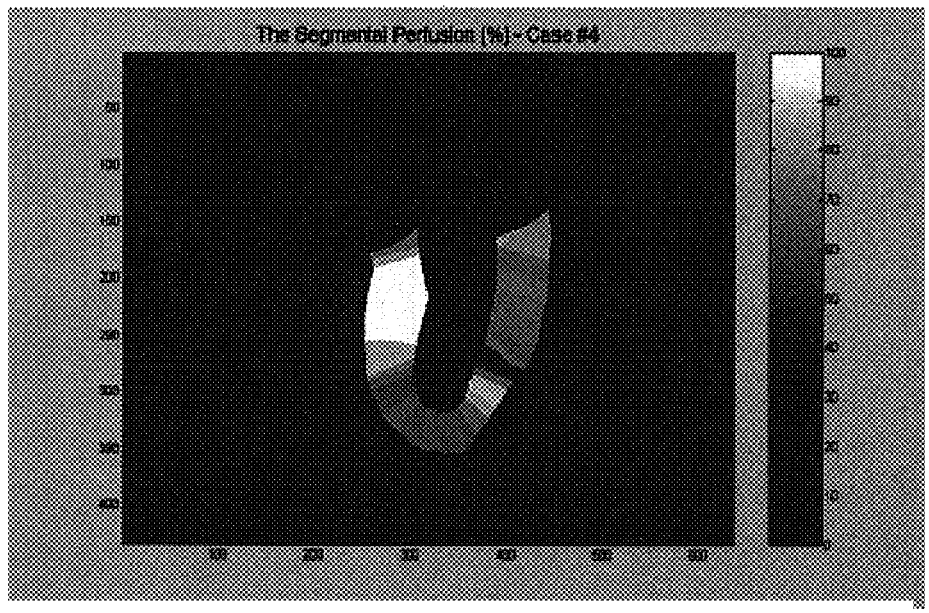
Figure 30C:
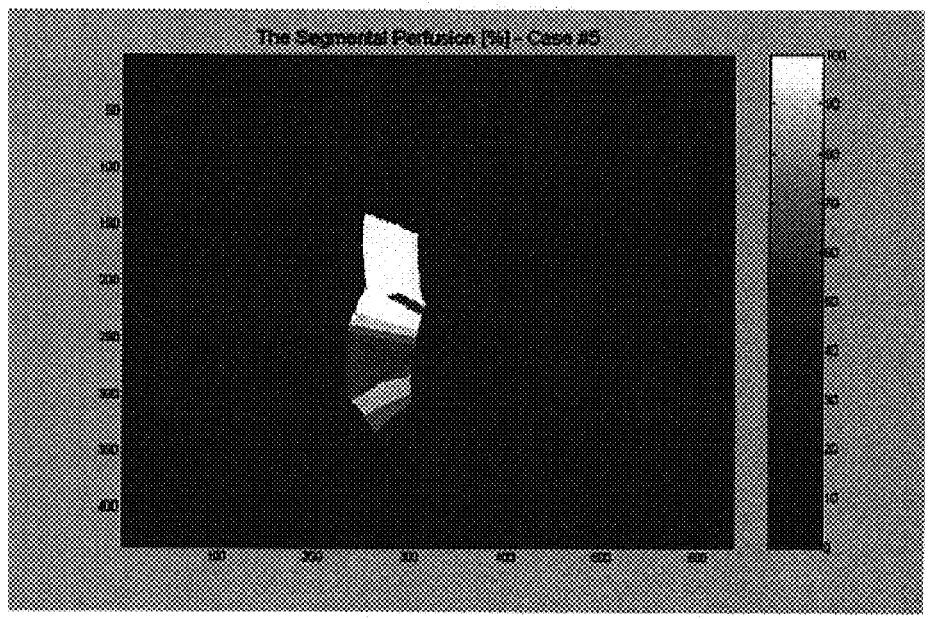

FIGS. 30b–c are perfusion maps constructed for cases Nos. 4 and 5, respectively. FIG. 30b demonstrates a case in which all the mini-segments have been diagnosed as normal, and FIG. 30c demonstrates a case in which the inferior wall (left part of the map) is normal, while the anterior wall (right part of the map) is akinetic.

Figure 31A:
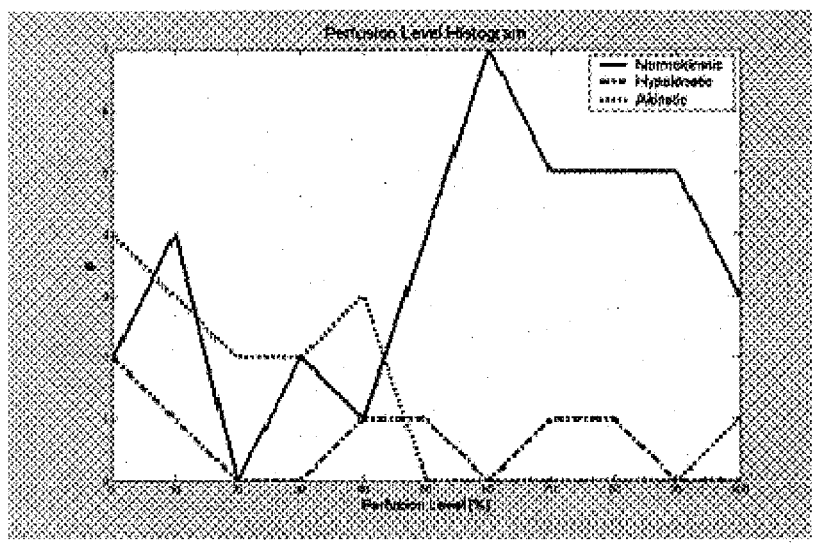
FIG. 31a shows distribution of perfusion levels, calculated according to various exemplary embodiments of the present invention.

FIG. 31a shows the distribution of $P_s$ and Table 5 below summarizes the mean and standard deviation of $P_s$ for the normokinetic, hypokinetic, akinetic and abnormal segments. The results, sorted according to different regions of the echocardiographic image (apical, mid and basal regions), are displayed in Table 6 which follows.

TABLE 5

|  | Perfusion level Ps [%] |
| --- | --- |
| normokinetic | 59 ± 29 |
| hypokinetic | 36 ± 31 |
| akinetic | 23 ± 24 |
| abnormal | 27 ± 26 |

TABLE 6

|  | normal | abnormal |
| --- | --- | --- |
| apical region | 55 ± 23 | 27 ± 16 |
| mid region | 63 ± 27 | 28 ± 37 |
| basal region | 59 ± 34 | 26 ± 37 |
| total | 59 ± 29 | 27 ± 26 |

Since the distribution of $P_s$ for each clinical group is not exactly Gaussian (see FIG. 31a), the relatively high standard deviation values in Tables 5 and 6 are not indicative. In fact, there is distinct correlation between the clinical categorization and the automatic evaluation, both for the overall dataset and for each region separately. Using the Wilcoxon Rank sum test it was found that the probability for the perfusion levels measured for normal and abnormal segments to belong to two identical populations is 0.0003, which is considerably smaller than the desired level of significance (0.05). It is therefore concluded that the measurements for the two groups are significantly different.

Figure 31B:
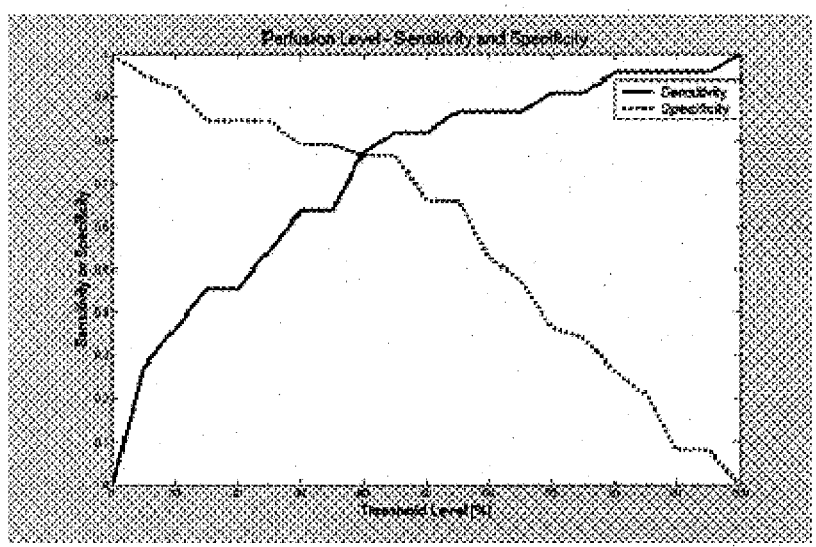

FIG. 31b shows the sensitivity and specificity (see Equation 41) calculated for the distributions of FIG. 31a, using different values for the threshold c. As shown in FIG. 31b, the sensitivity and specificity were approximately equal (0.773 and 0.763 respectively) for c=40%.

Table 7 below displays a comparison between the clinical evaluation of contractility and the calculated perfusion measure $P_s$, for the normal, hypokinetic and akinetic segments. The number of cases in which $P_s$ exceeds 40% is presented in the middle column, and the number of cases in which $P_s$ is lower or equals 40% is presented in the right column. Table 7 demonstrates that normal segments tend to be above 40%, and abnormal segments tend to be below 40%.

TABLE 7

|  | $P_s > 40\%$ | $P_s \leq 40\%$ |
| --- | --- | --- |
| normokinetic | 29 | 9 |
| hypokinetic | 4 | 3 |
| akinetic | 2 | 13 |
| abnormal | 6 | 16 |

Figure 31C:
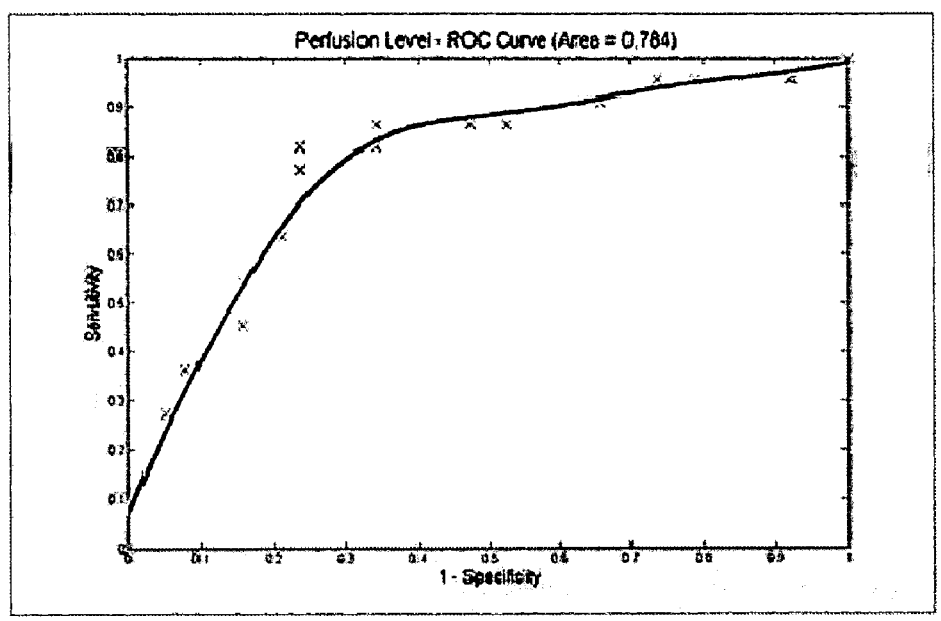
FIG. 31c shows the sensitivity as a function of the complementary of the specificity to unity, calculated for a threshold of 40%.

FIG. 31c shows a Receiver Operating Characteristic (ROC) curve, which is a graph of the sensitivity as a function of the false positive rate (the complementary of the specificity to unity). The area under the ROC curve can be viewed as a quantitative score to the ability of the present embodiments to correctly classify normal and abnormal cases, where a score of 1.0 corresponds to perfect classification (no false classification), and a score of 0.5 corresponds to no classification at all. It is recognized, however, that an area under the ROC of 1.0 cannot be obtained (to this end see, e.g., Oh et al., "Correlation of regional wall motion abnormalities detected by two-dimensional echocardiography with perfusion defect determined by Technetium 99 m Sestamibi imaging in patients treated with reperfusion therapy during acute myocardial infarction", Am Heart J 1996, 131:32–37; and Rechavia et al., "Hyperdynamic performance of remote myocardium in acute infarction: Correlation between regional contractile function and myocardial perfusion", Eur Heart J, 1995, 16:1845–1850, in which it has been shown by SPECT studies that the correlation coefficient between cardiac contractility and perfusion is about 0.7).

The area under the ROC curve of FIG. 31c was found to be 0.784, demonstrating a reasonable matching between the clinical and automatic classification.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of analyzing an ultrasound image of a target volume having therein at least two types of substances, the ultrasound image being represented by a plurality of intensity values over a grid of picture-elements, the method comprising:
 dividing a region-of-interest of the image to a set of mini-segments;
 for each mini-segment, calculating at least two representative intensity values, respectively representing the at least two types of substances; and
 applying attenuation corrections to each representative intensity value of at least a subset of said set of mini-segments so as to map said region-of-interest according to said at least two types of substances.

2. The method of claim 1, further comprising defining said region-of-interest.

3. The method of claim 1, further comprising identifying clutter picture-elements in the ultrasound image so as to define clutter-dominated mini-segments.

4. The method of claim 1, wherein said at least two types of substances comprise an ultrasound contrast agent and an additional substance being other than said ultrasound contrast agent.

5. The method of claim 4, wherein said region-of-interest is mapped according to concentration levels of said ultrasound contrast agent.

6. The method of claim 4, wherein said region-of-interest is the left ventricle of a cardiac muscle.

7. The method of claim 6, wherein said region-of-interest is mapped according to perfusion levels within said left ventricle.

8. The method of claim 4, wherein said attenuation corrections are applied using a predetermined functional dependence between concentration of said contrast agent and a local attenuation coefficient.

9. The method of claim 4, wherein said attenuation corrections are applied using a predetermined functional dependence between concentration of said contrast agent and a total reflection cross-section.

10. The method of claim 4, wherein said at least two representative intensity values comprise a first representative intensity value defined as an average over said mini-segment of intensity values corresponding to said ultrasound contrast agent, and a second representative intensity value defined as an average over said mini-segment of intensity values corresponding to said additional substance.

11. The method of claim 10, wherein said region-of-interest is characterized by an intensity histogram which is fitted to a sum of a plurality of localized functions, whereby said intensity values corresponding to said ultrasound contrast agent and said intensity values corresponding to said additional substance are identified using said plurality of localized functions.

12. The method of claim 1, wherein the ultrasound image is a moving ultrasound image characterized by a plurality of picture-elements, said moving ultrasound image being formed of a set of still-images.

13. The method of claim 12, wherein said moving ultrasound image comprises an ultrasound cine-loop image.

14. The method of claim 12, wherein said attenuation corrections are stationary over said set of still-images.

15. The method of claim 14, wherein said attenuation corrections are applied using a coarse correction factor to each representative intensity value of a respective mini-segment.

16. The method of claim 12, wherein said attenuation corrections vary over said set of still-images.

17. The method of claim 16, wherein said attenuation corrections are applied using a time-dependent correction factor to each representative intensity value of a respective mini-segment.

18. The method of claim 16, wherein said time-dependent correction factor is interpolated from a coarse correction factor using an average distance between said mini-segment and a transducer generating the ultrasound image.

19. The method of claim 18, wherein said coarse correction factor comprises the difference between a maximal intensity median over said set of still-images for at least a portion of said set of mini-segments and a median intensity value of said mini-segment.

20. Apparatus for analyzing an ultrasound image of a target volume having therein at least two types of substances, the ultrasound image being represented by a plurality of intensity values over a grid of picture-elements, the apparatus comprising:
 a dividing unit, for dividing a region-of-interest of the image to a set of mini-segments;
 a representation unit, for calculating, for each mini-segment, at least two representative intensity values, respectively representing the at least two types of substances; and
 a mapping unit, for mapping said region-of-interest according to said at least two types of substances, said mapping unit being associated with attenuation correction functionality to apply attenuation correction to each representative intensity value of at least a subset of said set of mini-segments.

21. The apparatus of claim 20, further comprising a region definer, for defining said region-of-interest.

22. The apparatus of claim 20, further comprising a clutter identifier, for identifying clutter picture-elements in the ultrasound image, to thereby define clutter-dominated mini-segments.

23. The apparatus of claim 20, wherein said at least two types of substances comprise an ultrasound contrast agent and an additional substance being other than said ultrasound contrast agent.

24. The apparatus of claim 23, wherein said region-of-interest is mapped according to concentration levels of said ultrasound contrast agent.

25. A method of defining a region-of-interest in an ultrasound image being represented by a plurality of intensity values over a grid of picture-elements, the method comprising:
 transforming the grid into a polar representation defined by a radial direction represented by a plurality of range-gates and a circumferential direction represented by a plurality of angle-gates; and
 for each angle-gate, integrating intensity values along said radial direction so as to provide a set of radial-integrated intensity values, and applying a thresholding procedure to said set of radial-integrated intensity values, so as to define a radial interval corresponding to said angle-gate;
 thereby defining the region-of-interest in the ultrasound image.

26. The method of claim 25, further comprising performing at least one morphological operation subsequently to said thresholding procedure.

27. The method of claim 25, wherein said ultrasound image is a moving ultrasound image being formed of a set of still-images.

28. The method of claim 27, further comprising calculating, for each picture-element of said plurality of picture-elements, a set-averaged intensity value, thereby providing an average intensity matrix representing said moving image, and using said average intensity matrix to correct said region-of-interest.

29. The method of claim 27, further comprising correcting said region-of-interest using a high-derivative rejection procedure.

30. Apparatus for defining a region-of-interest in an ultrasound image being represented by a plurality of intensity values over a grid of picture-elements, the apparatus comprising:
   a transformation unit, for transforming the grid into a polar representation defined by a radial direction represented by a plurality of range-gates and a circumferential direction represented by a plurality of angle-gates; and
   an integration unit, for integrating intensity values along said radial direction so as to provide a set of radial-integrated intensity values for each angle-gate, said integration unit being associated with a thresholding unit to applying a thresholding procedure to said set of radial-integrated intensity values, so as to define a radial interval corresponding to said angle-gate.

31. The apparatus of claim 30, further comprising a morphological unit being associated with a thresholding unit for performing at least one morphological operation subsequently to said thresholding procedure.

32. The apparatus of claim 30, wherein said ultrasound image is a moving ultrasound image being formed of a set of still-images.

33. The apparatus of claim 32, further comprising an error correction unit for calculating, for each picture-element of said plurality of picture-elements, a set-averaged intensity value, thereby to provide an average intensity matrix representing said moving image, whereby said region-of-interest is corrected using said average intensity matrix.

34. The apparatus of claim 32, further comprising an error correction unit for correcting said region-of-interest using a high-derivative rejection procedure.

* * * * *